US009124717B2

(12) United States Patent
Mikkelsen et al.

(10) Patent No.: US 9,124,717 B2
(45) Date of Patent: *Sep. 1, 2015

(54) MEDIA DELIVERY PLATFORM

(71) Applicant: SKKY Incorporated, Minneapolis, MN (US)

(72) Inventors: John Mikkelsen, Minneapolis, MN (US); Robert Freidson, St. Petersburg (RU)

(73) Assignee: Skky Incorporated, Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/230,733

(22) Filed: Mar. 31, 2014

(65) Prior Publication Data

US 2014/0254482 A1 Sep. 11, 2014

Related U.S. Application Data

(63) Continuation of application No. 12/322,615, filed on Feb. 4, 2009, which is a continuation of application No. 10/183,756, filed on Jun. 26, 2002, now Pat. No. 7,548,875.

(Continued)

(51) Int. Cl.
H04M 1/725 (2006.01)
G06Q 30/04 (2012.01)
(Continued)

(52) U.S. Cl.
CPC ..... *H04M 1/72558* (2013.01); *G06F 17/30194* (2013.01); *G06Q 20/123* (2013.01); *G06Q 30/04* (2013.01); *G06Q 30/0601* (2013.01);

(Continued)

(58) Field of Classification Search
USPC .................................................. 705/26, 27
IPC .................................. G06Q 30/00; H04W 4/00
See application file for complete search history.

(56) References Cited

U.S. PATENT DOCUMENTS 512,992 A 1/1894 Ritchey
3,582,926 A 6/1971 Hassan
(Continued)

FOREIGN PATENT DOCUMENTS

CA 2225910 6/1999
CN 1218258 6/1999
(Continued)

OTHER PUBLICATIONS

Excerpt from Random House Webster's Computer & Internet Dictionary, Third Edition, Philip E. Margolis, 1999, 3pgs.*
(Continued)

*Primary Examiner* — Rob Pond
(74) *Attorney, Agent, or Firm* — Patterson Thuente Pedersen, P.A.

(57) ABSTRACT

A method of delivering an audio and/or visual media file including, for example, one or more of full or partial master recordings of songs, musical compositions, ringtones, videos, films, television shows, personal recordings, animation and combinations thereof, over the air wirelessly, from one or more servers to an electronic device with or without an Internet connection, said method comprising transmitting and audio and/or visual media file in compressed format to said electronic device, and wherein the electronic device is effective to receive said audio and/or visual file and playback said audio and/or visual content on demand by a user.

6 Claims, 16 Drawing Sheets

Related U.S. Application Data

(60) Provisional application No. 60/301,681, filed on Jun. 27, 2001, provisional application No. 60/303,115, filed on Jul. 3, 2001, provisional application No. 60/312,450, filed on Aug. 14, 2001, provisional application No. 60/343,159, filed on Oct. 26, 2001.

(51) Int. Cl.

| | | |
|---|---|---|
| *G06Q 30/06* | (2012.01) | |
| *H04L 29/06* | (2006.01) | |
| *H04W 4/18* | (2009.01) | |
| *H04W 4/00* | (2009.01) | |
| *H04W 4/16* | (2009.01) | |
| *G06Q 20/12* | (2012.01) | |
| *G06Q 50/18* | (2012.01) | |
| *G06F 17/30* | (2006.01) | |
| *H04W 8/00* | (2009.01) | |
| *H04L 29/08* | (2006.01) | |
| *H04W 88/02* | (2009.01) | |
| *H04M 1/02* | (2006.01) | |

(52) U.S. Cl.
CPC ........ *G06Q30/0603* (2013.01); *G06Q 30/0633* (2013.01); *G06Q 50/184* (2013.01); *H04L 29/06* (2013.01); *H04L 29/06027* (2013.01); *H04L 65/1059* (2013.01); *H04L 65/4084* (2013.01); *H04L 65/602* (2013.01); *H04L 65/607* (2013.01); *H04L 67/04* (2013.01); *H04L 67/06* (2013.01); *H04L 69/04* (2013.01); *H04L 69/329* (2013.01); *H04M 1/72527* (2013.01); *H04W 4/003* (2013.01); *H04W 4/16* (2013.01); *H04W 4/18* (2013.01); *H04W 8/00* (2013.01); *H04L 67/289* (2013.01); *H04L 67/2823* (2013.01); *H04M 1/0252* (2013.01); *H04W 88/02* (2013.01)

(56) References Cited

U.S. PATENT DOCUMENTS

| | | | |
|---|---|---|---|
| 4,032,242 | A | 6/1977 | Morris |
| 4,291,749 | A | 9/1981 | Ootsuka et al. |
| 4,314,232 | A | 2/1982 | Tsunoda |
| 4,337,821 | A | 7/1982 | Saito |
| 4,401,848 | A | 8/1983 | Tsunoda |
| 4,407,564 | A | 10/1983 | Ellis |
| 4,419,730 | A | 12/1983 | Ito et al. |
| 4,441,405 | A | 4/1984 | Takeuchi |
| 4,446,334 | A | 5/1984 | Gruff |
| D275,754 | S | 10/1984 | Matsuda et al. |
| 4,481,584 | A | 11/1984 | Holland |
| 4,536,739 | A | 8/1985 | Nobuta |
| 4,570,217 | A | 2/1986 | Allen et al. |
| 4,582,389 | A | 4/1986 | Wood et al. |
| 4,589,107 | A | 5/1986 | Middleton et al. |
| 4,636,782 | A | 1/1987 | Nakamura et al. |
| 4,654,867 | A | 3/1987 | Labedz |
| 4,716,458 | A | 12/1987 | Heitzman et al. |
| 4,731,769 | A | 3/1988 | Schaefer |
| 4,740,779 | A | 4/1988 | Cleary et al. |
| 4,740,780 | A | 4/1988 | Brown et al. |
| 4,752,824 | A | 6/1988 | Moore |
| 4,795,223 | A | 1/1989 | Moss |
| 4,802,492 | A | 2/1989 | Grunstein |
| 4,807,292 | A | 2/1989 | Sorscher |
| 4,809,177 | A | 2/1989 | Windle et al. |
| 4,812,843 | A | 3/1989 | Champion, III et al. |
| 4,817,203 | A | 3/1989 | Tsurumoto et al. |
| 4,818,048 | A | 4/1989 | Moss |
| 4,827,520 | A | 5/1989 | Zeinstra |
| 4,837,551 | A | 6/1989 | Iino |
| 4,876,594 | A | 10/1989 | Schiffman |
| 4,905,272 | A | 2/1990 | Van de Mortel et al. |
| 4,914,705 | A | 4/1990 | Nigawara |
| 4,977,509 | A | 12/1990 | Pitchford et al. |
| 4,988,976 | A | 1/1991 | Lu |
| 4,991,197 | A | 2/1991 | Morris |
| 4,995,258 | A | 2/1991 | Frank |
| 4,996,959 | A | 3/1991 | Akimoto |
| 4,999,622 | A | 3/1991 | Amano et al. |
| 5,006,829 | A | 4/1991 | Miyamoto et al. |
| 5,051,735 | A | 9/1991 | Furukawa |
| 5,060,426 | A | 10/1991 | Jantzen |
| D322,437 | S | 12/1991 | Myoga |
| 5,070,323 | A | 12/1991 | Iino et al. |
| 5,124,915 | A | 6/1992 | Krenzel |
| 5,134,648 | A | 7/1992 | Hochfield et al. |
| 5,164,904 | A | 11/1992 | Sumner |
| 5,179,385 | A | 1/1993 | O'Loughlin et al. |
| 5,198,797 | A | 3/1993 | Daidoji |
| 5,203,499 | A | 4/1993 | Knittel |
| 5,214,413 | A | 5/1993 | Okabayashi et al. |
| 5,214,707 | A | 5/1993 | Fujimoto et al. |
| 5,214,793 | A | 5/1993 | Conway et al. |
| 5,239,700 | A | 8/1993 | Guenther et al. |
| 5,257,190 | A | 10/1993 | Crane |
| 5,257,397 | A | 10/1993 | Barzegar et al. |
| 5,270,689 | A | 12/1993 | Hermann |
| 5,274,560 | A | 12/1993 | La Rue |
| 5,274,629 | A | 12/1993 | Halbert-Lasselle et al. |
| 5,278,532 | A | 1/1994 | Hegg et al. |
| 5,282,222 | A | 1/1994 | Fattouche et al. |
| 5,293,115 | A | 3/1994 | Swanson |
| 5,299,132 | A | 3/1994 | Wortham |
| 5,307,326 | A | 4/1994 | Osawa |
| 5,327,558 | A | 7/1994 | Burke et al. |
| 5,335,743 | A | 8/1994 | Gillbrand et al. |
| 5,341,350 | A | 8/1994 | Frank |
| 5,345,817 | A | 9/1994 | Grenn et al. |
| 5,351,041 | A | 9/1994 | Ikata et al. |
| 5,361,165 | A | 11/1994 | Stringfellow et al. |
| 5,363,355 | A | 11/1994 | Takagi |
| 5,371,510 | A | 12/1994 | Miyauchi et al. |
| 5,388,248 | A | 2/1995 | Robinson et al. |
| 5,400,045 | A | 3/1995 | Aoki |
| 5,400,246 | A | 3/1995 | Wilson et al. |
| 5,404,443 | A | 4/1995 | Hirata |
| 5,408,686 | A | 4/1995 | Mankovitz |
| 5,410,326 | A | 4/1995 | Goldstein |
| 5,414,439 | A | 5/1995 | Groves et al. |
| 5,418,713 | A | 5/1995 | Allen |
| 5,418,962 | A | 5/1995 | Bodin et al. |
| 5,420,573 | A | 5/1995 | Tanaka et al. |
| 5,422,565 | A | 6/1995 | Swanson |
| 5,432,904 | A | 7/1995 | Wong |
| 5,440,428 | A | 8/1995 | Hegg et al. |
| 5,442,553 | A | 8/1995 | Parrillo |
| 5,442,557 | A | 8/1995 | Kaneko |
| 5,450,321 | A | 9/1995 | Crane |
| 5,450,471 | A | 9/1995 | Hanawa et al. |
| 5,450,613 | A | 9/1995 | Takahara et al. |
| 5,461,318 | A | 10/1995 | Borchert et al. |
| 5,473,595 | A | 12/1995 | Hayashi et al. |
| 5,475,399 | A | 12/1995 | Borsuk |
| 5,475,835 | A | 12/1995 | Hickey |
| 5,479,157 | A | 12/1995 | Suman et al. |
| 5,481,599 | A | 1/1996 | MacAllister et al. |
| 5,483,632 | A | 1/1996 | Kuwamoto et al. |
| 5,486,840 | A | 1/1996 | Borrego et al. |
| 5,488,357 | A | 1/1996 | Sato et al. |
| 5,493,658 | A | 2/1996 | Chiang et al. |
| 5,497,271 | A | 3/1996 | Mulvanny et al. |
| 5,504,482 | A | 4/1996 | Schreder |
| 5,504,622 | A | 4/1996 | Oikawa et al. |
| 5,506,595 | A | 4/1996 | Fukano et al. |
| 5,511,724 | A | 4/1996 | Freiberger et al. |
| 5,519,410 | A | 5/1996 | Smalanskas et al. |
| 5,523,559 | A | 6/1996 | Swanson |
| 5,524,051 | A | 6/1996 | Ryan |
| 5,525,977 | A | 6/1996 | Suman |
| 5,528,248 | A | 6/1996 | Steiner et al. |

(56) References Cited

U.S. PATENT DOCUMENTS

| | | |
|---|---|---|
| 5,528,496 A | 6/1996 | Brauer et al. |
| 5,532,684 A | 7/1996 | Katsu |
| 5,534,888 A | 7/1996 | Lebby et al. |
| 5,539,635 A | 7/1996 | Larson |
| 5,539,645 A | 7/1996 | Mandhyan et al. |
| 5,539,658 A | 7/1996 | McCullough |
| 5,539,869 A | 7/1996 | Spoto et al. |
| 5,543,789 A | 8/1996 | Behr et al. |
| 5,544,230 A | 8/1996 | Megyesi |
| 5,547,125 A | 8/1996 | Hennessee et al. |
| D373,765 S | 9/1996 | Pellicioli |
| 5,553,661 A | 9/1996 | Beyerlein et al. |
| 5,555,172 A | 9/1996 | Potter |
| 5,555,286 A | 9/1996 | Tendler |
| 5,555,502 A | 9/1996 | Opel |
| 5,557,541 A | 9/1996 | Schulhof et al. |
| 5,568,390 A | 10/1996 | Hirota et al. |
| 5,572,442 A | 11/1996 | Schulhof et al. |
| 5,576,724 A | 11/1996 | Fukatsu et al. |
| 5,586,090 A | 12/1996 | Otte |
| 5,587,560 A | 12/1996 | Crooks et al. |
| 5,594,709 A | 1/1997 | Nagano et al. |
| 5,594,779 A | 1/1997 | Goodman |
| 5,596,319 A | 1/1997 | Spry |
| 5,604,050 A | 2/1997 | Brunette et al. |
| 5,604,676 A | 2/1997 | Penzias |
| 5,614,895 A | 3/1997 | Ohomori et al. |
| 5,616,876 A | 4/1997 | Cluts |
| 5,619,412 A | 4/1997 | Hapka |
| 5,621,252 A | 4/1997 | Bucknam |
| 5,625,608 A | 4/1997 | Grewe et al. |
| 5,625,668 A | 4/1997 | Loomis et al. |
| 5,627,547 A | 5/1997 | Ramaswamy et al. |
| 5,627,863 A | 5/1997 | Aslanis et al. |
| 5,629,867 A | 5/1997 | Goldman |
| 5,636,276 A | 6/1997 | Brugger |
| 5,638,305 A | 6/1997 | Kobayashi et al. |
| 5,639,305 A | 6/1997 | Brown et al. |
| 5,646,608 A | 7/1997 | Shintani |
| 5,650,929 A | 7/1997 | Potter et al. |
| 5,653,386 A | 8/1997 | Hennessee et al. |
| 5,654,715 A | 8/1997 | Hayashikura et al. |
| 5,657,221 A | 8/1997 | Warman et al. |
| 5,661,652 A | 8/1997 | Sprague et al. |
| 5,664,111 A | 9/1997 | Nahan et al. |
| 5,664,228 A | 9/1997 | Mital |
| 5,666,102 A | 9/1997 | Lahiff |
| 5,670,953 A | 9/1997 | Satoh et al. |
| 5,673,206 A | 9/1997 | Jones, Jr. |
| 5,677,837 A | 10/1997 | Reynolds |
| 5,682,525 A | 10/1997 | Bouve et al. |
| 5,684,490 A | 11/1997 | Young et al. |
| 5,691,695 A | 11/1997 | Lahiff |
| 5,694,120 A | 12/1997 | Indekeu et al. |
| 5,694,389 A | 12/1997 | Seki et al. |
| 5,699,056 A | 12/1997 | Yoshida |
| 5,699,255 A | 12/1997 | Ellis et al. |
| 5,702,165 A | 12/1997 | Koibuchi |
| 5,712,640 A | 1/1998 | Andou et al. |
| 5,715,474 A | 2/1998 | Burke et al. |
| 5,721,827 A | 2/1998 | Logan et al. |
| 5,726,973 A | 3/1998 | Isaksson |
| 5,732,113 A | 3/1998 | Cox et al. |
| 5,732,216 A | 3/1998 | Logan et al. |
| 5,734,973 A | 3/1998 | Honda |
| 5,737,706 A | 4/1998 | Seazholtz |
| 5,742,226 A | 4/1998 | Szabo et al. |
| 5,742,893 A | 4/1998 | Frank |
| 5,752,754 A | 5/1998 | Amitani et al. |
| 5,754,774 A | 5/1998 | Bittinger et al. |
| 5,754,775 A | 5/1998 | Adamson et al. |
| 5,757,359 A | 5/1998 | Morimoto et al. |
| 5,758,311 A | 5/1998 | Tsuji et al. |
| 5,760,742 A | 6/1998 | Branch et al. |
| 5,761,190 A | 6/1998 | Yamauchi et al. |
| 5,771,224 A | 6/1998 | Ishikawa et al. |
| 5,772,534 A | 6/1998 | Dudley |
| 5,774,070 A | 6/1998 | Rendon |
| 5,774,793 A | 6/1998 | Cooper et al. |
| 5,774,827 A | 6/1998 | Smith, Jr. et al. |
| 5,777,394 A | 7/1998 | Arold |
| 5,790,516 A | 8/1998 | Anderson et al. |
| 5,790,973 A | 8/1998 | Blaker et al. |
| 5,790,974 A | 8/1998 | Tognazzini |
| 5,793,980 A | 8/1998 | Glaser et al. |
| 5,794,116 A | 8/1998 | Matsuda |
| 5,794,164 A | 8/1998 | Beckert et al. |
| 5,797,089 A | 8/1998 | Nguyen et al. |
| 5,798,759 A | 8/1998 | Dahl |
| 5,799,063 A | 8/1998 | Krane |
| 5,802,044 A | 9/1998 | Baum et al. |
| 5,806,018 A | 9/1998 | Smith et al. |
| 5,808,566 A | 9/1998 | Behr et al. |
| 5,809,145 A | 9/1998 | Slik et al. |
| 5,812,523 A | 9/1998 | Engstroem et al. |
| 5,812,870 A | 9/1998 | Kikinis et al. |
| 5,815,488 A | 9/1998 | Prodan et al. |
| 5,819,160 A | 10/1998 | Foladare et al. |
| 5,822,098 A | 10/1998 | Morgaine |
| 5,835,732 A | 11/1998 | Kikinis et al. |
| 5,838,734 A | 11/1998 | Wright |
| 5,839,108 A | 11/1998 | Daberko et al. |
| 5,841,808 A | 11/1998 | Rizzo et al. |
| 5,841,979 A | 11/1998 | Schulhof et al. |
| 5,848,064 A | 12/1998 | Cowan |
| 5,852,610 A | 12/1998 | Olaniyan |
| 5,852,775 A | 12/1998 | Hidary |
| 5,862,182 A | 1/1999 | Awater et al. |
| 5,864,305 A | 1/1999 | Rosenquist |
| D405,785 S | 2/1999 | Vuolteenaho |
| 5,867,494 A | 2/1999 | Krishnaswamy et al. |
| 5,870,680 A | 2/1999 | Guerlin et al. |
| 5,870,710 A | 2/1999 | Ozawa et al. |
| 5,875,412 A | 2/1999 | Sulich et al. |
| 5,878,282 A | 3/1999 | Mital |
| 5,884,262 A | 3/1999 | Wise et al. |
| 5,889,759 A | 3/1999 | McGibney |
| 5,889,852 A | 3/1999 | Rosecrans et al. |
| 5,892,536 A | 4/1999 | Logan |
| D409,204 S | 5/1999 | Vuolteenaho |
| 5,900,564 A | 5/1999 | Kurakake |
| 5,908,464 A | 6/1999 | Kishigami et al. |
| 5,910,882 A | 6/1999 | Burrell |
| 5,912,876 A | 6/1999 | H'mimy |
| 5,914,933 A | 6/1999 | Cimini et al. |
| 5,914,941 A | 6/1999 | Janky |
| 5,917,405 A | 6/1999 | Joao |
| 5,918,213 A | 6/1999 | Bernard et al. |
| 5,919,239 A | 7/1999 | Fraker et al. |
| 5,919,246 A | 7/1999 | Waizmann et al. |
| 5,926,624 A | 7/1999 | Katz et al. |
| 5,926,789 A | 7/1999 | Barbara et al. |
| 5,940,438 A | 8/1999 | Poon et al. |
| 5,940,767 A | 8/1999 | Bourgeois et al. |
| 5,943,046 A | 8/1999 | Cave et al. |
| 5,946,326 A | 8/1999 | Rinne |
| 5,949,411 A | 9/1999 | Doerr et al. |
| 5,953,005 A | 9/1999 | Liu |
| 5,953,657 A | 9/1999 | Ghisler |
| 5,953,659 A | 9/1999 | Kotzin et al. |
| 5,956,029 A | 9/1999 | Okada et al. |
| 5,956,651 A | 9/1999 | Willkie |
| 5,963,592 A | 10/1999 | Kim |
| 5,963,916 A | 10/1999 | Kaplan |
| 5,969,283 A | 10/1999 | Looney et al. |
| 5,969,826 A | 10/1999 | Dash et al. |
| 5,974,333 A | 10/1999 | Chen |
| 5,982,298 A | 11/1999 | Lappenbusch et al. |
| 5,987,381 A | 11/1999 | Oshizawa |
| 5,987,394 A | 11/1999 | Takakura et al. |
| 5,990,803 A | 11/1999 | Park |
| 5,991,640 A | 11/1999 | Lilja |
| 5,999,525 A | 12/1999 | Krishnaswamy et al. |
| 5,999,877 A | 12/1999 | Takahashi et al. |

(56) References Cited

U.S. PATENT DOCUMENTS

| | | |
|---|---|---|
| 6,003,013 A | 12/1999 | Boushy et al. |
| 6,006,105 A | 12/1999 | Rostoker et al. |
| 6,006,115 A | 12/1999 | Wingate |
| 6,006,161 A | 12/1999 | Katou |
| 6,007,228 A | 12/1999 | Agarwal |
| 6,009,355 A | 12/1999 | Obradovich et al. |
| 6,009,363 A | 12/1999 | Beckert |
| 6,014,569 A | 1/2000 | Bottum |
| 6,014,689 A | 1/2000 | Budge et al. |
| 6,018,571 A | 1/2000 | Langlois et al. |
| 6,018,654 A | 1/2000 | Valentine et al. |
| 6,021,325 A | 2/2000 | Hall |
| 6,023,232 A | 2/2000 | Eitzenberger |
| 6,023,241 A | 2/2000 | Clapper |
| 6,029,064 A | 2/2000 | Farris et al. |
| 6,032,089 A | 2/2000 | Buckley |
| 6,035,044 A | 3/2000 | Itoi |
| 6,041,023 A | 3/2000 | Lakhansingh |
| 6,044,089 A | 3/2000 | Ferriere |
| 6,047,234 A | 4/2000 | Cherveny et al. |
| 6,047,327 A | 4/2000 | Tso et al. |
| 6,055,478 A | 4/2000 | Heron |
| 6,058,319 A | 5/2000 | Sadler |
| 6,061,306 A | 5/2000 | Buchheim |
| 6,072,859 A | 6/2000 | Kong |
| 6,083,009 A | 7/2000 | Kim et al. |
| 6,084,584 A | 7/2000 | Nahi et al. |
| 6,088,455 A | 7/2000 | Logan |
| 6,088,730 A | 7/2000 | Kato et al. |
| 6,094,587 A | 7/2000 | Armanto et al. |
| 6,097,714 A | 8/2000 | Nagatani et al. |
| 6,100,884 A | 8/2000 | Tomita et al. |
| 6,104,334 A | 8/2000 | Allport |
| 6,112,103 A | 8/2000 | Puthuff |
| 6,114,970 A | 9/2000 | Kirson et al. |
| 6,115,669 A | 9/2000 | Watanabe et al. |
| 6,121,282 A | 9/2000 | Dominianni et al. |
| 6,122,347 A | 9/2000 | Borland |
| 6,122,403 A | 9/2000 | Rhoads |
| 6,128,559 A | 10/2000 | Saitou et al. |
| 6,131,060 A | 10/2000 | Obradovich et al. |
| 6,133,853 A | 10/2000 | Obradovich et al. |
| 6,134,223 A | 10/2000 | Burke |
| 6,138,036 A | 10/2000 | Cinneide |
| 6,144,358 A | 11/2000 | Narayanaswamy et al. |
| 6,144,848 A | 11/2000 | Walsh et al. |
| 6,147,938 A | 11/2000 | Ogawa et al. |
| 6,148,175 A | 11/2000 | Freedland |
| 6,148,261 A | 11/2000 | Obradovich et al. |
| 6,150,925 A | 11/2000 | Casazza |
| 6,151,634 A | 11/2000 | Glaser et al. |
| D435,248 S | 12/2000 | Su |
| 6,157,619 A | 12/2000 | Ozluturk |
| 6,157,725 A | 12/2000 | Becker |
| 6,160,551 A | 12/2000 | Naughton |
| 6,161,071 A | 12/2000 | Shuman et al. |
| 6,163,079 A | 12/2000 | Miyazaki et al. |
| 6,163,711 A | 12/2000 | Juntunen et al. |
| 6,167,251 A | 12/2000 | Segal et al. |
| 6,167,253 A | 12/2000 | Farris et al. |
| 6,169,515 B1 | 1/2001 | Mannings et al. |
| 6,173,316 B1 | 1/2001 | DeBoor et al. |
| 6,175,782 B1 | 1/2001 | Obradovich et al. |
| 6,175,789 B1 | 1/2001 | Beckert et al. |
| 6,177,950 B1 | 1/2001 | Robb |
| 6,178,230 B1 | 1/2001 | Borland |
| 6,178,403 B1 | 1/2001 | Detlef |
| 6,178,514 B1 | 1/2001 | Wood |
| 6,182,006 B1 | 1/2001 | Meek |
| 6,182,126 B1 | 1/2001 | Nathan et al. |
| 6,185,491 B1 | 2/2001 | Gray et al. |
| 6,188,717 B1 | 2/2001 | Kaiser et al. |
| 6,189,057 B1 | 2/2001 | Schwanz et al. |
| 6,192,340 B1 | 2/2001 | Abecassis |
| 6,196,846 B1 | 3/2001 | Berger et al. |
| 6,199,076 B1 | 3/2001 | Logan et al. |
| 6,201,540 B1 | 3/2001 | Gallup et al. |
| 6,202,008 B1 | 3/2001 | Beckert et al. |
| 6,208,874 B1 | 3/2001 | Rudisill et al. |
| 6,212,359 B1 | 4/2001 | Knox |
| 6,212,555 B1 | 4/2001 | Brooks, Jr. et al. |
| 6,225,984 B1 | 5/2001 | Crawford |
| 6,230,322 B1 | 5/2001 | Saib et al. |
| 6,232,539 B1 | 5/2001 | Looney et al. |
| 6,233,430 B1 | 5/2001 | Helferich |
| 6,236,832 B1 | 5/2001 | Ito |
| 6,236,918 B1 | 5/2001 | Sonoda et al. |
| 6,240,297 B1 | 5/2001 | Jadoul |
| 6,240,347 B1 | 5/2001 | Everhart et al. |
| 6,243,725 B1 | 6/2001 | Hempleman et al. |
| 6,246,672 B1 | 6/2001 | Lumelsky |
| 6,246,935 B1 | 6/2001 | Buckley |
| 6,247,130 B1 | 6/2001 | Fritsch |
| 6,248,946 B1 | 6/2001 | Dwek |
| 6,253,061 B1 | 6/2001 | Helferich |
| 6,253,122 B1 | 6/2001 | Razavi et al. |
| 6,255,961 B1 | 7/2001 | Van Ryzin et al. |
| 6,259,892 B1 | 7/2001 | Helferich |
| 6,262,724 B1 | 7/2001 | Crow et al. |
| 6,275,231 B1 | 8/2001 | Obradovich |
| 6,278,531 B1 | 8/2001 | Tesavis |
| 6,278,676 B1 | 8/2001 | Anderson et al. |
| 6,278,884 B1 | 8/2001 | Kim |
| 6,278,976 B1 | 8/2001 | Kochian |
| 6,282,270 B1 | 8/2001 | Porter |
| 6,282,464 B1 | 8/2001 | Obradovich |
| 6,289,382 B1 | 9/2001 | Bowman-Amuah |
| 6,291,756 B1 | 9/2001 | Urbanek |
| 6,292,440 B1 | 9/2001 | Lee |
| 6,292,562 B1 | 9/2001 | Badarneh |
| 6,292,743 B1 | 9/2001 | Pu et al. |
| 6,301,116 B1 | 10/2001 | Tamura |
| 6,301,339 B1 | 10/2001 | Staples et al. |
| 6,314,094 B1 | 11/2001 | Boys |
| 6,314,326 B1 | 11/2001 | Fuchu |
| 6,317,784 B1 | 11/2001 | Mackintosh |
| D451,502 S | 12/2001 | Vuolteenaho et al. |
| 6,330,247 B1 | 12/2001 | Chang |
| 6,332,139 B1 | 12/2001 | Kaneko et al. |
| 6,332,163 B1 | 12/2001 | Bowman-Amuah |
| 6,335,927 B1 | 1/2002 | Elliott et al. |
| 6,335,973 B1 | 1/2002 | Case |
| 6,338,044 B1 | 1/2002 | Cook et al. |
| 6,339,706 B1 | 1/2002 | Tillgren et al. |
| 6,339,832 B1 | 1/2002 | Bowman-Amuah |
| 6,344,861 B1 | 2/2002 | Naughton et al. |
| 6,347,112 B1 | 2/2002 | Lattard et al. |
| 6,349,352 B1 | 2/2002 | Lea |
| D454,341 S | 3/2002 | Vuolteenaho et al. |
| D454,868 S | 3/2002 | Vuolteenaho et al. |
| 6,353,637 B1 | 3/2002 | Mansour et al. |
| 6,363,240 B2 | 3/2002 | Ito |
| 6,366,785 B2 | 4/2002 | Saarela et al. |
| 6,366,953 B2 | 4/2002 | Inoue |
| 6,367,019 B1 | 4/2002 | Ansell et al. |
| 6,373,501 B1 | 4/2002 | Fiero |
| 6,377,825 B1 | 4/2002 | Kennedy et al. |
| 6,381,452 B1 | 4/2002 | Tien et al. |
| 6,385,190 B1 | 5/2002 | Malkamaki et al. |
| 6,385,306 B1 | 5/2002 | Baxter, Jr. |
| 6,389,463 B2 | 5/2002 | Bolas |
| 6,389,467 B1 | 5/2002 | Eyal |
| 6,396,164 B1 | 5/2002 | Barnea et al. |
| 6,396,769 B1 | 5/2002 | Polany |
| 6,400,804 B1 | 6/2002 | Bilder |
| 6,401,085 B1 | 6/2002 | Gershman et al. |
| 6,405,049 B2 | 6/2002 | Herrod et al. |
| 6,405,256 B1 | 6/2002 | Lin et al. |
| 6,407,750 B1 | 6/2002 | Gioscia et al. |
| 6,418,138 B1 | 7/2002 | Cerf et al. |
| 6,418,330 B1 | 7/2002 | Lee |
| 6,418,421 B1 | 7/2002 | Hurtado et al. |
| 6,420,975 B1 | 7/2002 | DeLine et al. |
| 6,421,305 B1 | 7/2002 | Gioscia et al. |

(56) References Cited

U.S. PATENT DOCUMENTS

| | | |
|---|---|---|
| 6,422,941 B1 | 7/2002 | Thorner et al. |
| 6,425,018 B1 | 7/2002 | Kaganas et al. |
| 6,434,459 B2 | 8/2002 | Wong et al. |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,446,080 B1 | 9/2002 | Van Ryzin et al. |
| 6,446,127 B1 | 9/2002 | Schuster et al. |
| 6,449,541 B1 | 9/2002 | Goldberg et al. |
| 6,453,281 B1 | 9/2002 | Walters |
| 6,456,892 B1 | 9/2002 | Dara-Abrams et al. |
| 6,460,076 B1 | 10/2002 | Srinivasan |
| 6,470,030 B1 | 10/2002 | Park et al. |
| 6,473,630 B1 | 10/2002 | Baranowski et al. |
| 6,476,825 B1 | 11/2002 | Croy |
| 6,477,580 B1 | 11/2002 | Bowman-Amuah |
| 6,477,665 B1 | 11/2002 | Bowman-Amuah |
| 6,487,663 B1 | 11/2002 | Jaisimha |
| 6,493,546 B2 | 12/2002 | Patsiokas |
| 6,496,205 B1 | 12/2002 | White et al. |
| 6,496,692 B1 | 12/2002 | Shanahan |
| 6,496,802 B1 | 12/2002 | Van Zoest et al. |
| 6,496,850 B1 | 12/2002 | Bowman-Amuah |
| 6,501,832 B1 | 12/2002 | Saylor et al. |
| 6,502,194 B1 | 12/2002 | Berman et al. |
| 6,502,213 B1 | 12/2002 | Bowman-Amuah |
| 6,505,160 B1 | 1/2003 | Levy et al. |
| 6,507,727 B1 | 1/2003 | Henrick |
| 6,507,762 B1 | 1/2003 | Amro et al. |
| 6,509,716 B2 | 1/2003 | Yi |
| 6,510,210 B1 | 1/2003 | Baughan |
| 6,510,325 B1 | 1/2003 | Mack, II et al. |
| 6,516,466 B1 | 2/2003 | Jackson |
| 6,522,700 B1 | 2/2003 | Zimmermann et al. |
| 6,526,264 B2 | 2/2003 | Sugar et al. |
| 6,526,335 B1 | 2/2003 | Treyz et al. |
| 6,529,909 B1 | 3/2003 | Bowman-Amuah |
| 6,529,948 B1 | 3/2003 | Bowman-Amuah |
| 6,539,065 B1 | 3/2003 | Furukawa |
| 6,539,396 B1 | 3/2003 | Bowman-Amuah |
| 6,542,076 B1 | 4/2003 | Joao |
| 6,542,758 B1 | 4/2003 | Chennakeshu et al. |
| 6,546,241 B2 | 4/2003 | Iyengar et al. |
| 6,549,942 B1 | 4/2003 | Janky et al. |
| 6,549,949 B1 | 4/2003 | Bowman-Amuah |
| 6,550,057 B1 | 4/2003 | Bowman-Amuah |
| 6,559,773 B1 | 5/2003 | Berry |
| 6,571,282 B1 | 5/2003 | Bowman-Amuah |
| 6,577,311 B1 | 6/2003 | Crosby et al. |
| 6,578,068 B1 | 6/2003 | Bowman-Amuah |
| 6,584,403 B2 | 6/2003 | Bunn |
| 6,587,127 B1 | 7/2003 | Leeke et al. |
| 6,587,684 B1 | 7/2003 | Hsu |
| 6,587,835 B1 | 7/2003 | Treyz et al. |
| 6,591,085 B1 | 7/2003 | Grady |
| 6,594,723 B1 | 7/2003 | Chapman et al. |
| 6,594,740 B1 | 7/2003 | Fukuda |
| 6,594,774 B1 | 7/2003 | Chapman et al. |
| 6,601,192 B1 | 7/2003 | Bowman-Amuah |
| 6,601,234 B1 | 7/2003 | Bowman-Amuah |
| 6,606,082 B1 | 8/2003 | Zuberec et al. |
| 6,606,660 B1 | 8/2003 | Bowman-Amuah |
| 6,606,744 B1 | 8/2003 | Mikurak |
| 6,608,832 B2 | 8/2003 | Forslow |
| 6,608,993 B1 | 8/2003 | Ficco |
| 6,609,039 B1 | 8/2003 | Schoen |
| 6,609,105 B2 | 8/2003 | Van Zoest et al. |
| 6,615,199 B1 | 9/2003 | Bowman-Amuah |
| 6,615,253 B1 | 9/2003 | Bowman-Amuah |
| 6,618,039 B1 | 9/2003 | Grant et al. |
| 6,622,083 B1 | 9/2003 | Knockheart et al. |
| 6,629,000 B1 | 9/2003 | Moon et al. |
| 6,629,197 B1 | 9/2003 | Bhogal et al. |
| 6,633,314 B1 | 10/2003 | Tuli |
| 6,633,616 B2 | 10/2003 | Crawford |
| 6,633,932 B1 | 10/2003 | Bork et al. |
| 6,636,242 B2 | 10/2003 | Bowman-Amuah |
| 6,636,586 B1 | 10/2003 | Hwang |
| 6,639,584 B1 | 10/2003 | Li |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,640,306 B1 | 10/2003 | Tone et al. |
| 6,654,367 B1 | 11/2003 | Kaufman |
| 6,658,247 B1 | 12/2003 | Saito |
| 6,671,567 B1 | 12/2003 | Dwyer et al. |
| 6,671,715 B1 | 12/2003 | Langseth et al. |
| 6,671,732 B1 | 12/2003 | Weiner |
| 6,671,745 B1 | 12/2003 | Mathur et al. |
| 6,671,818 B1 | 12/2003 | Mikurak |
| 6,675,201 B1 | 1/2004 | Parkkinen |
| 6,675,233 B1 | 1/2004 | Du |
| 6,678,215 B1 | 1/2004 | Treyz |
| 6,694,200 B1 | 2/2004 | Naim |
| 6,697,824 B1 | 2/2004 | Bowman-Amuah |
| 6,697,944 B1 | 2/2004 | Jones et al. |
| 6,701,159 B1 | 3/2004 | Powell |
| 6,704,394 B1 | 3/2004 | Kambhatia et al. |
| 6,707,889 B1 | 3/2004 | Saylor et al. |
| 6,708,086 B2 | 3/2004 | Richard |
| 6,715,145 B1 | 3/2004 | Bowman-Amuah |
| 6,721,337 B1 | 4/2004 | Kroeger et al. |
| 6,721,489 B1 | 4/2004 | Benyamin et al. |
| 6,721,710 B1 | 4/2004 | Lueck |
| 6,721,741 B1 | 4/2004 | Eyal |
| 6,725,022 B1 | 4/2004 | Clayton et al. |
| 6,728,531 B1 | 4/2004 | Lee et al. |
| 6,731,625 B1 | 5/2004 | Eastep et al. |
| 6,741,871 B1 | 5/2004 | Silverbrook et al. |
| 6,741,980 B1 | 5/2004 | Langseth et al. |
| 6,742,015 B1 | 5/2004 | Bowman-Amuah |
| 6,748,427 B2 | 6/2004 | Drosset |
| 6,751,586 B1 | 6/2004 | Okuno |
| 6,754,181 B1 | 6/2004 | Elliott et al. |
| 6,760,916 B2 | 7/2004 | Holtz et al. |
| 6,772,212 B1 | 8/2004 | Lau et al. |
| 6,788,528 B2 | 9/2004 | Enners et al. |
| 6,788,982 B1 | 9/2004 | Lapstun |
| 6,791,907 B2 | 9/2004 | Berhan |
| 6,792,086 B1 | 9/2004 | Saylor et al. |
| 6,792,263 B1 | 9/2004 | Kite |
| 6,792,615 B1 | 9/2004 | Rowe et al. |
| 6,798,838 B1 | 9/2004 | Ngo |
| 6,823,225 B1 | 11/2004 | Sass |
| 6,823,255 B2 | 11/2004 | Ahrens et al. |
| 6,832,316 B1 | 12/2004 | Sibert |
| 6,842,906 B1 | 1/2005 | Bowman-Amuah |
| 6,845,398 B1 | 1/2005 | Galensky et al. |
| 6,862,357 B1 | 3/2005 | Albus et al. |
| 6,879,865 B1 | 4/2005 | Gladwin et al. |
| 6,888,927 B1 | 5/2005 | Cruickshank et al. |
| 6,888,929 B1 | 5/2005 | Saylor et al. |
| 6,892,067 B1 | 5/2005 | Sharma et al. |
| 6,901,067 B1 | 5/2005 | Kalavade |
| 6,901,270 B1 | 5/2005 | Beach |
| 6,904,449 B1 | 6/2005 | Quinones |
| 6,907,112 B1 | 6/2005 | Guedalia et al. |
| 6,909,708 B1 | 6/2005 | Krishnaswamy et al. |
| 6,912,241 B2 | 6/2005 | Giannakis et al. |
| 6,915,272 B1 | 7/2005 | Zilliacus et al. |
| 6,917,923 B1 | 7/2005 | Dimenstein |
| 6,928,468 B2 | 8/2005 | Leermakers |
| 6,937,558 B2 | 8/2005 | Wakutsu |
| 6,947,738 B2 | 9/2005 | Skog et al. |
| 6,952,685 B1 | 10/2005 | Hunter et al. |
| 6,956,833 B1 | 10/2005 | Yukie |
| 6,963,783 B1 | 11/2005 | Bi et al. |
| 6,963,784 B1 | 11/2005 | Gibbs |
| 6,970,915 B1 | 11/2005 | Partovi |
| 6,973,067 B1 | 12/2005 | Haartsen et al. |
| 6,975,612 B1 | 12/2005 | Razavi |
| 6,975,835 B1 | 12/2005 | Lake et al. |
| 6,978,127 B1 | 12/2005 | Bulthuis et al. |

(56) References Cited

U.S. PATENT DOCUMENTS

| | | |
|---|---|---|
| 6,985,432 B1 | 1/2006 | Hadad |
| 6,985,932 B1 | 1/2006 | Glaser et al. |
| 6,990,208 B1 | 1/2006 | Lau et al. |
| 6,990,334 B1 | 1/2006 | Ito |
| 6,993,283 B1 | 1/2006 | Ka Ming et al. |
| 7,010,263 B1 | 3/2006 | Patsiokas |
| 7,010,579 B1 | 3/2006 | Batcher |
| 7,013,251 B1 | 3/2006 | Nace |
| 7,020,704 B1 | 3/2006 | Lipscomb et al. |
| 7,030,910 B2 | 4/2006 | Ishizaka et al. |
| 7,031,453 B1 | 4/2006 | Busardo |
| 7,058,376 B2 | 6/2006 | Logan et al. |
| 7,065,342 B1 | 6/2006 | Rolf |
| 7,068,593 B2 | 6/2006 | Cho et al. |
| 7,076,202 B1 | 7/2006 | Billmaier |
| 7,085,377 B1 | 8/2006 | Norr |
| 7,085,710 B1 | 8/2006 | Beckert et al. |
| 7,092,431 B2 | 8/2006 | Maeda et al. |
| 7,099,694 B1 | 8/2006 | Aramaki et al. |
| 7,103,668 B1 | 9/2006 | Corley et al. |
| 7,120,462 B2 | 10/2006 | Kumar |
| 7,123,936 B1 | 10/2006 | Rydbeck et al. |
| 7,124,101 B1 | 10/2006 | Mikurak |
| 7,130,608 B2 | 10/2006 | Hollstrom et al. |
| 7,130,807 B1 | 10/2006 | Mikurak |
| 7,139,626 B2 | 11/2006 | Kataoka et al. |
| 7,145,898 B1 | 12/2006 | Elliott |
| 7,149,511 B1 | 12/2006 | Bachner, III et al. |
| 7,149,543 B2 | 12/2006 | Kumar, II |
| 7,149,772 B1 | 12/2006 | Kalavade |
| 7,181,297 B1 | 2/2007 | Pluvinage et al. |
| 7,187,947 B1 | 3/2007 | White et al. |
| 7,200,357 B2 | 4/2007 | Janik et al. |
| 7,209,943 B1 | 4/2007 | Ching et al. |
| 7,219,123 B1 | 5/2007 | Fiechter et al. |
| 7,224,964 B2 | 5/2007 | Souissi et al. |
| 7,257,395 B2 | 8/2007 | Shanahan |
| 7,281,899 B1 | 10/2007 | Bucher et al. |
| 7,319,856 B1 | 1/2008 | Cyrankiewicz |
| 7,321,783 B2 | 1/2008 | Kim |
| 7,321,923 B1 | 1/2008 | Rosenberg et al. |
| 7,324,833 B2 | 1/2008 | White et al. |
| 7,339,882 B2 | 3/2008 | Schaefer et al. |
| 7,339,993 B1 | 3/2008 | Brooks |
| 7,343,414 B2 | 3/2008 | Lipscomb et al. |
| 7,346,687 B2 | 3/2008 | Lipscomb et al. |
| 7,349,532 B2 | 3/2008 | Henderson |
| 7,379,541 B2 | 5/2008 | Iggulden et al. |
| 7,386,121 B1 | 6/2008 | Rivas |
| 7,400,937 B2 | 7/2008 | Lapstun et al. |
| 7,437,485 B1 | 10/2008 | Kruglikov et al. |
| 7,440,772 B2 | 10/2008 | White et al. |
| 7,444,288 B2 | 10/2008 | Archibald et al. |
| 7,444,353 B1 | 10/2008 | Chen |
| 7,453,951 B2 | 11/2008 | Laurent et al. |
| 7,460,465 B2 | 12/2008 | Bolinth et al. |
| 7,496,947 B1 | 2/2009 | Meyers |
| 7,548,875 B2 | 6/2009 | Mikkelsen et al. |
| 7,549,007 B1 | 6/2009 | Smith et al. |
| 7,562,392 B1 | 7/2009 | Rhoads et al. |
| 7,733,939 B2 | 6/2010 | Trachewsky |
| 7,827,581 B1 | 11/2010 | Eiger |
| 7,870,088 B1 | 1/2011 | Chen et al. |
| 7,899,710 B1 | 3/2011 | Walker |
| 7,925,897 B2 | 4/2011 | Nair |
| 7,991,493 B2 | 8/2011 | Lapstun et al. |
| 8,254,474 B2 | 8/2012 | Jallon |
| 8,356,954 B2 | 1/2013 | Koch |
| 8,385,912 B2 | 2/2013 | Rolf |
| 2001/0000505 A1 | 4/2001 | Segal et al. |
| 2001/0009846 A1 | 7/2001 | Loeuillet |
| 2001/0014616 A1 | 8/2001 | Matsuda et al. |
| 2001/0016487 A1 | 8/2001 | Haitt, Jr. |
| 2001/0024965 A1 | 9/2001 | Hayashi |
| 2001/0026609 A1 | 10/2001 | Weinstein et al. |
| 2001/0029192 A1 | 10/2001 | Oh |
| 2001/0033623 A1 | 10/2001 | Hosur |
| 2001/0034803 A1 | 10/2001 | Sorek et al. |
| 2001/0037393 A1 | 11/2001 | Park et al. |
| 2001/0038382 A1 | 11/2001 | Griffin et al. |
| 2001/0041588 A1 | 11/2001 | Hollstrom et al. |
| 2001/0042107 A1 | 11/2001 | Palm |
| 2001/0043684 A1 | 11/2001 | Guedalia et al. |
| 2001/0044747 A1 | 11/2001 | Ramachandran et al. |
| 2001/0047424 A1 | 11/2001 | Alastalo et al. |
| 2001/0049262 A1 | 12/2001 | Lehtonen |
| 2001/0049566 A1 | 12/2001 | Kim |
| 2001/0050991 A1 | 12/2001 | Eves |
| 2001/0051926 A1 | 12/2001 | Wang |
| 2001/0055371 A1 | 12/2001 | Baxter |
| 2002/0002035 A1 | 1/2002 | Sim et al. |
| 2002/0002627 A1 | 1/2002 | Stead et al. |
| 2002/0010740 A1 | 1/2002 | Kikuchi et al. |
| 2002/0010759 A1 | 1/2002 | Hitson |
| 2002/0023028 A1 | 2/2002 | Quarendon et al. |
| 2002/0026442 A1 | 2/2002 | Lipscomb et al. |
| 2002/0026867 A1 | 3/2002 | Hasegawa et al. |
| 2002/0038459 A1 | 3/2002 | Talmola et al. |
| 2002/0045441 A1 | 4/2002 | Ralston et al. |
| 2002/0046084 A1 | 4/2002 | Steele et al. |
| 2002/0058475 A1 | 5/2002 | Patsiokas |
| 2002/0060701 A1 | 5/2002 | Naughton et al. |
| 2002/0065047 A1 | 5/2002 | Moose |
| 2002/0072818 A1 | 6/2002 | Moon et al. |
| 2002/0077082 A1 | 6/2002 | Cruickshank |
| 2002/0102987 A1 | 8/2002 | Souisse et al. |
| 2002/0106074 A1 | 8/2002 | Elliott |
| 2002/0112078 A1 | 8/2002 | Yach |
| 2002/0116082 A1 | 8/2002 | Gudorf |
| 2002/0144271 A1 | 10/2002 | Behagen et al. |
| 2002/0145971 A1 | 10/2002 | Cho et al. |
| 2002/0159533 A1 | 10/2002 | Crawford |
| 2002/0164973 A1 | 11/2002 | Janik |
| 2002/0175665 A1 | 11/2002 | O'Grady et al. |
| 2002/0193094 A1 | 12/2002 | Lawless et al. |
| 2002/0198044 A1 | 12/2002 | Walker |
| 2003/0003908 A1 | 1/2003 | McGrew et al. |
| 2003/0008646 A1 | 1/2003 | Shanahan |
| 2003/0105718 A1 | 6/2003 | Hurtado et al. |
| 2003/0115041 A1* | 6/2003 | Chen et al. .................. 704/200.1 |
| 2003/0126335 A1 | 7/2003 | Silvester |
| 2003/0163486 A1 | 8/2003 | Van Der Meulen |
| 2003/0176206 A1 | 9/2003 | Taniguchi et al. |
| 2003/0177255 A1 | 9/2003 | Yun |
| 2003/0215102 A1 | 11/2003 | Marlowe |
| 2004/0078274 A1 | 4/2004 | Aarnio |
| 2004/0151327 A1 | 8/2004 | Marlow |
| 2004/0201701 A1 | 10/2004 | Takagi |
| 2004/0210765 A1 | 10/2004 | Erickson |
| 2004/0214525 A1 | 10/2004 | Ahn et al. |
| 2004/0214551 A1 | 10/2004 | Kim |
| 2005/0004875 A1* | 1/2005 | Kontio et al. .................. 705/52 |
| 2005/0010633 A1 | 1/2005 | Shanahan |
| 2005/0010833 A1 | 1/2005 | Suen |
| 2005/0049002 A1 | 3/2005 | White et al. |
| 2005/0054379 A1 | 3/2005 | Cao et al. |
| 2005/0096018 A1 | 5/2005 | White et al. |
| 2005/0150945 A1 | 7/2005 | Choi |
| 2005/0177416 A1 | 8/2005 | Linden |
| 2005/0282600 A1 | 12/2005 | Paradice |
| 2006/0039263 A1 | 2/2006 | Trotabas |
| 2006/0080741 A1 | 4/2006 | Nair |
| 2006/0094349 A1 | 5/2006 | Slesak et al. |
| 2006/0105804 A1 | 5/2006 | Kumar |
| 2006/0168451 A1 | 7/2006 | Ishibashi |
| 2006/0206493 A1 | 9/2006 | Lipscomb et al. |
| 2007/0150963 A1 | 6/2007 | Lee et al. |
| 2009/0234914 A1 | 9/2009 | Mikkelsen et al. |
| 2010/0005472 A1 | 1/2010 | Krishnaraj et al. |
| 2010/0100424 A1 | 4/2010 | Buchanan et al. |

(56) References Cited

U.S. PATENT DOCUMENTS

| | | |
|---|---|---|
| 2011/0272541 A1 | 11/2011 | Wojtowicz et al. |
| 2014/0044020 A1 | 2/2014 | Mikkelsen et al. |
| 2014/0045468 A1 | 2/2014 | Mikkelsen et al. |

FOREIGN PATENT DOCUMENTS

| | | |
|---|---|---|
| DE | 4431070 | 3/1996 |
| DE | 19651308 | 7/1998 |
| DE | 10205641 | 8/2003 |
| DE | 20200401355 | 12/2004 |
| EP | 0569343 | 10/1993 |
| EP | 0569243 | 11/1993 |
| EP | 0661676 | 7/1995 |
| EP | 0675341 | 10/1995 |
| EP | 0744839 | 11/1996 |
| EP | 0771686 | 5/1997 |
| EP | 0851638 | 7/1998 |
| EP | 0895389 | 2/1999 |
| EP | 0918408 | 5/1999 |
| EP | 0920016 | 6/1999 |
| EP | 0929202 | 7/1999 |
| EP | 0961448 | 12/1999 |
| EP | 0898710 | 3/2000 |
| EP | 0982732 | 3/2000 |
| EP | 984584 | 3/2000 |
| EP | 1049312 A2 | 4/2000 |
| EP | 1146674 | 10/2001 |
| FR | 2758031 | 12/1997 |
| GB | 2324935 | 11/1998 |
| HU | 0001298 | 8/2000 |
| JP | 59085599 | 5/1984 |
| JP | 63136828 | 6/1988 |
| JP | 1018712 | 9/1989 |
| JP | 2301330 | 12/1990 |
| JP | H4261576 | 9/1992 |
| JP | 5077679 | 3/1993 |
| JP | 5294250 | 11/1993 |
| JP | 6187597 | 7/1994 |
| JP | 6289118 | 10/1994 |
| JP | 6294659 | 10/1994 |
| JP | 7036382 | 2/1995 |
| JP | 7099486 | 4/1995 |
| JP | 07129895 | 5/1995 |
| JP | 07146155 | 6/1995 |
| JP | 7262493 | 10/1995 |
| JP | 7270171 | 10/1995 |
| JP | H08-6875 | 1/1996 |
| JP | 879814 | 3/1996 |
| JP | 8-110231 | 4/1996 |
| JP | 9-61514 | 3/1997 |
| JP | 09149099 | 6/1997 |
| JP | 10-103966 | 4/1998 |
| JP | 10-143349 | 5/1998 |
| JP | 10-173737 | 6/1998 |
| JP | 10149182 | 6/1998 |
| JP | 10150505 | 6/1998 |
| JP | 10210000 A | 8/1998 |
| JP | 11-68685 | 3/1999 |
| JP | 11-73192 | 3/1999 |
| JP | 1168685 | 3/1999 |
| JP | 2901445 | 3/1999 |
| JP | 3056721 | 3/1999 |
| JP | 11-96735 | 4/1999 |
| JP | 11113068 | 4/1999 |
| JP | 11-143791 | 5/1999 |
| JP | H11-164058 | 6/1999 |
| JP | 11-219580 | 8/1999 |
| JP | 11-242686 | 9/1999 |
| JP | H11-288558 | 10/1999 |
| JP | 11-317061 | 11/1999 |
| JP | 2000-66974 | 3/2000 |
| JP | 2000-134332 | 5/2000 |
| JP | 2001-128280 | 5/2001 |
| JP | 3890692 | 12/2006 |
| JP | 2007207257 | 8/2007 |
| KR | 0142256 | 3/1998 |
| KR | 201999022030 | 6/1999 |
| KR | 1999-0073234 | 10/1999 |
| KR | 100242563 | 11/1999 |
| KR | 2000-0001465 | 1/2000 |
| KR | 20000001465 | 1/2000 |
| KR | 2000-0036680 | 7/2000 |
| KR | 20010009302 | 2/2001 |
| KR | 20010028354 | 4/2001 |
| KR | 10-0356742 | 10/2002 |
| WO | WO9418763 | 8/1994 |
| WO | WO9534958 | 12/1995 |
| WO | WO9602991 | 2/1996 |
| WO | WO9604724 | 2/1996 |
| WO | WO9607110 | 3/1996 |
| WO | WO 96/36141 | 11/1996 |
| WO | WO9713657 | 4/1997 |
| WO | WO9730531 | 8/1997 |
| WO | WO9819480 | 5/1998 |
| WO | WO9821672 | 5/1998 |
| WO | WO9833102 | 7/1998 |
| WO | WO9847252 | 10/1998 |
| WO | WO9906910 | 2/1999 |
| WO | WO9912152 | 3/1999 |
| WO | WO9918518 | 4/1999 |
| WO | WO9923856 | 5/1999 |
| WO | WO9928897 | 6/1999 |
| WO | WO9935009 | 7/1999 |
| WO | WO9938266 | 7/1999 |
| WO | WO9939466 | 8/1999 |
| WO | WO9943136 | 8/1999 |
| WO | WO9956424 | 11/1999 |
| WO | WO0007849 | 2/2000 |
| WO | WO0021275 | 4/2000 |
| WO | WO0038340 | 6/2000 |
| WO | WO0054124 | 9/2000 |
| WO | WO0054187 | 9/2000 |
| WO | WO0054462 | 9/2000 |
| WO | WO0060450 | 10/2000 |
| WO | WO0064137 | 10/2000 |
| WO | WO0070523 | 11/2000 |
| WO | WO0077621 | 12/2000 |
| WO | WO0079372 | 12/2000 |
| WO | WO0105109 | 1/2001 |
| WO | WO 01/39476 | 5/2001 |
| WO | WO0139473 | 5/2001 |
| WO | WO0139476 | 5/2001 |
| WO | WO 01/69894 | 9/2001 |
| WO | WO02078280 | 10/2002 |
| WO | WO02096137 | 11/2002 |
| WO | WO 03/003235 | 1/2003 |

OTHER PUBLICATIONS

Richard Menta, "1200 Song MP3 Portable is a Milestone Player," Jan. 11, 2000, pp. 1-3.

U.S. Appl. No. 10/947,754, filed Sep. 23, 2004.

U.S. Appl. No. 60/167,179, filed Nov. 23, 1999.

Yamaha Corporation, "Yamaha Music Sequencer, QY70, Owner's Manual," Chapters 1-11, 1997.

Multi Technology Equipment, "Neo Car Jukebox, Installation and Instruction Manual," pp. 1-30. 2013.

Riocar dot org, "rio car dot org Greek Guide," empeg car Mk. 1, Jul. 16, 2010, 4 pages.

Hewlett Packard, User's Guide, HP Jornada 420, Palm-Size PC, pp. 1-75. 1999.

Cai, Jian, et al., "General Packet Radio Service in GSM," IEEE Communications Magazine, Oct. 1997.

RealNetworks, "RealPlayer Plus G2 Manual," Copyright 1998-1999.

Rathbone, Andy, "MP3 for Dummies," IDG Books Worldwide, Copyright 1999.

Nokia, "Quick Guide—Accessories Guide," Copyright 1999.

MusicMatch Internet Music System, "MusicMatch Jukebox Reviews," Mar. 4, 2000, May 8, 1999, Aug. 29, 1999, May 8, 1999, Feb. 4, 1997, Aug. 12, 1999, Jan. 24, 2000, Jan. 25, 2000, Feb. 22, 2000, pp. 1-32.

(56) References Cited

OTHER PUBLICATIONS

Compaq, Intel, Microsoft, NEC, "Universal Serial Bus Specification," Revision 1.1, Sep. 23, 1998.
The United States Patent and Trademark Office, Office Action Mailed Nov. 9, 2007 in related U.S. Appl. No. 10/947,755.
Sony Corporation, Sony Portable MiniDisc Recorder MZ-R90/MZ-R91 Operating Instructions, Doc. No. 3-867-571-22(1), 1999, pp. 1-55.
Empeg Car User Guide, 1999, pp. 1-19.
Empeg Car User Guide (2000) pp. 1-48.
Crowe, Mike. Empeg Car Beta 10a, Mar. 25, 2000, 3 pages.
Emplode Help, (date unknown, contended by defendant Apple Corp. to be prior art under one or more of 35 U.S.C. 102 (a), (b), (f) and (g)) 25 pages.
"MP3 Portable Player Goes Elite" The Mac Observer, Nov. 17, 1999, 3 pages.
"MP3 in Your Car Has Arrived" (date unknown, contended by defendant Apple Corp. to be prior art under one or more of 35 U.S.C. 102 (a), (b), (f) and (g)) 1 page.
Photos from Comdex Fall 1999, Nov. 1999, 9 pages.
Photos from LinuxWorld Expo, Winter 1999, Mar. 1-4, 1999, 22 pages.
Craig Knudsen, "MP3 Linux Players," Linux Journal, Jul. 1, 1999, pp. 1-3.
Visteon: For Your Listening Pleasure—Any Music, Any Time, Anywhere, Presswire, Jan. 5, 2000, 1 page.
Photographs in email to Hugo Fiennes, Sep. 22, 1999, 4 pages.
IEEE Standard 802.11b, 1999 Edition (Wireless LAN Medium Access Control and Physical Layer Specifications: Higher-Speed Physical Layer Extension in the 2.4 GHz Band) Sep. 16, 1999, 96 pages.
RealPlayer Plus G2 Manual, 1999, pp. 1-81.
IEEE Standard 802.11a, 1999 Edition (Wireless LAN Medium Access Control and Physical Layer Specifications: High-Speed Physical Layer in the 5GHz Band), 1999, 91 pages.
Rod Underhill & Nat Gertler, "The Complete Idiot's Guide to MP3: Music on the Internet," 1999, 44 pages.
Bill Mann, "I Want My MP3! How to Download, Rip, & Play Digital Music," McGraw-Hill 2000, 175 pages.
IEEE Standard 802.11, 1997 Edition (Wireless LAN Medium Access Control and Physical Layer Specifications), 1997, pp. 1-145.
IBM Wireless Modem for Cellular/CDPD—Quick Reference, Oct. 1995, pp. 1-20.
Creative Sound Blaster Live! Platinum product, documentation, and software: Creative Technology Ltd., Creative Sound Blaster Live! Platinum Getting Started, Sep. 1999, 93 pages.
Psa play Getting Started Guide, (date unknown, contended by defendant Apple Corp. to be prior art under one or more of 35 U.S.C. 102 (a), (b), (f) and (g)), pp. 1-16.
Psa play Getting Started Guide, 2000, pp. 1-16.
Rio 800 User Guide, 2001, pp. 1-38.
Rio 800 Digital Audio Player—Getting Started, 2000, pp. 1-19.
Rio 600 Getting Started Guide, 2001, pp. 1-169.
Rio 600 User Guide, Mar. 2001, pp. 1-38.
The Rio 500 Getting Started Guide, 1999, pp. 1-2.
Sony VAIO Notebook Computer User Guide PCG-731/PCG-735, 1998, pp. 1-131.
Sony VAIO Notebook Computer User Guide PCG-812, 1998, pp. 1-144.
Sony VAIO Notebook Computer User Guide PCG-838, 1999, pp. 1-121.
Sony Service Manual PCG-731/735/737, 1997, pp. 1-22.
Sony Service Manual PCG-723/729, 1998, pp. 1-22.
Sony Service Manual PCG-812/818, 1998, pp. 1-22.
Sony Service Manual PCG-838, 1999, pp. 1-22.
Digital Download Provider Musicmaker.com Partners With Download Directory Listen.com; Offers Nearly 100,000 Downloadable Tracks Via the Online Directory, PR Newswire, Sep. 15, 1999, pp. 1-3.
MP3.com prospectus, Jul. 21, 1999, pp. 1-81.
Ana Orubeondo, "Trim AirCard 300 Eases Power Demands," InfoWorld, vol. 21, Issue 48. Nov. 29, 1999. p. 46 & 50.
Net Music Firms to Tap Public Market, Billboard. Jul. 17, 1999. pp. 1-2.
Cellular for Notebook PCs. CIO Vo.. 13, No. 1. Oct. 1, 1999, p. 90.
Briefs, Network World. vol. 16, No. 24. Aug. 23, 1999, p. 27.
The MusicMatch.com website (date unknown, contended by defendant Apple Corp. to be prior art under one or more of 35 U.S.C. 102 (a), (b), (f) and (g)) 32 pages.
Qualcomm QCP-1960 User Manual. Apr. 1999, pp. 1-76.
Samsung SCH-3500 User Manual, 1999, pp. 1-108.
Motorola Digital StarTAC User Guide. Mar. 1999, pp. 1-118.
Nokia 9110 Quick Guide/Accessories Guide. 1999, pp. 1-31.
MP3.com and i-drive.com Join Forces to Store and Manage MP3 Files, Business Wire, Oct. 7, 1999, pp. 1-3.
Nomad User Guide, Jun. 1999, pp. 1-34.
Nomad II Getting Started Manual, Jan. 2000, pp. 1-38.
GSM 03.64 version 6.2.0 Release 1997, European Telecommunications Standards Institute, 1999, pp. 1-42.
The i-Drive.com website (date unknown, contended by defendant Apple Corp. to be prior art under one or more of 35 U.S.C. 102 (a), (b), (f) and (g)) 6 pages.
GSM 03.64 version 7.0.0 Release 1997, European Telecommunications Standards Institute, 1999, pp. 1-42.
The EMusic.com website (formerly www.goodnoise.com) (date unknown, contended by defendant Apple Corp. to be prior art under one or more of 35 U.S.C. 102 (a), (b), (f) and (g)) 2 pages.
EMusic.com prospectus, Sep. 24, 1999, pp. 1-61, F1-F41.
Logging On; Setting Sound Free From the CD, The Washington Post, Mar. 3, 2000, pp. 1-3.
Music Factory; Retailers Struggle to Expand Listening Options Online, Contra Costa Times Mar. 19, 2000, pp. 1-2.
The MyPlay.com website (date unknown, contended by defendant Apple Corp. to be prior art under one or more of 35 U.S.C. 102 (a), (b), (f) and (g)) 1 page.
Myplay.com Launches Today, PR Newswire. Oct. 13, 1999, pp. 1-2.
Myplay, Inc. Launches Consumer Online Music Service, PR Newswire, Oct. 13, 1999, pp. 1-3.
Empeg.com, "Does Your Car Stereo Run Linux," (date unknown, contended by defendant Apple Corp. to be prior art under one or more of 35 U.S.C. 102 (a), (b), (f) and (g)), 2 pages.
TIA/EIA Interim Standard, Cellular Digital Packet Data, System Specification—Part 403, Mobile Data Link Protocol, Telecommunications Industry Association, Dec. 1997, 83 pages.
The Listen Up Player from Audio Highway 1996. 1 page.
Audio Highway Announces the Listen Up Player, Audio Highway Press Release, Sep. 23, 1996, 2 pages.
MPMan F-10 and F-20 digits1 audio players and review article "MP3 Player Saehan MPMan F20 Review", X-bit labs Jul. 14, 1999.
Boehlart, "Artists to Napster: Drop Dead" Salon.com, Mar. 24, 2000. 3 pages.
Breen, "Professional Audio Tools", Macworld, Sep. 1998.
Ling, "Ring My Bell: Mobile Phones that Jingle . . . that Ring their Favorite Tunes", Asian Wall Street Journal. Jun. 1998.
Chen, "Speeding Up Wireless Connectivity in the Home", Communication Systems Design. Feb. 2001.
Ling, "Technology Journal—Sense of Site: Phone Fans Flock to Musical Web Sites", Asian Wall Street Journal, Apr. 24, 2000.
Greenman, "Personalize Your Cell Phone by Using the Sound of Music", Houston Chronicle. Apr. 28, 2000.
Woody, "Favorite Tunes are a Download Away", Syracuse Herald Journal. Aug. 5, 1999.
Majidimehr et al., "Delivering Compressed Multimedia" Electronic Engineering Times. Nov. 22, 1999.
Amazon.com—Inventor Musical Buying Info. Issue Date Feb. 22, 2001.
Amazon.com retrieved on Jul. 31, 2002.
Decarmo, "Solutions, Tools and Tips for the Internet Age", PC Magazine. Issue Date Jun. 26, 2001.
Web Pages of Interactive Week: Interview: Thomas Dolby Goes Mobile—Issue Date Mar. 1, 2001.
Dvorak, "Inside", PC Magazine. Issue Date May 22, 2001.

(56) References Cited

OTHER PUBLICATIONS

Lohr, The New York Times, Nokia to Join with IBM in 2 Ventures of Software. Issue Date Jul. 9, 2002.
Nokia Cellular Phones (online) Retrieved Jul. 31, 2002. www.nokia.com.
Margolis, "Excerpt from Random House Webster's Computer & Internet Dictionary. 3rd." 1999.
Anonymous, "RealAudio on your website—sound good?", Macwold.
Bonisteel, "RealNetworks Going Mobile With Streaming-Media Platform", Newsbytes News Network, Feb. 19, 2002.
Lawrey, "The Suitabilty of OFDM asw a modulation technique for Wireless Telecommunications with CDMA Comparison", Oct. 1997. 107 pages.
Monteluius et al., "Streaming Video in Wireless Networks: Service and Technique", Dec. 11, 2001, 126 pages.
Sampath, "Wireless/Mobile Video Delivery Architecture, "Thesis. University of Florida. Dec. 2000. 88pages.
Yang et al., Robust Wireless Image Transmission Based on Turbo-Coded OFDM, Jun. 2002. pp. 366-367.
Application and File History for U.S. Appl. No. 10/183,756, filed Jun. 26, 2002, inventors Mikkelsen et al.
Application and File History for U.S. Appl. No. 12/322,615, filed Feb. 4, 2009, inventors Mikkelsen et al.
Application and File History for U.S. Appl. No. 14/057,672, filed Oct. 18, 2013, inventors Mikkelsen et al.
Application and File History for U.S. Appl. No. 14/057,831, filed Oct. 18, 2013, inventors Mikkelsen et al.
Application and File History for U.S. Appl. No. 14/230,696, filed Mar. 31, 2014, inventors Mikkelsen et al.
Application and File History for U.S. Appl. No. 14/230,762, filed Mar. 31, 2014, inventors Mikkelsen et al.
Application and File History for U.S. Appl. No. 14/230,823, filed Mar. 31, 2014, inventors Mikkelsen et al.
Application and File History for U.S. Appl. No. 14/230,857, filed Mar. 31, 2014, inventors Mikkelsen et al.
Application and File History for U.S. Appl. No. 14/230,877, filed Mar. 31, 2014, inventors Mikkelsen et al.
Application and File History for U.S. Appl. No. 14/230,906, filed Mar. 31, 2014, inventors Mikkelsen et al.
Application and File History for U.S. Appl. No. 14/230,938, filed Mar. 31, 2014, inventors Mikkelsen et al.
Application and File History for U.S. Appl. No. 14/302,006, filed Jun. 11, 2014, inventors Mikkelsen et al.
Application and File History for U.S. Appl. No. 14/302,065, filed Jun. 11, 2014, inventors Mikkelsen et al.
Business Wire, Vivendi Universal Selects MyNectonomy as the Customer Managed Relationship—CMR—Solution for New Universal Music Mobile Service, Business Wire. Nov. 26, 2001. PQD-Dialog#80285119. 4 pages.
Gold, "Vivendi to Launch Music-Via-Mobile Phone Service", Newsbytes, Aug. 28, 2001, PQDialog #77621782. 4 pages.
"Vivendi-Universal Links Mobile Phones to Its Music", Euromarketing via email. Sep. 7, 2001. , PQDialog #24984580. 3 pages.
Daniel Kumin, Stereo Review, "Jukebox Heaven". Jan. 1999. pp. 64-71.
Audio, "Anthem-Five-Channel Amp", Jul./Aug. 1999. p. 15.
Sony webpages in Japanese, "Portable Mini Disc Player MD Recorder", Jul. 21, 1996. pp. 1-5.
Sony, MD Walkman Operating Instructions—MZ-R4ST 1996. pp. 1-64.
Sony, MD Walkman Operating Instructions—MZ-R4ST 1997. pp. 1-79.
Stereo Review "New Products" Jun. 1998. 1 page.
Factiva, Hardware Review, "Lost in the Supermarket" 2009. pp. 1-3.
Sony webpages in Japanese, "Portable Mini Disc Player MD Recorder", Oct. 21, 1999.
Jamie Sorcher, Stereo Review, "New for the Road", May 1998, 2 pages.
Sony, MD Walkman Operating Instructions—MZ-R55, 1998. pp. 1-42.
John Whitters, The Advertiser, "Is the Cassette doomed?", Jul. 16, 1998. pp. 1-2.
George Cole, Financial Times, "Listen with your eyes: A new music CD format supplies textual information" Oct. 23, 1997. pp. 1-2.
Dana J. Parker, "Standard Deviations" CD-TEXTRAL read all about it! Oct. 1996. pp. 1-2.
Mobile Electronics, "Down the Road" Jul. 2004. pp. 1-2.
Alpine, "Interface Adapter for iPod KCA-420i—Owner's Manual"—44 pages total.
Amy Gilroy, Mobile Electronics, "Apple's iPod Seen Transforming Car Audio Business", 1 page. 2004.
Greg Borrowman, "The Sydney Morning Herald", Philips Releases its Latest DVD. 1999. 2 pages total.
JVC, "Audio/Video Control Receiver, RX-668VBK Instructions", pp. 1-43. 2000.
Sony webpages in Japanese, "Portable MD Recorder" Oct. 1997. 5 pages.
Sony, "Walkman MZ-R50 Recorder" Oct. 1997. 7 pages.
Sony, "Walkman MZ-R55" Oct. 10, 1998. 6 pages.
English Summary, A Device for Remotely Controlling a Car Device for Playing MP3 files in disclosed . . . 1 page Date Unknown.
Franklin N. Tessler, Macworld. "Mobile MAC, Highway Fidelity" Jun. 2004. pp. 1-3.
Barry Collins, "The Sunday Times", High-Class High-Tech-Buyer's guide. 2001. 2 pages.
Peter Familari, Herald-Sun. Clever Deck-CD and mini-disc combination. 1998. 1 page.
JVC, MD-CD Combination Deck, XU-301BK, Instructions. pp. 1-59. 1998.
Amy Gilroy, Mobile Electronics. OEM Integrators Embrace iPod's Success. 1 page.
JVC, Portable Minidisc Recorder, XM-R700SL Instructions. pp. 1-24.
Rio Car "Car Toy Sole Retailer for Rio Car", May 28, 2001. 1 page. 2000.
Amy Gilroy, TWICE. "Panasonic Ships First SD MP3" Dec. 4, 2000. page.
Twice, "PhatNoise Readies MP3", Nov. 5, 2001. 1 page.
Kevin Savetz, The Washington Post, Putting your MP3 Collection in Drive (Final Edition). Aug. 10, 2001. pp. 1-3.
Twice, "Study Sees Retail Opportunities for Mobile Multimedia," vol. 14, Issue 15, Jun. 28, 1999, pp. 1-2.
Stephen Kempainen, EDN Access for Design, by Design "In-car computing gets personal," Aug. 17, 1998, pp. 1-7.
www.mpman.com, "MP-F30, User's Guide," pp. 2-47.
Mark Moeller, Computing Unplugged Magazine, "Software Review, New software products for the Auto PC," 1999-2009, Zatz Publishing, pp. 1-4.
Mark Moeller, Computing Unplugged Magazine, "Auto PC Power, A survey of resources for Auto PC owners," 1999-2009, Zatz Publishing, pp. 1-5.
Mark Moeller, Computing Unplugged Magazine, "Auto PC Power, A look at the first year of the Auto PC with Microsoft," 1999-2009, Zatz Publishing, pp. 1-5.
Mark Moeller, Computing Unplugged Magazine, "Auto PC Power, Next generation AutoPCs make a big debut at CES," 1999-2009, Zatz Publishing, pp. 1-6.
Mark Moeller, Computing Unplugged Magazine, "Programmig Power, Getting started developing software for the Auto PC," 1999-2009, Zatz Publishing, pp. 1-5.
Mark Moeller, Computing Unplugged Magazine, "Behind the Scenes, The AutoPC: Vision vs Reality," 1999-2009, Zatz Publishing, pp. 1-7.
Mark Moeller, Computing Unplugged Magazine, "Product Preview, A Survey of Auto PC 2.0 for software developers," 1999-2009, Zatz Publishing, pp. 1-7.
Mark Moeller, Computing Unplugged Magazine, "AutoPC Update, Auto PC/Windows CE for Automotive news bites," 1999-2009, Zatz Publishing, pp. 1-4.
Claim Chart for KR19990033393, Claim 17 of U.S. Pat. No. 7,324,833, pp. 1-3. Date Unknown.

(56) References Cited

OTHER PUBLICATIONS

RIO500, Getting Started Guide for Windows 98 and Macintosh OS 8.6, pp. 1-2. 1998.
Norbert A. Streitz, et al., "Dolphin: Integrated Meeting Support Across Local and Remote Desktop Environments and LiveBoards," Integrated Publication and Information Systems Institute, 1994, pp. 345-358.
Leo Degen, et al., "Working with Audio: Integrating Personal Tape Recorders and Desktop Computers," May 3-7, 1992, pp. 413-418.
H.S. Jun Gibee, "A Virtual Information Desk on the Internet," University of Ulsan, Sep. 1999, pp. 265-268.
Steve Whittaker, et al., "TeleNotes: Managing Lightweight Interactions in the Desktop," Lotus Development Corporation, Jun. 1997, pp. 137-168.
R.M. Crowder, et al., "Integration of Manufacturing Information Using Open Hypermedia," Computer in Industry, 1999, pp. 31-42.
Tomas Bostrom, et al., "Mobile Audio Distribution," Royal Institute of Technology, 1999, pp. 166-172.
Alex Poon, et al., Xerox Disclosure Journal, vol. 19, No. 2, "Gestural User Interface Technique for Controlling the Playback of Sequential Media," Mar./Apr. 1994, pp. 187-190.
Deb Kumar Roy, "NewsComm: A Hand-Held Device for Interactive Access to Structured Audio," Massachusetts Institute of Technology, Jun. 1995, pp. 1-12.
Victoria Bellotti, et al., "Walking Away from the Desktop Computer. Distributed Collaboration and Mobility in a Product Design Team," 1996, pp. 209-218.
Upul Obeysekare, et al., "The Visual Interactive Desktop Laboratory," Jan.-Mar. 1997, pp. 63-71.
Asim Smailagic, et al., "MoCCA: A Mobile Communication and Computing Architecture," Institute for Complex Engineered Systems, pp. 1-8. 2003.
Sui-Meng Poon, et al., "Integration of Value-Added Audio Playback Capacity Into Computer Network," Nanyang Technological University, 1995, pp. 632-636.
Erdal Paksoy, et al., "A variable-rate celp coder for fast remote voicemail retrieval using a notebook computer," DSPS R&D Center, Texas Instruments, 1997, pp. 119-124.
Jeffrey A. Davis, "Use of Personal Computers in Satellite Command and Control Systems," Raytheon Systems Company, Oct. 24, 1999, pp. 283-291.
Niki Davis, "Remote Teaching Via ISDN2 and Desktop Conferencing,"Exeter University School of Education, pp. 1-3. 1993.
A Chan, et al., "The Pep-II Project-Wide Database," Stanford University, 1996, pp. 840-842.
Krishna Bharat, et al., "Migratory Applications," Springer Berlin, vol. 1222, 1997, pp. 1-21.
EMPEG Car, "MP3 in your dash," Digital Audio Player User Guide, pp. 1-50. .Microsoft, "Getting Started Microsoft Windows. 98" Second Edition, 1998, pp. 1-138.
Saul Greenberg, "PDAs and Shared Public Displays: Making Personal Information Public, and Public Information Personal," University of Calgary, Mar. 1999, pp. 1-11.
Naohiko Kohtake, et al., "InfoStick: an interaction device for Inter-Appliance Computing," Keio University, pp. 1-15. 2001.
Microsoft, "Getting Started Microsoft Windows 98" Second Edition. 1998. pp. 1-138.
Microsoft, "Introducing Microsoft Windows 95—Certificate of Authenticity," 1995, pp. 1-117.
Sony, "New Technical Theory for Servicing, MZ-R5ST Operation Manual," pp. 1-44. Date Unknown.
Richard C. Davis, et al., "A Framework for Sharing Handwritten Notes," 1998, pp. 119-120.
Krishna A. Bharat, et al., "Migratory Applications," UIST '95, Nov. 14-17, 1995, pp. 133-142.
Brad A. Myers, "Collaboration Using Multiple PDAs Connected to a PC," Carnegie Mellon University, 1998, pp. 385-294.
Richard C. Davis, et al., "NotePals: Lightweight Note Sharing by the Group, for the Group," May 15-20, 1999, pp. 338-345.

Jun Rekimoto, et al., "Augmented Surfaces: A Spatially Continuous Work Space for Hybrid Computing Environments," May 15-20, 1999, pp. 378-385.
Dan R. Olsen, Jr., "Interacting with Chaos," Sep. and Oct. 1999, pp. 42-54.
Scott Robertson, et al., "Dual Device User Interface Design: PDAs and Interactive Television," Apr. 13-18, 1996, pp. 79-86.
Diamond Multimedia Systems, Inc., "Rio PMP300, User's Guide," 1998, pp. 1-27.
Sony "Portable MiniDisc Recorder, Operating Instructions, MZ-R55," 1998, pp. 1-42.
Yamaha Corporation, "QY Data Filer—Owner's Manual," pp. 1-250, 1997.
J. Braunstein, "Airbag Technology Takes Off," Automotive & Transportation Interiors, Aug. 1996, p. 16.
I. Adcock, "No Longer Square," Automotive & Transportation Interiors, Aug. 1996, pp. 38-40.
PR Newswire, "Alpine Announces Fall Release of Interface Adapter That Enables iPod Control and Playback from In-Vehicle Sound Systems," Jul. 7, 2004, pp. 1-2.
R. Lind, et al., "The Network Vehicle—A Glimpse into the Future of Mobile Multi-Media," 17th AIAA/IEEE/SAE Digital Avionics Sys. Conference Proceedings, Oct. 31 to Nov. 7,1998, at 121-1 to 121-8.
Chaoui et al., "OMAP: Enabling Multimedia Applications in Third Generation (3G) Wireless Terminals", Texas Instruments Technical White Paper Dec. 2000.
McClure, Steve, "Japanese Downloads a Call Away," Billboard, Jun. 17, 2000 ("Billboard").
i-Mode Basic Operation, Digital Mova F502i "Hyper", Nov. 1999.
Operation Manual, Digital Mova F502i "Hyper", Nov. 1999.
3rd Generation Partnership Project; Technical Specification Group Terminals; Multimedia Messaging Service (MMS); Functional description; Stage 2 (3G TS 23.140 version 2.0.0), Mar. 2000.
The NTT DoCoMo Success Story: How Mobile Internet Created the World's Most Valuable Telco., America's Network, vol. 104, Issue 4, Mar. 1, 2000.
Asaba, Masaharu, "NTT DoCoMo's i-mode Model Taking Country by Storm," The Daily Yomiuri, Mar. 8, 2000.
NTT DoCoMo i-mode Service Reaches 5 Million Subscribers in First Year, PR Newswire, May 30, 2000.
"i-modest Success," The Economist, Mar. 11, 2000.
Technology Standards Developed for Music Delivery System over Mobile Phones, Fujitsu Press Release, Dec. 9, 1999.
Gohring, Nancy, "Internet Content Opens Up to Wireless," Connected Planet, May 15, 2000.
Guth, Robert A., "Asian Tech Focus: NTT Mobile Builds Mini Web Sites for Cell Phones—NetDial-Up Is Unnecessary in User-Friendly Format," 28, Mar. 29, 2000.
Hara, Yoshiko, "Memory Card Secures Music Delivery to Portable Phones," EE Times, Dec. 13, 1999.
Logica Brings Japanese Alternative for WAP to the World, Press Release, Logica, Jun. 23, 2000.
Asia's Wireless Portal: "M"-commerce is Here Today, The Economist, Feb. 4, 2000.
Takeshi Natsuno, I-Mode Strategy (John Wiley & Sons trans. 2003) (2000).
Kairer, Ryan, "OmniSky Wireless Modem Review," Palm Infocenter, Jan. 24, 2000.
Parker, Ginny, "Japan Finds Route to Web Via Cell Phones," Associated Press, Dec. 30, 1999.
Barnett, Shawn, "A Beautiful Wireless Solution for a Beautiful Palm V," Pen Computing, Jan. 2000.
PictureVision Japanese Subsidiary Powers Photos on Cell Phones; Popular Photo DeliverySystem Coming Soon to America, Business Wire, Mar. 7, 2000.
Schmetzer, Uli, "Wireless 'i-Mail' Connects in Japan," Chicago Tribune, May 24, 2000.
Sega to Supply Music for NTT DoCoMo's i-Mode Phones, Dow Jones Newswires, Nov. 30, 1999.
Uimonen, Terho and James Niccolai, "Mobile Role Models," InfoWorld, Dec. 20, 1999.

(56) References Cited

OTHER PUBLICATIONS

Watts, Jonathan, Japanese Craze that could Wipe Out WAP: While the West is Taking Its First Tentative Steps Towards Web-enabled Mobile Phones, i-mode is Walking Tall in the East, The Guardian, Jun. 15, 2000.
Williams, Martyn, "NTT DoCoMo Brings Color to i-Mode Service", Info World, Jan. 20, 2000.
WuDunn, Sheryl, "Next Stage of the Cellular Tour; Forced to Compete, Japan Becomes a Global Power," New York Times, Sec. C, p. 1, col. 3, Jul. 27, 1999.
Preston, Pieter & Jonathan Webdale, The Wireless Future—WAP Services, New Media Age, May 18, 2000.
Kunii, Irene M. and Stephen Baker, "Japan's Mobile Marvel," Business Week, 88-91, Jan. 17, 2000.
Oliphant, Malcom W., "The Mobile Phone Meets the Internet," IEEE Spectrum, Aug. 1999.
ztango.com WAP Gateway Powers Iobox Commercial WAP Service, Telephine IP News, Mar. 1, 2000.
Scott Hacker, MP3: The Definitive Guide (2000).
Hutchins, Ty, OmniSky Wireless Modem Review, The Gadgeteer, Jan. 13, 2000.
Digital Mova F501i "Hyper" Users Guide—Operational Manual, Jun. 1999.
Digital Mova P503i "Hyper" Operational Manual, Dec. 2000.
Startup of a Video Distribution Service Utilizing PHS and Sales of the Compatible Terminal, NTT DoCoMo News, Nov. 29, 2000.
Watts, Jonathan, "WapWorld," The Guardian, Feb. 29, 2000.
Kashiwagi, Akiko, "Japanese Going Online but Leaving PCs Behind," Washington Post, Feb. 8, 2000.
Net Surfing on the Fly Proves Smash Hit, The Nikkei Weekly, Oct. 25, 1999.
The World in Your Pocket, The Economist, Oct. 9, 1999.
Japan's NTT DoCoMo to Halve 'i-mode' Mobile Phone Supplies, Agence France Presse, Apr. 20, 2000.
Sun Microsystems Unveils Java Technology-Enabled Consumer Devices, New ProductsStrategies at World's Largest Developer Conference, PR Newswire, Jun. 15, 1999.
Ling, Connie, "Ring my bell: Mobile phones that jingle . . . that ring their favorite tunes," AsianWall Street Journal, Jun. 22, 1998.
Chen, James; "IEEE 802.11a—speeding up wireless connectivity in the home," Communication Systems Design, Feb. 2001.
Breen, Christopher, "Professional audio tools," Macworld, Sep. 1998.
Owner's Manual Nokia 9000i Communicator 1997.
PR Newswire, "Alpine Announces Fall Release of Interface Adapter That Enables iPod Control and Playback From In-Vehicle Sound Systems" Jul. 7, 2004. 2 pages total.
Japanese Webpage, www.kcalgo.kr/jsp/main.jsp, 1 page. Date Unknown.
Japanese Webpage, www.kca.go.kr—Brochure Free—Microsoft Internet Explorer Date Unknown.
Japanese Webpage, www.kca.go.kr—Brochure Free—Microsoft Internet Explorer, 1 page Date Unknown.
Japanese Website, MM MPMANIA.com, http:/mpmania, x-y.net/bbs/zboard.php?id=products&keyword=1998, 1 page.
Japanese document regarding MP3, May 1999, 1 page.
Japanese Website, MM MPMANIA.com, http:/mpmania, x-y.net/bbs/view.php?id=products&page=1&sn1=&,divpage, 1 page.
Direct Cable Connection screen shot, "B1U6U4," 10 pages total. Date Unknown.
Direct Cable Connection screen shot, 10 pages total. Date Unknown.
IBM Mobile Systems, "WorkPad z50 Mobile Companion (2608-1Ax), Hardware Maintenance Manual," Mar. 1999, pp. 1-77.
Microsoft Corporation, "Windows CE 2.1 Technical Articles, Developing Applications for an Auto PC," Jun. 1999, pp. 1-13.
Infogation Corporation, "InfoGation Corp. Introduces Software Applications for Next-Generation Smart Car Systems," Jan. 8, 1998, pp. 1-2.
Business Wire, "ORA Electronics Announces USB-Compatible TelCar Mark VII Begins Shipping First Quarter of 1999," Jan. 6, 1999, pp. 1-2.
ORA USA, "ORA Electronics Patents Telcar Cellular Telephone Interface," Jul. 6, 1998, pp. 1-2.
Hewlett Packard, "HP Jomada 430/430se Palm-Size PC, User's Guide," Edition 1, 1999, pp. 1-151.
NEC, "NEC MobilePro 750C, User's Guide," 1998, pp. 1-83.
Microsoft, "Palm PC User's Guide," Microsoft Windows CE, pp. 1-39. Date Unknown.
Palm PC User's Guide, "Chapter 6, Information Backup and Exchange," pp. 69-148. Date Unknown.
MPMan, "User's Guide, The Portable MP 3player using the flash memory and SmartMedia card," 1997, pp. 1-35.
Cover Sheet, www.mpman.com, 1 page Date Unknown.
Smart Media Card Slot Diagram, 1 page. Date Unknown.
MP Man F20 Logo,1 page. Date Unknown.
MPMan, "User's Guide, The portable MP3 player using the flash memory with variety features including the voice recording, phone/memo browsing, etc.," 1997, pp. 1-47.
Anand Lal Shimpi, Empeg, Ltd., "MP3 meets Car Audio: Empeg Mark II in-dash Car MP3 Player," Sep. 18, 2000, pp. 1-17.
Peter Clarke, EE Times, "Engineers drive craze for MP3 audio players," Feb. 5, 1999, pp. 1-4.
Rio Car Dot Org Geek Guide, "empeg car Mk. 1," Feb. 21, pp. 1-4.
Hugo Fiennes, Rio Car Dot Org Geek Guide, "MP3 Mobile," Feb. 21, pp. 1-4.
Rio Car Dot Org, 'Frequently Asked Questions, pp. 1-16.
Diamond Multimedia Systems, Inc., "Rio PMP300 User's Guide," 1998, pp. 1-27.
Stephen J. Buckley, et al., "The Car as a Peripheral, Adapting a Portable Computer to a Vehicle Intranet," SAE Technical Paper Series, 98C030, Oct. 19-21, 1998, pp. 1-14.
The MP3 Mobile, Apr. 8, 1998, pp. 1-13.
12-Volt Business & Technology Solutions, AutoMedia, "How the Intelligent Data Bus will impact the way you do business," Nov. 1998, pp. 1-2.
Press Release, "Creative Labs Launches Nomad Portable MP3 Players," Apr. 15, 1999, pp. 1-5.
BMW, "Owner's Manual, On-board monitor with navigation system," 1996, pp. 1-81.
Heinz Sodeikat, "Euro-Scout is facing the German 1994 Market," 1994, pp. 551-556.
Pictures of car navigation systems in a car dashboard, pp. 1-11. Date Unknown.
BMW, "The BMW On-Board Navigation System—Technology Takes a Remarkable Turn,". 2005, pp. 1-9.
Oldsmobile, "1991 Toronado/Trofeo User's Guide," 1991, pp. 1-41.
Yepp, "Digital Sounds—yepp—YP-E32/E64102-291," Oct. 23, 1999, pp. 1-46.
U.S. Appl. No. 60/167,179, entitled "System, Method, and Device for Playing Recorded Music on a Wireless Communications Device," by Devon A. Rolf, filed Nov. 23, 1999, pp. 1-48.
Microsoft, "Getting Started, Microsoft Windows 98, For distribution with a new PC only," 1998, pp. 1-145.
Ha-Young Park, The Customer Times, "Portable Computer Music, MP3 File and MP3 Player rise as the Next Generation Audio Format," May 1999, pp. 1-2.
"MP3 Players Introduced in the Korean IT Magazines," 1998-1999, pp. 1-15.
MPMan, "MP-F20, User's Guide, Portable MP3 player using the flash memory and a Memory card," ages 1-16. Date Unknown.
PR Newswire Association, Inc., "Delphi's Communiport(R) Technology for Tomorrow, Today Demonstrated at Frankfurt Auto Show," Sep. 15, 1999, pp. 1-8.
Crain Communiations, Inc., "Products," Agilent Technologies Press Release, Feb. 21, 2000, pp. 1-6.
The Washington Times, LLC, John Hanan, Dallas Morning News, "Cars add computer, audiovisual gear," Jan. 14, 2000, pp. 1-3.
R. Lind, et al. "The Network Vehicle—A Glimpse into the Future of Mobile Multi-Media," Sep. 1999, pp. 27-32.
M. Krebs, "Cars That Tell You Where to Go," The New York Times, Dec. 15, 1996, section 11, p. 1.

(56) References Cited

OTHER PUBLICATIONS

L. Kraar, "Knowledge Engineering," Fortune, Oct. 28, 1996, pp. 163-164.
S. Heuchert, "Eyes Forward: An ergonomic solution to driver information overload," Society of Automobile Engineering, Sep. 1996, pp. 27-31.
"OnStar" brochure by General Motors Corp., 1997.
D. Peters, et al "Car Multimedia—Mobile Multimedia for the 21st Century," Oct. 5-6, 2000, pp. 1-58.
Stephan Hartwig, et al., "Mobile Multimedia—Challenges and Opportunities Invited Paper," Jun. 19, 2000, pp. 1-12.
John Hanan, "Car Audio Has Come Far since the 8-Track," Knight Ridder/Tribune Business News, Dec. 17, 1999, pp. 1-2.
Business Wire, "Lobjects Announces New Digital Audio Player Technology for the Next-Generation Auto PC," Aug. 4, 1999, pp. 1-2.
Jason Meserve, "Windows Media Player now available for WinCe, (from Microsoft) (Product Announcement)," NetworkWorld. Mar. 6, 2000, pp. 1-2.
Business Wire, ""HUM" MP3 Software Turns Windows CE Handheld Computers Into Portable Music Players," May 24, 1999, pp. 1-2.
Chris De Herrera, "Windows CE 2.0 Auto PC Pictures," Chris De Herrera's Windows CE Website, Revised Jan. 11, 1999, pp. 1-3.
John Murray, "Inside Microsoft Windows CE," Microsoft Press, 1998, pp. 1-20.
Compaq, Intel, Microsoft, NEC, "Universal Serial Bus Device Class Definition for Audio Devices," Release 1.0, Mar. 18, 1998, pp. 1-130.
Sun Microsystems, Inc., "Why Jini Now?", Aug. 1, 1998, pp. 1-14.
Clohessy, Kim, Object Technology, Inc., Virtual Machine Technology: Managing Complexity and Providing Portability for Embedded Systems, 2001, pp. 58-60.
Panasonic, "Portable DVD/Video CD/CD Player, Operating Instructions, DVC-L10D," 1998, pp. 1-84.
Clarion Car Audio and Beyond, "1999 Car Audio & Security Product," 1999, pp. 1-60.
Jamie Anderson, "Driving our way soon: the e-car," The Times, Nov. 9, 2000, pp. 1-4.
Clarion Auto PC, "Clarion Auto PC Owner's Manual," 1998, pp. 1-177.
Delphi Automotive Systems, "The Personal Productivity Vehicle," 1998, pp. 1-2.
Real Networks, Inc., Real-Jukebox Plus Manual, 1999, pp. 1-90.
Nokia 9110 Communicator User Manual, Copyright 1999.
Sony, "Sony Notebook Computer User Guide PCG-717/719," User Guide, 1997.
Aircard, Sierra Wireless Announces First Cellular Network Interface Card for Notebook PC's. Jun. 21, 1999.
J. Schneidawind, "Big Blue Unveiling," USA Today, Nov. 23, 1992, p. 2B.
Nokia Suomi, "Range of suspension GSM products unveiled: Nokia's innovations offer a new dimension to mobile communication," Mar. 13, 1996, 1 page.
Nokia 9000i User's Manual, Copyright 1995-1997.
FCC Website, "Broadband PCS," available at http://wireless.fcc.gov/services/index.htm? job=service.sub.--home&id=broadband.sub.--pcs (accessed Nov. 9, 2009).
RealNetworks, "RealPlayer plus, RealPlayer 7 Plus User Manual," Copyright 2000, Mar. 6, 2000.
David Pogue, "SoundJam MP Digital Audio System Manual," 1999.
iTunes Wikipedia Page, http://en.wikipedia.org/wiki/ITunes, accessed Jul. 31, 2009.
K. Jost. "The Car as a Mobile-Media Platform," Automotive Engineering International, May 1998, pp. 49-53.
S.K. Kirschner, "Wired Wheels," Popular Science, Mar. 1998, pp. 54-55.
"Universal Serial Bus Specification," Revision 1.1, Sep. 23, 1998, pp. ii-106.
Specification of the Bluetooth System Version 1.0B (vol. 1), Telefonaktiebolaget LM Ericsson et al. Dec. 1, 1999.
Specification of the Bluetooth System Version 1.0B (vol. 2), Telefonaktiebolaget LM Ericsson et al. Dec. 1, 1999.
Offering a Music Distribution Service, NTT DoCoMo News, Sep. 30, 1999.
NTT DoCoMo Technical Journal vol. 1 No. 1, Oct. 1999.
HP Jomada 420 User's Manual, 1999.
Sales of a New Type of i-mode Compatible Cellular Telephone, NTT DoCoMo News, Nov. 30, 1999.
Excerpt from Random House Webster's Computer & Internet Dictionary, Third Edition. Philip Margolis 1999. 3 pages.
The United States Patent and Trademark Office, Office Action mailed Aug. 5, 2009.
Norbert A. Streitz, et al., "i-Land: An Interactive Landscape for Creativity and Innovation," Proceedings of the ACM Conference on Human Factors in Computing Systems, May 15-20, 1999, pp. 120-127.
Norbert A. Streitz, et al., "Roomware for Cooperative Buildings: Integrated Design of Architectural Spaces and Information Spaces," 1998.
Kevin Jost, Automotive Engineering International, "The car as a mobile-media platform," May 1998, pp. 49-53.
Smart Media card diagram and install instructions, pp. 1-4. Date Unknown.
U.S. Patent and Trademark Office. Issue Notification for U.S. Appl. No. 10/947,754. 1 page. Oct. 21, 2008—Issue Date.
Philips PSA 128MAX, PC Authority Reviews, May 1, 2003, 1 pg.
Sony Network Walkman NW-MS70D, PC Authority Reviews, Oct. 8, 2003, 1 pg.
Targa TMU-401, PC Authority Reviews, Oct. 8, 2003, 1 pg.
Targa TMU-604, PC Authority Reviews, Oct. 8, 2003, 1 pg.
Sun Microsystems, Inc., "What is Jini?",—Summary. Date Unknown.
VESA, Video Electronics Standards Association, "VESA Plug and Display (P&D) Standard," Version 1, Revision 0, Jun. 11, 1997, pp. 1-109.
Clarion Car Audio and Beyond, "1998 Car Audio & Security Product Catalog," 1998, pp. 1-24.
Delphi Delco Electronics Systems, "On-Board Architecture," 1997, pp. 1-2.
Janet Braunstein, "Diversified Software Industries: Enabling digital instrument panels," Jan. 10, 2001, pp. 1-2.
Microsoft PressPass, "Microsoft Previews New Devices Using Windows CE for Automotive 2.0," Jan. 2000, pp. 1-2.
John Townley, "Countdown to Clarion," Automedia, pp. 1-4. Date Unknown.
Gina Hertel, "A Voice-Activated Co-Pilot: ICES," Odds & Ends, Jan. 2000, vol. 8, Issue 1, pp. 1-5.
Kami Buchholz, "Diversified Software launches IVIS," Automotive Engineering Online, 2009, one page.
EMPEG Car webpage, http:/web.archive.orgiweb/19990430033318/www.empeg.com/main.html, Apr. 30, 1999, one page.
Clarion AutoPC, "Frequently Asked Questions," 1998, pp. 1-3.
Clarion AutoPC, "Frequently Asked Questions," 1999, pp. 1-9.
Stereophile, "Clarion Debuts World's First Automobile PC/Stereo," Dec. 5, 1998, pp. 1-3.
Steve Whalley, "Peripherals to Go: USB in AutoPC," pp. 1-2. Date Unknown.
Gregory L. White. "After AutoPC's Hard Ride, Detroit Tries Rebooting In—Computers," The Wall Street Journal, pp. 1-3. Date Unknown.
i-Mode Basic Operation, Digital Mova P502i "Hyper", Aug. 2000.
riocar.org—Empeg Car History, (date unknown, contended by defendant Apple Corp. to be prior art under one or more of 35 U.S.C. 102 (a), (b), (f) and (g)), 4 pages. Date Unknown.
Pohlmann, K.C. Principles of Digital Audio, $4^{th}$ Edition. McGraw-Hill 2000.
Pohlmann, K.C. Principles of Digital Audio, $3^{rd}$ Edition. McGraw-Hill 1995.
Symantec Corporation pcANYWHERE32 Users Guide 1993-1997.
IEEE Standard 802.3ab, 1999 Edition (802.3 Physical Layer Specification for 1000 Mb/s Operation on Four Pairs of Category 5 or Better Balanced Twisted Pair Cable (1000BASE-T) 1999. Abstract.

(56) References Cited

OTHER PUBLICATIONS

Visteon's Mobile Office Solutions Give Busy Commuters More of What They Need—Time, Canada Newswire, Sep. 15, 1999.
Hiatt, "RIAA Sues Napster, Claiming 'Music Piracy'," MTV News, Dec. 8, 1999.
U.S. Appl. No. 09/234,259, filed Jan. 20, 1999. Transaction History.
Advertise on broadcast.com, WayBackMachine. Dec. 1, 1998. 1 page.
Broadcast.com, Home Page, WayBackMachine. Dec. 1, 1998. 2 pages.
Broadcast.com, WayBackMachine, Station of the day, Dec. 6, 1998. 2 pages.
Advertising Services, WayBackMachine. Site Channels. Dec. 3, 1998. 2 pages.
About Broadcast.com, Intro. WayBackMachine, Dec. 1, 1998. 3 pages.
Ahrens, "Internet Stations Give Listeners a New Way to Tune in", Washington Post: Style Live: TV & Media. Jan. 21, 1999. 8 pages.
Baker, Businessweek Online: Daily Briefing, Listening to Internet Radio—on Your Cell Phone, Nov. 3, 1999. 2 pages.
ESPN.com: Live Radio/TV, ESPN Radio and ESPN TV Streaming Media., ESPNews, WayBackMachine, May 8, 1999. 2 pages.
ESPN.com: Live Radio/TV FAQ, WayBackMachine, Live Radio/TV FAQ. May 8, 1999. 3 pages.
IBM Mobile Systems (S82G-1502-03), Hardware Maintenance Manual. vol. 2: ThinkPad Computers. Apr. 1995, 508 pages.
U.S. Appl. No. 60/155,500, filed Sep. 22, 1999, inventors Lee et al., as available at www.uspto.gov.
IBM Dictionary for Computing, Edited by George McDaniel, McGraw-Hill, Inc. 1994.
Majidimehr et al., Delivering Compressed Multimedia, *Electronic Engineering Times*, Nov. 22, 1999.
Mendez-Wilson, Medley of MP3 Phone Hits the Market. (Product Information), Wireless Week, Nov. 6, 2000.
Woody, Favorite Tunes Are Download Away, *Syracuse Herald Journal* Aug. 5, 1999.
Greenman, Personalize Your Cell Phone by Using the Sound of Music, *Houston Chronicle*, Apr. 28, 2000.
United States Patent and Trademark Office Before the Patent Trial and Appeal Board, *Mindgeek, S.A.R.L., Mindgeek USA, Inc., Playboy Enterprises, Inc., and General Media Communications, Inc.*, Petitioner, v. *Skky Inc.*, Patent Owner, Case IPR2014-01236; U.S. Pat. No. 7,548,875. Dated Feb. 3, 2015.
Wu et al., "An Adaptive Multirate IEEE 802.11 Wireless LAN". 2001. IEEE.
Castro et al., "Downlink OFDM Techniques in 3rd Generation TDMA Based Mobile Systems", 1998.
Defendant's Supplemental Invalidity Contentions and Prior Art Production, *Skky, Inc.* v. *Manwin, USA, Inc. et al*, No. 0:2013-cv-02086, MP3: The Definitive Guide dated Mar. 2000 (MP3 Guide).
Defendant's Supplemental Invalidity Contentions and Prior Art Production, *Skky, Inc.* v. *Manwin, USA, Inc. et al*, No. 0:2013-cv-02086, HP Service Manual published in Dec. 1999 ("OmniBook Publicaton").
Defendant's Supplemental Invalidity Contentions and Prior Art Production, *Skky, Inc.* v. *Manwin, USA, Inc. et al*, No. 0:2013-cv-02086, HPOmniBook Release Notes published Jan. 10, 2000 ("OmniBook Notes").
Defendant's Supplemental Invalidity Contentions and Prior Art Production, *Skky, Inc.* v. *Manwin, USA, Inc. et al*, No. 0:2013-cv-02086, HPOmnibook PC Card publication from WayBackMachine published Oct. 13, 1999. ("OmniBook PC Cards").
Defendant's Supplemental Invalidity Contentions and Prior Art Production, *Skky, Inc.* v. *Manwin, USA, Inc. et al*, No. 0:2013-cv-02086, Xircom RealPort TM Ethernet 10/100+Modem 56 User's Guide dated and copyrighted dated Nov. 1998 ("Xircom Modem").
Defendant's Supplemental Invalidity Contentions and Prior Art Production, *Skky, Inc.* v. *Manwin, USA, Inc. et al*, No. 0:2013-cv-02086, OFDM/FM Frame Synchronization for Mobile Radio Data Communication, IEEE Transactions on Vehicular Technology, vol. 4. 42, No, 3, Aug. 1993 ("OFDM/FM").
Defendant's Supplemental Invalidity Contentions and Prior Art Production, *Skky, Inc.* v. *Manwin, USA, Inc. et al*, No. 0:2013-cv-02086, Casas, E. "OFDM-FM for Mobile Radio Data Communication" (1989).
Defendant's Supplemental Invalidity Contentions and Prior Art Production, *Skky, Inc.* v. *Manwin, USA, Inc. et al*, No. 0:2013-cv-02086, Casas et al., OFDM for Data Communication Over Mobile Radio FM Channels-Part I: Analysis and Experimental Results, 1991 IEEE.
Defendant's Supplemental Invalidity Contentions and Prior Art Production, *Skky, Inc.* v. *Manwin, USA, Inc. et al*, No. 0:2013-cv-02086, OFDM for Wireless Multimedia Communications. Date Unknown.
Defendant's Supplemental Invalidity Contentions and Prior Art Production, *Skky, Inc.* v. *Manwin, USA, Inc. et al*, No. 0:2013-cv-02086, Operational Review—Overview by business segment. Date Unknown.
Defendant's Supplemental Invalidity Contentions and Prior Art Production, *Skky, Inc.* v. *Manwin, USA, Inc. et al*, No. 0:2013-cv-02086, Albert Iellimo, Few Winners in the Cellular Modem Race, Network World, Sep. 5, 1994 ("Iellimo").
Defendant's Supplemental Invalidity Contentions and Prior Art Production, *Skky, Inc.* v. *Manwin, USA, Inc. et al*, No. 0:2013-cv-02086, Jamshid Khun-Jush, Göran Malmgren, Peter Schramm & JohnTorsner, HIPERLAN Type 2 for Broadband Wireless Communication, Ericsson Review 2000 ("Khun-Jush").
Defendant's Supplemental Invalidity Contentions and Prior Art Production, *Skky, Inc.* v. *Manwin, USA, Inc. et al*, No. 0:2013-cv-02086, Ericsson Press Release Jun. 5, 2000 "Ericsson unveils the first GPRS phone with Bluetooth™—the R520" ("R520 Press Release").
Defendant's Supplemental Invalidity Contentions and Prior Art Production, *Skky, Inc.* v. *Manwin, USA, Inc. et al*, No. 0:2013-cv-02086, NTT DoCoMo News, Nov. 30, 1999/ DoCoMO's Mobile MultiMedia World ("DMM World").
Defendant's Supplemental Invalidity Contentions and Prior Art Production, *Skky, Inc.* v. *Manwin, USA, Inc. et al*, No. 0:2013-cv-02086, NTT DoCoMo Annual Report 2000, DoCoMo's Mobile MultiMedia World Insight.
Defendant's Supplemental Invalidity Contentions and Prior Art Production, *Skky, Inc.* v. *Manwin, USA, Inc. et al*, No. 0:2013-cv-02086, Toshiba Configuring the Internal Modem for Use With a Cellular Phone ("Toshiba"). Date Unknown.
Defendant's Supplemental Invalidity Contentions and Prior Art Production, *Skky, Inc.* v. *Manwin, USA, Inc. et al*, No. 0:2013-cv-02086, Michel Mouly & Marie-Bernadette Pautet, The GSM System for Mobile Communications ("Mouly Pautet"). Date Unknown,.
Defendant's Supplemental Invalidity Contentions and Prior Art Production, *Skky, Inc.* v. *Manwin, USA, Inc. et al*, No. 0:2013-cv-02086, Universal Mobile Telecommunications Systems (UMTS) UMTS Terrestrial Radio Access (UTRA) Concept Evaluation (UMTS 30.06 version 3.0.0)tr_101146v30000—(1997)("UMTS").
Defendant's Supplemental Invalidity Contentions and Prior Art Production, *Skky, Inc.* v. *Manwin, USA, Inc. et al*, No. 0:2013-cv-02086, U.S. Appl. No. 60/169,158, filed Dec. 6, 1999, inventor Shanai-Jan.
Defendant's Supplemental Invalidity Contentions and Prior Art Production, *Skky, Inc.* v. *Manwin, USA, Inc. et al*, No. 0:2013-cv-02086, U.S. Appl. No. 60/167,179, filed Nov. 23, 1999, inventor Rolf.
Defendant's Supplemental Invalidity Contentions and Prior Art Production, *Skky, Inc.* v. *Manwin, USA, Inc. et al*, No. 0:2013-cv-02086, U.S. Pat. No. 6,658,247B1, filed Mar. 1, 2000 to Saito, 12 pages.
Defendant's Supplemental Invalidity Contentions and Prior Art Production, *Skky, Inc.* v. *Manwin, USA, Inc. et al*, No. 0:2013-cv-02086,U.S. Pat. No. 5,848,064, filed Aug. 7, 1996 to Cowan, 23 pages.
Defendant's Supplemental Invalidity Contentions and Prior Art Production, *Skky, Inc.* v. *Manwin, USA, Inc. et al*, No. 0:2013-cv-02086, European Patent No. EP1049312 filed Apr. 27, 2000 to Um, 11 pages.
Defendant's Supplemental Invalidity Contentions and Prior Art Production, *Skky, Inc.* v. *Manwin, USA, Inc. et al*, No. 0:2013-cv-02086, U.S. Pat. No. 6,199,076, filed Oct. 2, 1996 to Logan et al., 32 pages.

(56) References Cited

OTHER PUBLICATIONS

Defendant's Supplemental Invalidity Contentions and Prior Art Production, *Skky, Inc.* v. *Manwin, USA, Inc. et al*, No. 0:2013-cv-02086, U.S. Pat. No. 5,418,713, filed Aug. 5, 1993 to Allen, 17 pages.
Defendant's Supplemental Invalidity Contentions and Prior Art Production, *Skky, Inc.* v. *Manwin, USA, Inc. et al*, No. 0:2013-cv-02086, U.S. Pat. No. 5,257,397, filed Aug. 13, 1990 to Barzegar et al.
Defendant's Supplemental Invalidity Contentions and Prior Art Production, *Skky, Inc.* v. *Manwin, USA, Inc. et al*, No. 0:2013-cv-02086, U.S. Pat. No. 5,636,276, filed Apr. 18, 1995 to Brugger.
Defendant's Supplemental Invalidity Contentions and Prior Art Production, *Skky, Inc.* v. *Manwin, USA, Inc. et al*, No. 0:2013-cv-02086, Lindstrom et al., BAM customer breaks ground for video over cellular, Telephony Nov. 7, 1994, Page 10.
Defendant's Supplemental Invalidity Contentions and Prior Art Production, *Skky, Inc.* v. *Manwin, USA, Inc. et al*, No. 0:2013-cv-02086, Black Box Network Services—3Com U.S. Robotics Megahertz PC Cards, Nov. 6, 1998 ("Black Box").
Defendant's Supplemental Invalidity Contentions and Prior Art Production, *Skky, Inc.* v. *Manwin, USA, Inc. et al*, No. 0:2013-cv-02086, 3Com Megahertz 56K Global GSM and Cellular Modem PC Card—Sep. 1999 ("3Com").
Defendant's Supplemental Invalidity Contentions and Prior Art Production, *Skky, Inc.* v. *Manwin, USA, Inc. et al*, No. 0:2013-cv-02086, White Paper—Wireless Communications Using CDPD and Circuit-Switched Cellular—Sep. 1997 ("Compaq").
Defendant's Supplemental Invalidity Contentions and Prior Art Production, *Skky, Inc.* v. *Manwin, USA, Inc. et al*, No. 0:2013-cv-02086, Rockwell—RC144ACG 3.3V, Low Power, Integrated High Speed Data/Fax/Voice Modem Device Set with Cellular Direct Connect Support—Oct. 11, 1994 ("Rockwell").
Defendant's Supplemental Invalidity Contentions and Prior Art Production, *Skky, Inc.* v. *Manwin, USA, Inc. et al*, No. 0:2013-cv-02086, HP OmniBook 900—Notebook PC Series. Date Unknown.
Defendant's Supplemental Invalidity Contentions and Prior Art Production, *Skky, Inc.* v. *Manwin, USA, Inc. et al*, No. 0:2013-cv-02086,HP OmniBook 500—Notebook PC. Date Unknown.
Defendant's Supplemental Invalidity Contentions and Prior Art Production, *Skky, Inc.* v. *Manwin, USA, Inc. et al*, No. 0:2013-cv-02086, HP OmniBook 900—Corporate Evaluator's Guide, Date Unknown.
Defendant's Supplemental Invalidity Contentions and Prior Art Production, *Skky, Inc.* v. *Manwin, USA, Inc. et al*, No. 0:2013-cv-02086, HP Diag Tools—User's Guide, Date Unknown.
Defendant's Supplemental Invalidity Contentions and Prior Art Production, *Skky, Inc.* v. *Manwin, USA, Inc. et al*, No. 0:2013-cv-02086, HP Encryption Smart Card Security System—User's Guide. Date Unknown.
Defendant's Supplemental Invalidity Contentions and Prior Art Production, *Skky, Inc.* v. *Manwin, USA, Inc. et al*, No. 0:2013-cv-02086, HP OmniBook Diag Tools—User's Guide, Date Unknown.
Defendant's Supplemental Invalidity Contentions and Prior Art Production, *Skky, Inc.* v. *Manwin, USA, Inc. et al*, No. 0:2013-cv-02086, HP OmniBook 900—Reference Guide, Date Unknown.
Defendant's Supplemental Invalidity Contentions and Prior Art Production, *Skky, Inc.* v. *Manwin, USA, Inc. et al*, No. 0:2013-cv-02086, HP OmniBook 900—User's Handbook, Date Unknown.
Defendant's Supplemental Invalidity Contentions and Prior Art Production, *Skky, Inc.* v. *Manwin, USA, Inc. et al*, No. 0:2013-cv-02086, HP OmniBook 900—Service Manual, Date Unknown.
Defendant's Supplemental Invalidity Contentions and Prior Art Production, *Skky, Inc.* v. *Manwin, USA, Inc. et al*, No. 0:2013-cv-02086, OmniSky: Support: FAQs, Date Unknown.
Defendant's Supplemental Invalidity Contentions and Prior Art Production, *Skky, Inc.* v. *Manwin, USA, Inc. et al*, No. 0:2013-cv-02086, Detailed OmniSky Wireless Modem Review—Lawyers CLE Ethics Credits, Date Unknown.
Defendant's Supplemental Invalidity Contentions and Prior Art Production, *Skky, Inc.* v. *Manwin, USA, Inc. et al*, No. 0:2013-cv-02086, OmniSky: Support: Documentation, Date Unknown.
Defendant's Supplemental Invalidity Contentions and Prior Art Production, *Skky, Inc.* v. *Manwin, USA, Inc. et al*, No. 0:2013-cv-02086, OmniSky Wireless Internet and Email Service for the Palm V User's Manual 2.0 (2000).
Defendant's Supplemental Invalidity Contentions and Prior Art Production, *Skky, Inc.* v. *Manwin, USA, Inc. et al*, No. 0:2013-cv-02086, Minstrel V Welcome to Minstrel V Help Guide. Date Unknown.
Defendant's Supplemental Invalidity Contentions and Prior Art Production, *Skky, Inc.* v. *Manwin, USA, Inc. et al*, No. 0:2013-cv-02086, Brodsky, "Putting the ether back in Ethernet", Network World, Jul. 26, 1993 10,30: ProQuest Discovery. p. S1.
Defendant's Supplemental Invalidity Contentions and Prior Art Production, *Skky, Inc.* v. *Manwin, USA, Inc. et al*, No. 0:2013-cv-02086, Gregg, Living in a Wireless World with PDAs; InfoWorld; Jun. 22, 1992. 14,25: ProQuest Discover, p. S76.
Defendant's Supplemental Invalidity Contentions and Prior Art Production, *Skky, Inc.* v. *Manwin, USA, Inc. et al*, No. 0:2013-cv-02086, Lima, All Wired up over PCs, Computer Dealer News, May 19, 1998; 14,16: ProQuest Discovery. p. 27.
Defendant's Supplemental Invalidity Contentions and Prior Art Production, *Skky, Inc.* v. *Manwin, USA, Inc. et al*, No. 0:2013-cv-02086, McClure, S., In Japan, music's on call for mobile phone users, Billboard; Feb. 12, 2000;112,7; ProQuest Discovery. p. 43.
Defendant's Supplemental Invalidity Contentions and Prior Art Production, *Skky, Inc.* v. *Manwin, USA, Inc. et al*, No. 0:2013-cv-02086, Strauss, DSPL the On-Ramp to the Internet; Electronic News; Nov. 1, 1999; 45,44; ProQuest Discovery, p. 64.
Defendant's Supplemental Invalidity Contentions and Prior Art Production, *Skky, Inc.* v. *Manwin, USA, Inc. et al*, No. 0:2013-cv-02086, Sklar, "Digital Communications; Fundamentals and Application", Second Edition. Date Unknown.
Defendant's Supplemental Invalidity Contentions and Prior Art Production, *Skky, Inc.* v. *Manwin, USA, Inc. et al*, No. 0:2013-cv-02086, U.S. Pat. No. 7,065,342, filed Nov. 22, 2000 to Rolf.
MP MAN, The Portable MP3 player using the Flash Memory and Memory Card—MPF20. pp. 1-34. 2000.
BMW Betriebsanleitung Bordmonitor mit Navigation and TV. 1995 pp. 1-82. 1995 BMW Manual.
NTT DoCoMo Technical Journal vol. 1 No. 3 Mar. 2000.
Microsoft PressPass, Microsoft Previews New Devices Using Windows CE for Automotive 2.0. Jan. 2000. pp. 1-2.
Stereophile, Clarion Debuts World's First Automobile PC/Stereo. Dec. 5, 1998.
Service Manual. Programs After Market Services Technical Documentation. NSE-8/9 Cellular Phones. Nokia Mobile Phones. Issue 1. Jul. 1999.
Nokia 3210 User's Guide. Electronic user's guide released subject to "Nokia User's Guides Terms and Conditions" Issue 2. Jun. 7, 1998.

\* cited by examiner

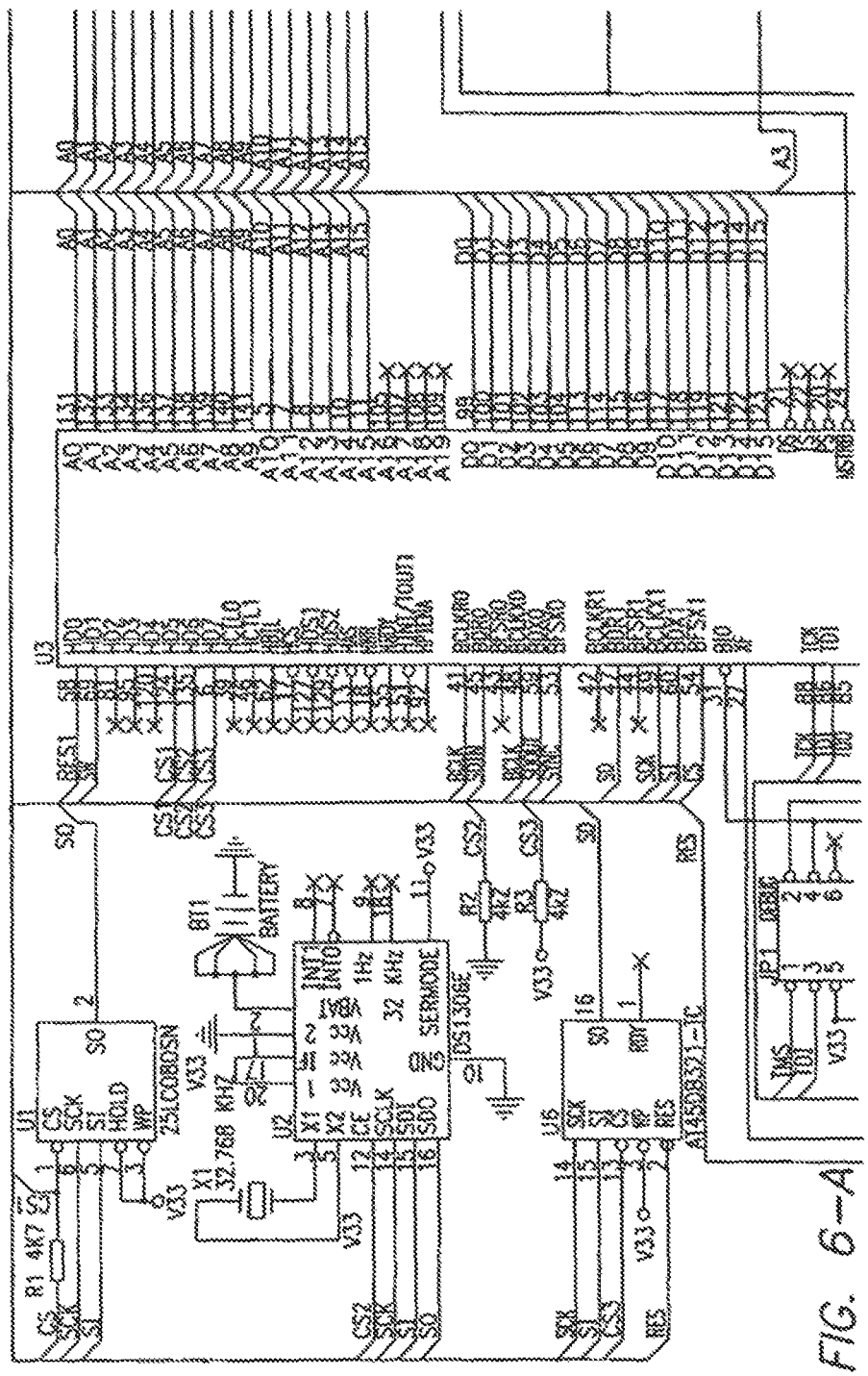
FIG. 6-A

FIG. 6-B

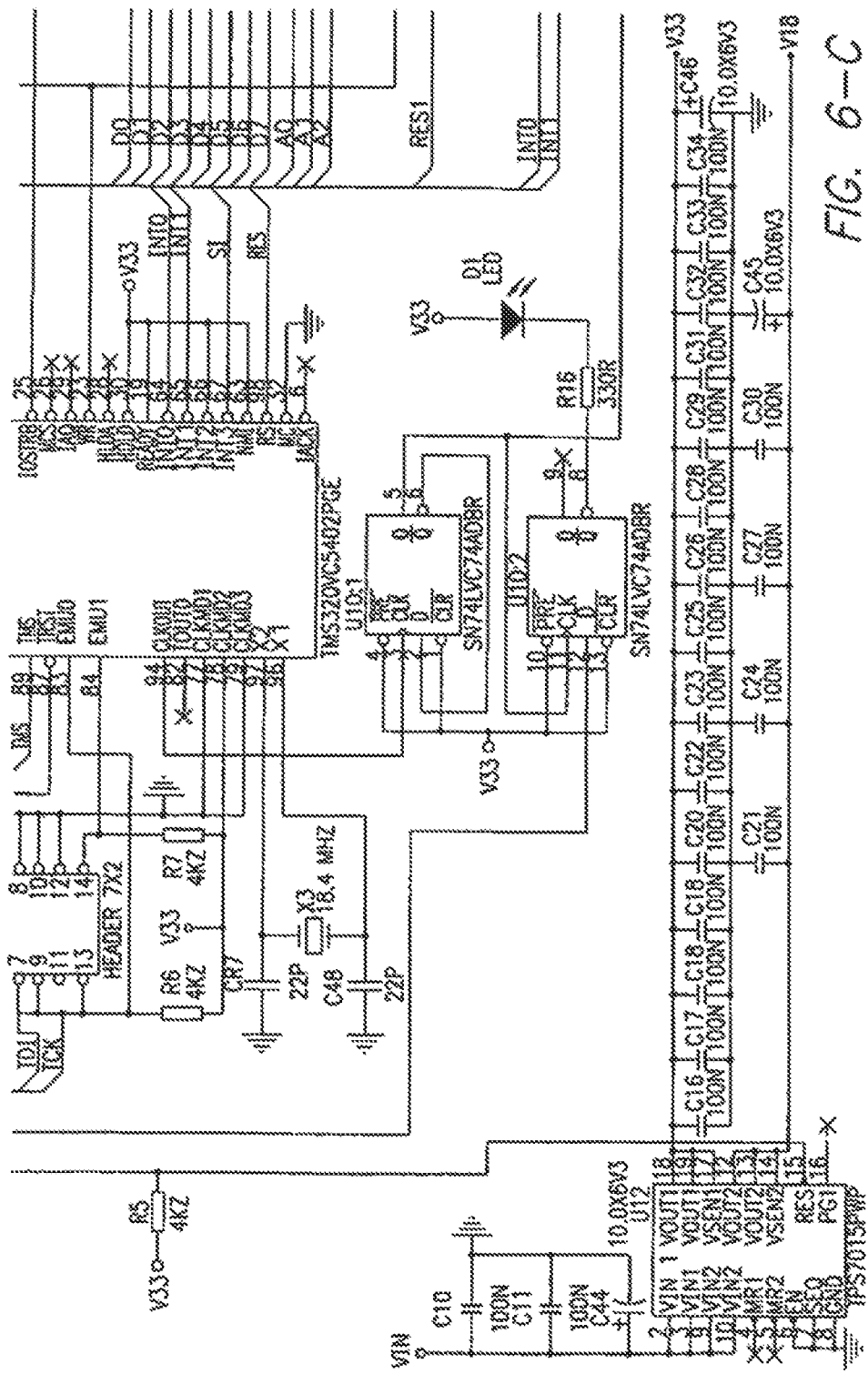
FIG. 6-C

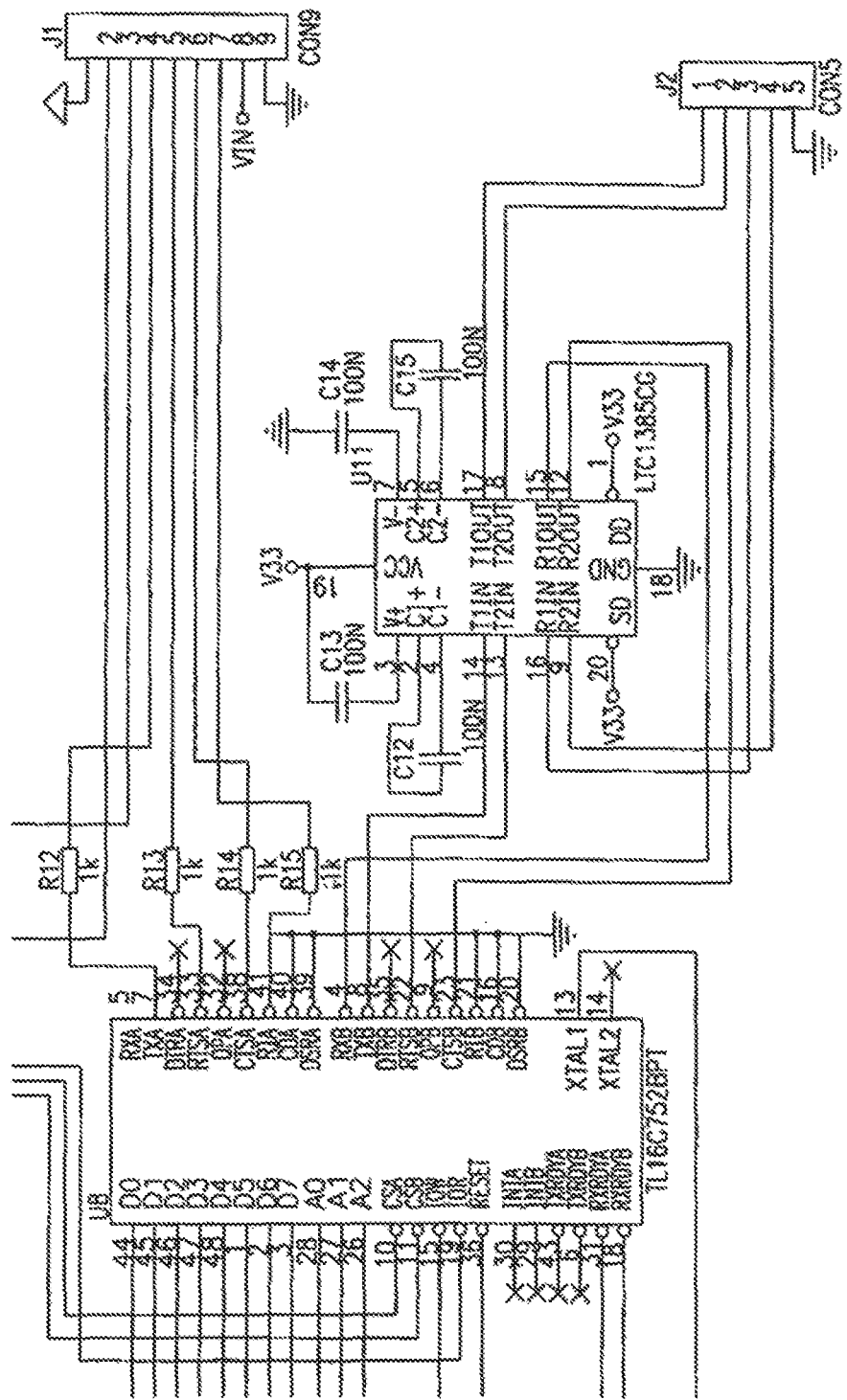
FIG. 6-D

MEDIA DELIVERY PLATFORM

RELATED APPLICATION

This application is a continuation of application Ser. No. 12/322,615 filed Feb. 4, 2009, which in turn is a continuation of application Ser. No. 10/183,756 filed Jun. 26, 2002, now U.S. Pat. No. 7,548,875 issued Jun. 16, 2009, which claims the benefit of U.S. Provisional Application No. 60/301,681 filed on Jun. 27, 2001, U.S. Provisional Application Ser. No. 60/303,115 filed on Jul. 3, 2001, U.S. Provisional Application Ser. No. 60/312,450 filed on Aug. 14, 2001, and U.S. Provisional Application Ser. No. 60/343,159 filed Oct. 26, 2001, each of which is hereby fully incorporated herein by reference.

TECHNICAL FIELD

This invention relates to a method of delivery and play back of sound and image files for wireless and non-wireless electronic devices.

BACKGROUND ART

The general concept for delivery of sound recordings or clips and visual recordings or clips by way of the Internet is known and described in various U.S. patent applications. (See Bernard et al., U.S. Pat. No. 5,918,213; Kaplan, U.S. Pat. No. 5,963,916; Barbara, U.S. Pat. No. 5,926,789; and Doerr et al., U.S. Pat. No. 5,949,411.) Such methods are typically used to sell products to consumers. For example, a web page from Amazon.com allows a user to listen to samples of music for before purchasing compact discs (CD's) by mail.

Also, cell phones may be programmed to ring with a tune of a song or musical composition, and have become increasingly popular. However, cellular phones currently on the market can only be either programmed to only play music (such as conventional MP3 type phones) or to deliver "ring tones" with an electronic chime or ring tone rather than an actual recorded song, human voice, or musical composition. Additionally, these ring tones must be factory installed in the telephone or the delivery methods just directly interface with the Internet and require the consumer to be on line to access and download a particular mechanical ring tone.

At the same time, various methods have been developed and are being used to enable a phone user to make more effective use of the variety of telephone service now available. For example, "caller ID" function is one such feature which allows the recipient of an incoming call to identify the caller based on textual information provided on a telephone display panel. A patent to Borland, U.S. Pat. No. 6,178,230 discloses an improved telephone system and method that determines the identity of the person being called for a telephone having more than one user and can identify the person being called by sounding a distinctive ring associated with the person being called. A mechanical ring tone is played depending upon the caller ID signal received to orally alert the telephone user as to who is calling without reading the telephone's display panel.

DISCLOSURE OF INVENTION

The present invention provides an improved method for delivery and play back of sound and image files which include songs, musical compositions, and other sound recordings cartoons, movies, television shows, or any other type of performance, which may be copyright registered, as well as non copyright registered personal recordings (e.g., personal sound recordings, family photos, home movies, etc.). This new method includes the use of sound and/or image clips, which can be snippets or full files, as alerts for a variety of electronic devices or for playing on a handheld device. A collection or library of uniquely selected and/or edited clips may also be provided to the consumer in a manner far more conveniently on conventional telephone equipment than previously available.

The method provides the consumer with a unique way of accessing and browsing through selectable files which may be Internet based or independent of the Internet. Additionally, the unique delivery method provides a seller or service provider with a convenient and more efficient way of promoting and selling entire sound and image files which include downloadable music, movies, films, shows, and items such as records, cassette tapes, CDs, videos, and DVDs.

Algorithms are provided for the delivery, storage and playback of the sound files, including a delivery method algorithm, a parametric optimization and compression algorithm, and an error correction algorithm.

According to one embodiment, sound files are accessed by a cellular or landline telephone for allowing the consumer to browse, download, hear and/or purchase sound files or use sound files including sound clips as ringer sounds. In contrast to the conventional ring tones or musical chimes used to ring cellular phones currently on the market, the current invention provides a method for ringing cellular phones (both analogue and digital) and landline telephones with real sound recordings including real music, which may be songs lifted from copyright registered CD tracks, and may comprise human voice, various instrument sounds, and other sound effects of a high quality. Instead of simply tones being played the higher fidelity musical composition can be played by the telephone or other handset with a degree of fidelity previously unavailable using conventional methods. The high degree of fidelity is achieved using data compression, error correction and parametric optimization algorithms adaptable to conventional telephones and other handheld devices.

A software based system for encoding the hardware of existing cellular phones at the time of manufacturing with delivery, storage, and playback capabilities in accordance with the present invention is provided, such that additional hardware is not required. (Only a suitable speaker need be required with most telephones already possessing the necessary quality of speaker.) The ability to provide this technology without the need for extra hardware is very significant, particularly to the cellular phone industry, as it is especially desirable to make cellular phones as lightweight and as small as possible and at the lowest cost.

An accessory attachment to standard telephones can however be incorporated to implement the delivery, storage, and playback capabilities of the present invention to existing landline and cellular telephones which have not been encoded at the time of their manufacture, if necessary. Such accessory attachments are compatible with existing telephones, and may be sold separately. Also, a micro chip may be embedded in landline telephones for providing the telephone with browsing, delivery, storage, and playback capabilities of the present invention.

The accessory attachment or telephone encoded with software and/or including hardware for providing delivery, storage, and playback capabilities as described herein, may be manufactured with embedded sound files including sound clips, such that a user can immediately play back the files, including use the files as ringer sounds, without having to first download any files.

Additionally, upon hearing a sound clip on the telephone, a user may choose to download the entire unedited sound file for a fee or purchase an item associated with the sound clip (e.g., record, cassette tape, CD, video, or DVD) by pressing a designated button on the accessory attachment or keys on the telephone keypad. As such, sound clips which have been downloaded to, or preprogrammed on a cell phone, may encourage and stimulate the sale of downloadable files and/or items associated with the clips by allowing the user to make an impulsive purchase immediately upon hearing the clips.

The accessing of sound and/or image files by other electronic devices, such as home phones, computers, pagers, doorbells, alarms, palm pilots, watches, clocks, PDAs etc., for either allowing the consumer to browse, download, hear, view, and/or purchase sound recordings, image files, or associated items, or to use sound and/or image clips as alerts is also part of the invention and not limited to solely telephones. New electronic devices, whose independent purpose is to allow the user to browse, receive, store and play sound and image files, including clips, according to the present invention are also described.

A security feature may be included on such electronic devices adapted for allowing a consumer to access and use sound and image files according to the present invention. This feature is designed to prevent intellectual property abuse by consumers' unauthorized dissemination and reproduction of copyright protected material. The downloaded chips or recordings are coded and cannot be downloadable or transferred to units other than the consumers' pre-selected layer or telephone.

Also, a tracking feature for keeping a record of every song downloaded and/or each time a song is played can be incorporated for providing performing rights organizations or songwriters' organizations with an accurate method for determining royalty payments to writers and performers of music.

Additionally, a website suitable for viewing and selecting downloading sound and/or image clips or entire files may be used for giving the consumer and music or image seller a unique way of transacting the sale of such files or other associated items such as records, cassette tapes, CD's, videos, or DVD's. The website may allow the clips to be stored on a user's computer, providing the user the ability to readily access the clips for downloading the clips to an electronic devise, using the clips as computer alerts, or playing the clips on the computer. The user may also purchase files or items associated with the clips through the computer and/or website.

The system of the present invention may also allow the consumer to browse through hundreds or thousands of sound and/or image clips and/or files for the purpose of downloading to electronic devices with an option to purchase an associated record, cassette tape, CD, video or DVD, or download the full unclipped sound and/or image file.

Furthermore, the delivery of files including clips is not limited to web based applications. Unlike conventional methods which require computer plug-in devices for delivering and transferring digital music, the current invention may use a delivery method which allows the user to browse, download, and listen to or watch sound or image files without the need for hand wired plug-in devices or a computer connection to the Internet.

BRIEF DESCRIPTION OF DRAWINGS

FIGS. 6 A-D illustrate the electrical schematics of a mobile telephone accessory unit in accordance with the present invention.

MODE(S) FOR CARRYING OUT THE INVENTION

Figure 1:
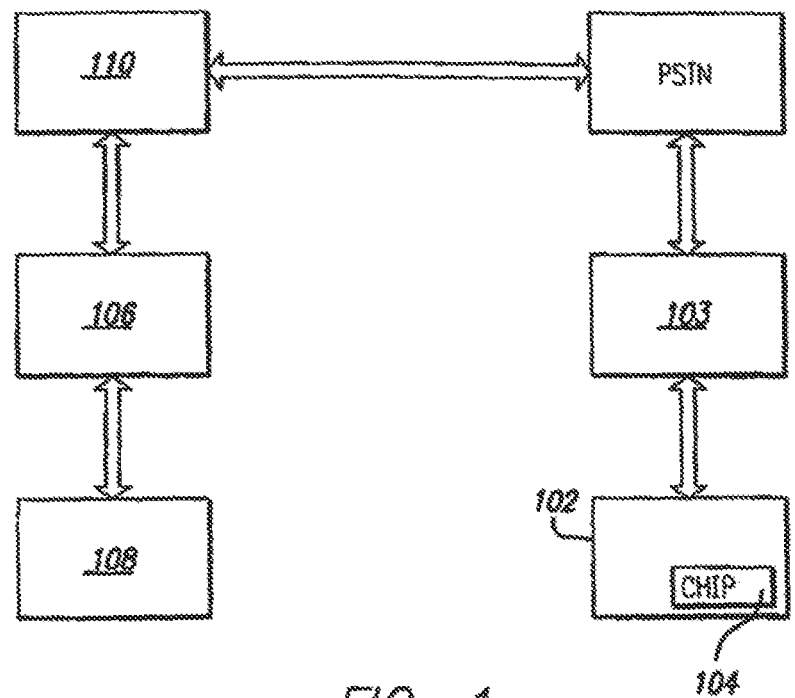
FIG. 1 is a general schematic diagram illustrating the basic components of a wireless transmission system for a landline or cellular telephone.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention uses a unique method for delivery, storage, and play back of sound and image files which include songs, musical compositions, or other sound recordings, cartoons, movies, television shows, or any other type of performance, as well as personal clips (e.g., personal sound recordings, family photos, home movies, etc.). This method includes the use of sound and or image clips as alerts for a variety of electronic equipment, and provides the consumer with a unique way of accessing these files which may be Internet based or independent of the Internet.

The present invention may include a number of modules for an overall system of delivery of music and audio/visual files. These modules include a server of the files accessible by way of a specialized website for viewing, selecting, sampling and downloading selected files or portions thereof or directly accessible without going through a website. A telephone, be it conventional, cell phone or other hand held device with access to a communication network can access the server either directly or through the website. Special algorithms allow the transfer of the files to the handset providing the high gravity recording in a file formal which allows for tracking and security against unauthorized reproduction. The individual elements of the invention are unique as well as the overall system of delivery tracking and security. Described below are more detail aspects of the invention and its use.

Use of Sound and/or Image Clips as Alerts for Electronic Devices

According to one embodiment the system allows for sound and/or image clips which are snippets of a musical and/or visual performance piece to be used for sound and/or image alerts in electronic devices. A library or collection of uniquely edited clips may be provided to the consumer for browsing and selecting files to be stored on the electronic device. The consumer may also use home made personal clips (e.g. personal sound recordings, family photos, home movies, etc.).

The sound and/or image clips may be lifted from CD's, movies, TV shows, and the like, and are actual recordings, which may include human voice, instrument sound, and other sound effects, rather than mere electronic chimes or tones as those produced by conventional cellular phones. Electronic devices which may utilize sound and/or image clips as alerts include, but are not limited to cellular phones, land line phones, computers, clocks, watches, pagers, door bells, car alarms, palm pilots, and personal calendars. It should be understood that although using clips for alerts is preferable, full unedited files may also be used.

According to one embodiment, real music sound clips are used to "ring" a cellular or home phone. A clip or series of clips, which the user can select, are played instead of the conventional electronic chime or ring tone. Such a system may be implemented on conventional cellular phones, which may be analogue or digital, by downloading firmwear comprising algorithms for delivery, storage, and playback of the sound files, to the RAM element of the phone. Such algorithms include a delivery method algorithm, a parametric optimization and compression algorithm, and an error correction algorithm. Alternatively, an accessory unit that attaches to the cellular phone for implementing the system of the present invention may be provided.

According to another embodiment, sound and/or image clips are used for computer alerts such as e-mail notification sounds. Clips may also be used to ring a doorbell. Sound clips may further be used by a clock or watch to sound at the beginning of each hour, similar to a grandfather clock, wherein a different sound clip may be played at each hour.

The present invention allows the user to store hundreds of different alert clips on a device. Unlike conventional electronic equipment which hold a limited number of selectable alerts, such as a conventional car alarm or music player alarm clock, the present invention allows the user to choose from an unlimited number of clip files including allowing the user to create his own alert clips or to choose from a library of uniquely selected and/or edited files, including samples taken from CD's, movies, television shows and the like.

A cellular phone, or similar device (having a processor, RAM, and flash elements) may be integrated with software at the time of manufacturing for implementing the system of the present invention. Alternatively, a chip may be embedded into the device or an accessory unit, including a speaker, which attached to the device for implementing the system of the present invention may be provided. The accessory unit may have an adapter connection to the device. Such accessory unit may be sold with several adapter outlets to enable it to fit onto a variety of different electronic devices.

Sound and/or image clips may be pre-stored on the electronic device or accessory unit at the time of manufacturing, such that the consumer may be able to used the clips for alerts, without first having to select and download clips.

A user of an electronic device, according to the present invention, may download and store a number of clips off of a website via a plug-in connection of the device to the computer, or via a wireless network system such as the Apples Airport. Additionally, a non-Internet based holding system, which may be especially adapted for delivering clips to the electronic device or accessory unit may also be provided. Such holding system may be accessed via a phone dial in connection wherein a user may interact with the holding system by using the phone keypads or voice commands. Other controls for interacting with the holding system, such as control buttons, voice commands or text keypads, may be provided on the accessory unit or the electronic device itself which may be especially adapted for interacting with such holding system. The accessory unit or electronic device itself may also be sold preprogrammed with embedded clips for demonstration use.

Additionally, such electronic devices may be capable of receiving or sending clips directly from one device to another device. To prevent transferring of entire files from one device to another, a security feature may be included on the devices and work in conjunction with the file.

One method of preventing the transferring of files is to encode each electronic device or accessory unit with unique scrambling/unscrambling wave capabilities. As such, when a user transfers an entire me to his device, say a cellular phone, for which he pays a fee, a scrambling wave, which may be a function of his unique telephone number, may be encrypted in the file. Upon playing the file, the user's cellular phone sends the corresponding unscrambling opposite wave. Other devices purchased by the same user may also include the unique scrambling/unscrambling wave encryption capabilities associated with the user's telephone number. As such, the files may only be played with clarity on the device or devices owned by the user, even if such files are transferred to other devices.

The security lock mechanism allows the original music or its representative to control distribution of music, and also provides an opportunity for music distributors to keep track of who plays their music. As such, a method of accounting for royalty payments to artists and performers and other parties registered with performing rights organizations such as ASCAP and BMI may include providing a tracking feature on electronic devices used by businesses such as bars, restaurants, and clubs to play music. In addition to allowing a record to be kept as to which music files have been downloaded and stored on the electronic device, the tracking feature may also record information on how many times and when each song has been played. This allows performing rights or music writers organizations the ability to keep an accurate record on which to base royalty payment distributions.

An electronic device having stored sound or image clips may include various features which allow the user to preprogram the clips to play in a set sequence or a random order. (For example, certain clips which may be from the same or different songs may play in a congruous or back-to-back order with a fixed silence time between the clips.) Additionally, the device may have features allowing the user to classify and arrange the clips based on categories such as the type of clip (i.e., movie, song, etc.), artist name, time period, etc.

Thus, a user of an electronic device utilizing the clips according to the present invention will be able to arrange the clips either through a website from which the clips can be downloaded onto the device, or through the device itself.

Additionally, after listening to or viewing a clip, the user can choose to download the entire file from where the clip originated (i.e. the entire movie, song, etc.). The server providing the clips and the files may provide the clips for free or for a small fee as inducement for the consumer to ultimately download the entire file for which a greater fee may be charged.

An electronic device according to the present invention may also have the ability to receive clips which are directly transmitted onto the electronic device via audio or visual broadcasts. The user of an electronic device may program the device to sound a specified broadcast as an alert sound. For example, a sound segment from a live radio show (i.e., a sports show or a commercial) may be used to ring a cellular phone by either the caller or the callee.

Advertisements may also be transmitted through the electronic devices according to the present invention. A message such as "pick up the phone and don't forget to drink Coca Cola™" may be used to alert of an incoming call. Such transmitted advertising messages need not necessarily function as alerts.

Additionally, this invention contemplates the use of image and sound clips which can be combined such that the user can create a unique clip of both sound and image for use in electronic devices having display screens. For example, a phone having an appropriate display screen can be preprogrammed to display a visual clip of a caller accompanied by sound, or a computer alert may display an image clip with sound. An image clip may comprise a single image frame or a picture clip as well as an animation.

Website to be Used as a Support Tool for Downloading Clips to Electronic Devices and Method for Selling According to a preferred embodiment, a website for downloading sound and/or image clips holds a library of clips, each clip having a specific identifying code or icon which may include, for example, the title of a musical composition or movie from where the clip originated, the name of the artist, a code number, or other type of identification depending on the type of clip. For example, a song clip may be listed as barrywhite@lovestuff.wav, or may display the picture of the song artist or CD cover of the CD on which the song appears, along with the name of the song. The list may be organized according to the artist's name, by music classification (i.e., pop, jazz, R&B, hip hop, etc.), by length of the sound clip, by the type of sound clip (i.e., song, piano music, guitar music, loud, quiet, etc.), or any combination of these categories or other conventional categories depending on the type of clip (image or sound). The website may also include categories of longer clips which may be more suitable for phone rings, and shorter clips which may be more suitable for computer alerts. The website may further contain a suggested list of weekly or daily favorite clip picks, which may be provided for each category or subcategory. Additionally, items or subcategories in a given category may be organized alphabetically, by year of copyright, or any other conventional order.

Tables 1 and 2 are examples of possible arrangements for sound clips using music classification and artist name. Note that the listings of Table 1 such as barrywhite@lovestuff.wav are not websites, but use symbols associated with web use, such symbols being one of the many arbitrary ways of listing the clips. The symbol-driven website-like listings may end with other non-domain suffixes such as ".pop", ".song", etc.

Additionally, this invention contemplates the use of website hyperlinks associated with each listing as shown below in Tables 1 and 2.

TABLE 1

| R&B | Jazz | Rock |
|---|---|---|
| Barry White | Herb Albert | Chicago |
| barrywhite@lovestuff | herbalpert@sunspots.pop | chicago@fellings.wav |
| barrywhite@deepvox | herbalpertgdatingame.pop | chicago@time.wav |

TABLE 2

| R&B | Jazz | Rock |
|---|---|---|
| Barry White | Herb Albert | Chicago |
| BW-01 A-Sexy | HA-01 A-Date | C-01 A-Begin |
| BW-02 A-Love | HA-02 A-Bull | C-02 A-Search |
| BW-03 A-Peace | HA-03 A-101 | C-03 A-Color |

The clips may also have an identifying number associated with each clip. Such identifying numbers may be used in downloading the clips to an electronic device using a telephone (described below) or other device having a number keypad. The website may further include a virtual personal locker or storage area for storing a selection of clips personal to a user which can be accessed on the website by a unique user identification name or code. As such, a user can store clips for later purchasing, downloading to the user's cellular phone, playing, etc. The website may also allow the user to upload personal clips such as family photos, voice recordings, home movies, and the like, to the storage locker for later downloading to the user's cellular phone or other electronic equipment. The storage locker may include an organizer for storing the clips in alphabetical order, by various categories, or any other order.

The website may allow for direct downloads of the clips from the website to the computer itself or to other electronic devices.

To illustrate how downloading through the website may be carried out, a user operating the computer may drag his/her mouse over the various listed sound or image clips and click on one or more selected clips. Thereafter, a box can appear prompting the user to select the appropriate electronic device onto which the clip or clips are to be downloaded (e.g., the box may say "CELLULAR PHONE DOWNLOAD OR COMPUTER ALERT DOWNLOAD?" Assuming that the "CELLULAR PHONE DOWNLOAD" button is selected, a prompt for typing in the appropriate cellular phone number will follow. Thereafter, the selected clip or clips may be uploaded to the user's personal locker and made available for downloading to the user's handset.

Other features may also be included, such as an option allowing the user to arrange multiple downloads in a specific order, create a folder for grouping multiple downloads, or a feature incorporated into the phone which causes it to ring a selected clip immediately after it has been downloaded. Additionally, clips, which have been previously downloaded to the phone may be deleted, rearranged, or reclassified with or without using the website. (There are other methods for storing clips on an electronic device such as a cellular phone, some of which are described below, including direct downloading access for phones without the need for web phone access capabilities).

Alternatively, by clicking "COMPUTER ALERT DOWNLOAD," the selected clip will be downloaded to the user's computer, allowing the user to select many different sound and image clips for computer alerts, such as e-mail notification, computer alarm clock, and computer calendar notification.

Additionally, multiple clips may be associated with one type of alert, such that a different clip is played for each alert event. The user will be able to rotate alert clips and preprogram or randomize their order similar to a CD stereo carousel.

The user will also be able to hear or view a selected clip which will play on the website upon the user's command. Browsing capabilities wherein the user can drag his mouse over the sound clips library of selections and hear the clips without having to click or open a file may be included in the website. According to a preferred embodiment, a user simply drags his mouse over various clip samples, which light up or flash and play one at a time. Any time the user places the cursor over a category of music, the first tune in that category plays, and the icon representing that category of music switches to display the name of the artist and title of the song or composition being played. Once the user clicks upon that icon, he can select the next song and hear the song while at the same time seeing the name of the artist and song title. The user can cycle through all the songs within that category using this approach very quickly to not only browse but to also hear the music. If the user does not wish to switch over to another category of music, he simply moves the cursor to another icon and repeats this procedure. To select a particular song the user double clicks on the song, which is then included in a collection of selected songs to be downloaded later.

The website may be used as a shopping forum where consumers can hear or view the clips and click to buy items associated with the clips such as music records, cassette tapes and CD's, DVD's, and movie videos, or download the entire sound or image file to their computer for a fee. By allowing the user to sample and download clips for use as alerts in electronic devices, the website will provide an attractive forum for selling items associated with the sound and image clips, and for allowing the user to download the entire file associated with the clip, for which a fee may be charged.

Additionally, an identifying mini icon such as the song title or recording artist CD icon associated with a clip or with a group of clips may appear on the computer screen at a fixed location and/or at the screen display where the clip plays a computer alert. The icon may include a "buy" button which will allow the user to purchase an item associated with the clip, or download the entire file from which the clip originated by clicking on the button. Such "buy" button may be a hyperlink to a website for transacting the purchase. Where a CD icon is not used, the user may click on the song title to purchase an item associated with the clip. If the clip comes form a song that exists on more than one CD, the customer will see more than one CD cover to choose which CD to buy.

The utility of clips as alerts for electronic equipment will provide consumers with incentive to browse the website and sample the clips. After hearing or viewing the clip, consumers may be induced to purchase items associated with the clips, which they will be able to do instantaneously through the website by the click of their mouse.

The website may further be used as a contest forum. The website may be set up to play mystery clips or short segments of sound recordings which contestants will have to identify in order to win a prize (i.e., by being the first to e-mail or call with the correct answer). Thus, a radio show may set up a game where a short segment of a sound clip is played on the radio or user's phone for contestants to guess and is also available for the listeners who want to hear it again on the website.

The website may include forwarding capabilities, such that a sound or image clip can be forwarded as a greeting to a friend. (The security feature may be used only to prevent transferring of entire files). Consequently, the website will attract customers for the purpose of downloading clips to electronic devices and ultimately purchasing items associated with the clips. Additionally, the user may subscribe to a service such as an existing cell phone service provider for downloading files through their telephone, without having to be online.

The user may also create a clip (e.g. by recording a song or personal clip) and store the clip onto a sound storage element in the electronic device. Additionally, the electronic device can be preprogrammed with clips selected by the manufacturer retailer of the device.

Accessing of Sound and/or Image Files without Access to Internet

Sound and/or image files which include clips may be downloaded without use of the Internet by allowing a user to access a library of clips via their cellular phone or home telephone or providing other electronic devices with features which allow automatic access to the library. (Although Internet free accessing will be described with respect to a telephone, it is to be understood that the method describe may be compatible with any electronic device preferably having accessing capabilities similar to a telephone).

The library may be a non-web holding unit that has files with associated codes which match the codes associated with the files on the website, wherein the website serves as a usable guide for identifying various files according to associated codes, such as numerical codes to assist the user in downloading files using voice commands or keypad commands.

Additionally, cellular phone or home telephone users may access a non-web holding unit with a library of stored files which can similarly be browsed, selected, and downloaded onto the phone using user voice commands, key pad commands, or by connection to a live operator. Such unit may be accessed by dialing a phone number (e.g., an 800 number). Home telephones and cellular phones may have separate holding units, such as a satellite for cellular phones and a ground unit for home phones, or a satellite can be used by cellular phones to access a ground holding unit.

To facilitate selection of the files from such holding unit, the access system may provide for a code associated with each file which may be obtained by browsing the website as described above. As such, a user connected to the holding unit would access the code associated with the file to select and download the file to the user's telephone.

Many other methods allowing a user to select files from the holding unit are possible. For example, the telephone may include a voice recognition feature, wherein the user can say the name or part of the name of the song he wishes to select (e.g., "Strawberry Fields" or the name of the song artist). The phone may also utilize hierarchical submenus whereby the user may press dial keys with letters corresponding to a selection in a given category which ultimately leads to the selection of a particular song. A phone having a screen display for providing a text listing of the names of songs or categories, according to hierarchical submenus, may also be used for enabling the user to narrow down to a list of songs and/or artists from which he can make his final selection.

A telephone may likewise be used to deliver files stored on the phone to a website, an e-mail address, another telephone, or other electronic device. Sound clips, which are segments of whole songs, musical compositions or other sound recordings, will be used mostly with telephones, however, downloading entire music or image files may also be done, subject to the security feature described above. Additional revenues may be generated as the consumer accesses the content library and uses airtime while browsing and downloading clips or entire songs from the library holding unit.

Furthermore, cellular phone and home telephone service providers may offer extra features to phone subscribers which would allow the subscribers to download and store sound files for use with the telephone in accordance with the present invention. Such features by service providers may include a personal sound file storage box (which may be a file of clips and/or entire sound files) that the user can access via a personal code. The user may be charged a monthly fee for a subscription to the service, and/or per downloading of each song, whether or not the user is a subscriber. Additional revenue can be generated by the service provider even if the service is provided without a special charge since consumers will use more airtime.

Telephone Using Sound Clips

A telephone having stored sound clips which may comprise real music including human voice, various instrument sounds, and other sound effects may allow the user to select one sound clip or a rotation of several clips to "ring" the phone. Although it is preferable to ring the telephone with sound clips, an entire music file may also be used, whereby for example, a song may start playing and continue until the user picks up the telephone. (Of course, entire music files may be played on the telephone solely for the user's listening pleasure). The telephone may also be programmed to ring a conventional chime if the user so chooses. Such a telephone may utilize a storage chip carrying stored sound clips as well as the conventional phone chime programmed onto it.

Additionally, the telephone may allow the user to determine how many times a clip is repeatedly played for each ring, and the time delay between clips in a given ring. The user may also choose to mix different clips in one ring. A telephone may also include a looping feature which rings the telephone in a looped clip such that the clip plays repeatedly without a pause between repetitions of the clip, or a "cluster" feature which rings a "cluster clip" comprising a multiple number of clip segments from a single song, musical composition, or other sound recording played in sequence.

Other features will allow the telephone user to preprogram the telephone to play a certain clip when a specific individual calls, thereby allowing the user to identify the caller based on the chosen sound clip. Each person who regularly calls the user may have a unique identifying ring. This will allow a telephone user to have the option of assigning a unique sound caller ID to each of an unlimited number of callers. Other features may include allowing a caller to select his own personal sound clip to "ring" the telephone of the recipient of the call. (For example, the caller may sing or record a "Happy Birthday" song.) Also, a telephone used by more than one user may utilize sound clips for a callee ID function wherein the caller identifies the intended callee (e.g., by dialing a digit or sequence of digits) and the telephone plays the clip associated with the callee.

Additionally, a telephone may be provided with a "caller message recorder feature" which allows the caller to record his/her own message to send to the number dialed. For example, the caller may send a message such as "Hey John. It's Mary. Pick up the phone," by pressing a "record ring" button on his/her phone to send such a message to John's phone. As described earlier, the telephone user, say John, may have a caller ID feature such that when a certain caller, say Mary calls, the telephone rings with a predetermined message or sound clip selected by John. The additional caller message recorder feature may cause John's telephone to play Mary's message instead of overlaying the predetermined caller ID message or clip. Additionally, John may record his own message such as "It's Mary" and associate that recorded message with Mary's phone number for a caller ID ring.

A telephone, according to the present invention, may also include a "sensory feature" for enabling the telephone to sense the level of ambient noise and adjust the loudness of the "ring" accordingly. If the phone "senses" very loud background noise, for example, a cellular phone located in a loud restaurant, the ring volume will increase. A feature for detecting whether a cellular phone is located in a pocket book or a place where the "ring" sound may be muffled is also contemplated. This feature will also enable the phone to adjust the volume of the "ring" such that the "ring" will be loud enough for the user to hear. Such detection mechanism can be achieved by detecting ambient light and other conditions.

Additionally, the user may manually adjust the volume of the ring via a tunable volume control mechanism or a multiple fixed settings control. (Although the above features are described with respect to a phone, it is to be understood that these features may also be provided with other electronic devices utilizing sound and/or image clips as alerts where applicable).

Transmission System for Delivery Clips to a Telephone

FIG. 1 is a schematic diagram illustrating the basic components for a wireless transmission system 100 for a telephone 102, having a wireless or landline service provider.

The system is described in terms of two main components: a storage chip 104, and a server 106. The storage chip 104 is an element associated with the telephone which may be embedded into the phone or into an accessory unit which attaches to the phone, having abilities to interface with the phone. The existing hardware of a cellular phone may also be integrated with a software system which may be downloaded to the RAM element of the cell phone for incorporating the present invention, without the need for extra hardware. As such, the existing hardware of the cellular phone may be made to perform the same function of the chip.

The purpose of the chip 104 is to store a selection of clips, allow for downloading of clips to be stored on the chip 104, and allow for the playback of clips, either by the telephone or the chip 104. (Although the description herein refers to sound clips, it is to be noted that entire sound files may be stored, downloaded, and played, according to the system described). Additionally, the chip 104 can associate the stored clips with a caller ID so that the particular clip to be played back is determined by the calling subscriber ID.

The server 106, which is associated with a collection of stored clip files 108, is designed to execute requests of the chip 104, which may be given through user voice commands or commands using the phone keys. The server may be equipped with a voice adapter no for supporting the ITU-T Y.253 standard and telephone lines attached to the voice adapter. The voice adapter can also support some standard modem protocols, like Y.32 or Y.34, if required for compatibility.

The server 106 also allows for files to be transmitted to the chip 104 for storage. The system 100 enables a connection to the server 106 upon a request from the chip 104, utilizing the phone, and/or PSIN (Public Switched Telephone Network), and/or a voice card (voice modem) attached to the server computer.

The system may have a voice menu, which, after connection to the server 106, allows the user to listen to the server's menu and navigate through the system of voice menus using the telephone's Dual Tone Multi Frequence (DTMF) keys. The system may allow the user to select and download clips by allowing the user to listen to the clips presented by the server 106, select a clip, and issue a download command to the server 106. The server then sends the selected clip (e.g. in digital compressed form) using a Custom Data Transmission Protocol (CDTP) over the voice channel. (Illustrated in FIGS. 2 and 12).

The system 100 allows for storage of a large number of clip files in the chip's memory. The system's server 106 utilizes a music compression algorithm, shown in FIG. 15, which converts common music files into compressed files that are downloaded and stored by the chip 106. For example, a chip supporting the storage of about 1000 clips, each being approximately a few minutes in length, may have a flash memory size of about 40 Mbytes. The chip 104 may also have a sound output element such as speakers.

The server comprises software which can run under Windows 98, Windows-NT OS, or other suitable system using a voice modem for communications. Additionally, the system may use a single modem or a pool of several modems.

Preferable Embodiments for a Telephone System

Figure 2:
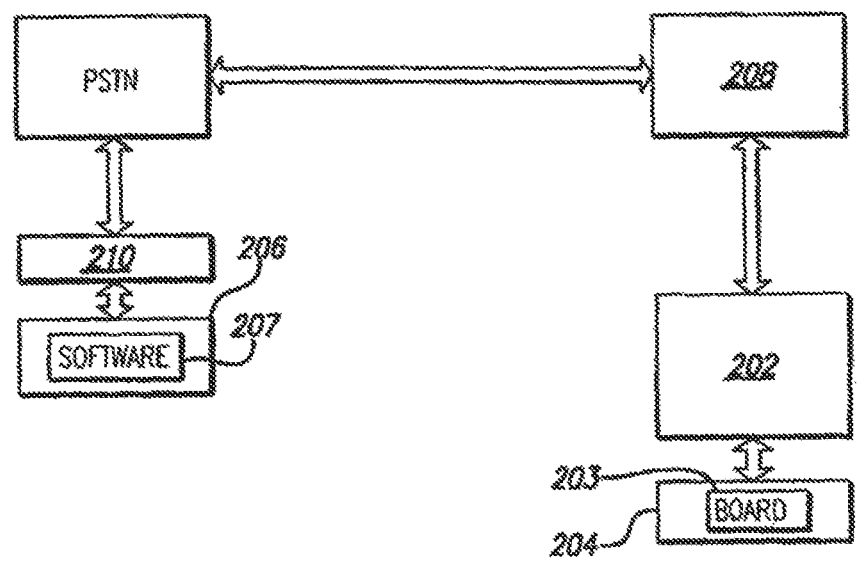
FIG. 2 is a schematic diagram of a wireless transmission system for a cellular phone.
Figure 12:
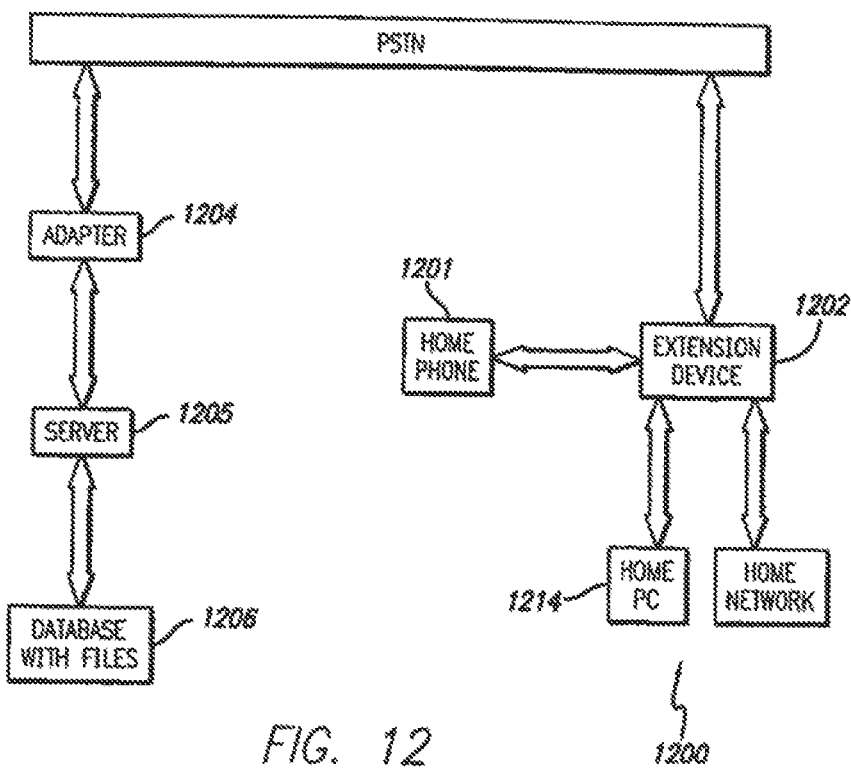
FIG. 12 is a schematic diagram of a landline transmission system for a home telephone.

Examples of telephone systems utilizing the method of the present invention include a cellular phone which may utilize an analogue (voice-only) system or a digital system, and a conventional land line telephony network. A system for using a cellular network infrastructure is shown in FIG. 2. A schematic diagram of a landline transmission system for a home telephone is shown in FIG. 12. (Again, although the following descriptions make reference to the use of sound clips, it is to be understood that entire sound files may also be used as described).

All described examples assume existence of a server preferably dedicated for servicing user requests and providing sound clip data download capabilities. A corresponding chip, implementing all required functions is associated with the telephone.

The server may be a computer running Microsoft Windows or other suitable environment, such as a Pentium PC, Win95/98/NT/2oo0, 128 Mb RAM, 4 GB HDD. The server may store or be capable of accessing a sound clip database, which may be stored on a website or non-web holding unit. The sound clip database is stored in a compressed file format of those commonly known.

Figure 4:
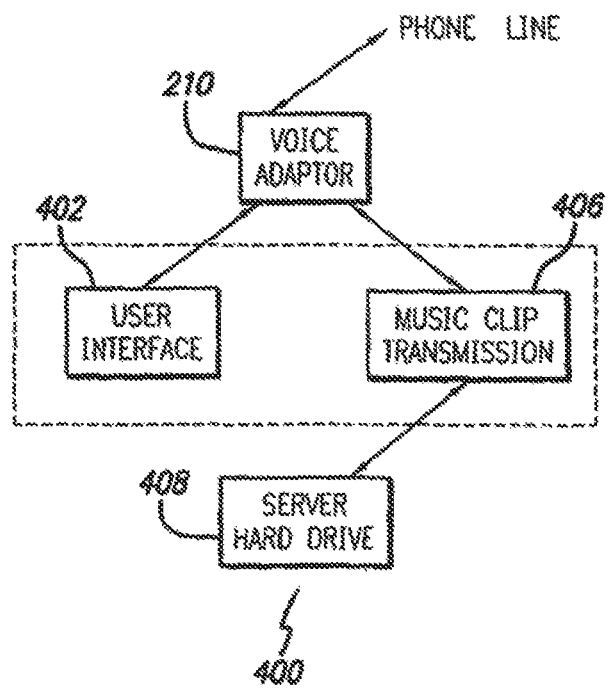
FIG. 4 is a schematic diagram of a server software system for the system of FIG. 2.
Figure 14:
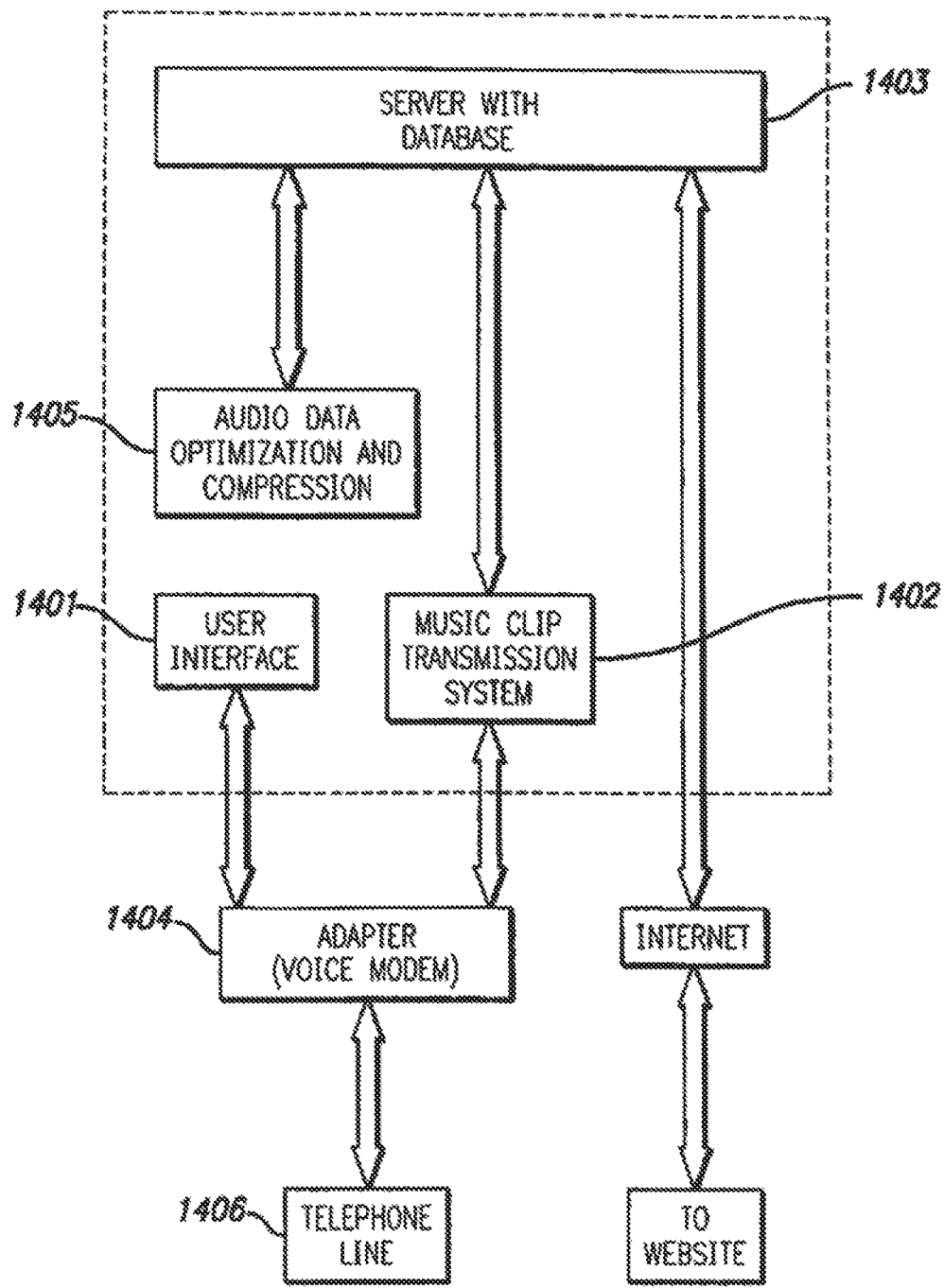
FIG. 14 is a schematic diagram of server software for the system of FIG. 12.

A schematic diagram for a server software system is shown in FIG. 4 for a cellular phone system, and FIG. 14 for a landline system. The software may be written in C++ under Microsoft Windows or other suitable language. The functions of the server software include servicing user requests via a user interface element and transmitting a selected sound clip through the phone line via a music clip transmission element.

According to a preferred embodiment, the functions of the user interface element include decoding DTMF keys pressed by the user and playing the voice menu labels to the user. The voice menu interface may include hierarchical submenus, leading to different functions. In all examples, the user interface element can be unified in the sense that the voice interface and DTMF or voice recognition-based interface are independent of the type of network or type of phone(s) used. Implementations that utilize a single server to process requests originating from different types of networks and/or phones can therefore be built.

The system of submenus leads a user to the downloading of the selected sound clip. Thereafter, control is transferred to the music clip transmission element for downloading sound clips into the phone. The music clip transmission element interfaces directly with the phone accessory unit, independent of the user. The music clip transmission element is dependent on the type of the phone used and the network infrastructure.

Example Transmission System for a Cellular Phone and Network

FIG. 2 is a schematic diagram of a wireless transmission system 200 for a cellular phone 202, which may be either an analogue (voice-only) or digital system. In both cases, a specialized board 203, implementing all required functions, similar to the chip 104, is incorporated in an accessory unit 204 attached to the cellular phone. Although the system 200 is described as incorporating an accessory unit, it should be understood that a chip performing the same functions of the board may instead be embedded in the phone itself, or a software system may be integrated with the existing hardware chip of a conventional cellular phone without the need for additional hardware. The system 200 further includes a server 206 and software 207 for the server.

The cellular telephone 202 may be any commercially available cellular phone having capabilities for supporting a command set for general telephone control, [i.e., a Y.25 Ter serial asynchronous automatic dialing and control as recommended by the ITU-T (International Telecommunication Union-Telecommunication sector)] and for supporting Y.25 Ter "+C" extensions according to the ETSI (European Telecommunications Standards Institute) ETS300-916 standard for obtaining codes of keys pressed by the user and for receiving caller ID information. Additionally, the phone 202 should have capabilities for subscribing to a cellular provider 208 with caller ID service support.

Figure 3:
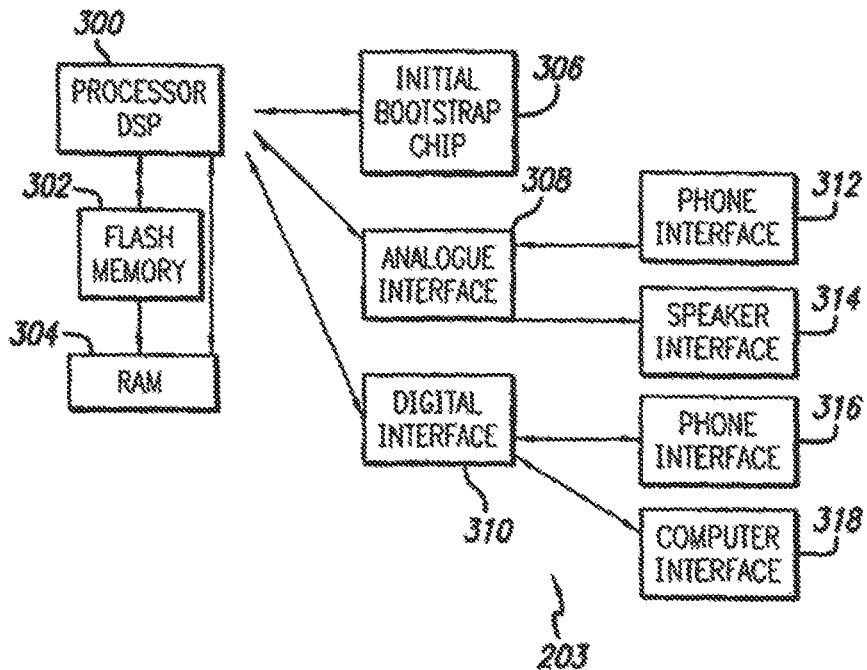
FIG. 3 is a schematic diagram of a board system implemented in an accessory unit of the system of FIG. 2.

A schematic diagram of the board 203 is shown in FIG. 3. In an embodiment where an accessory unit is used the board 203 is implemented in the accessory unit 204 which can be attached to the phone 202 through a standard extension connector where other commercially available accessories such as a hands free ear set and charging adapter are typically connected.

The board 203 includes the following main blocks: a Digital Signal Processor (DSP) 300, a flash memory element 302, a Random Access Memory (RAM) element 304, an initial bootstrap chip 306, an analogue interface element 308, and a digital interface element 310.

The processor 300 executes the device firmware, provides control for all other blocks and performs the computational tasks for the board 203. The tasks performed by the processor 300 include control of the board's units, monitoring of keys pressed by the user and processing of key-press events, reception of information from the computer through the computer digital interface, reception of caller ID information through the phone digital interface, reception of packed sound clips through the phone analogue or digital interface, unpacking and then playing back sound clips through a built-in speaker connected to the analogue interface of the accessory unit 204, support of a voice menu-driven user interface, and performance of other auxiliary functions.

The flash memory element 302 contains the device firmware, and sound clips which can be pre-loaded as well as downloaded from the server. The RAM element 304 enables the processor to run faster and also holds buffers for unpacked sound fragments and processor service procedures. When the power is turned on, the initial bootstrap chip 306 loads the device.

The analogue interface element 308 includes a phone interface element 312 and a built-in speaker interface element 314. The phone interface element 312 is used for input and output of signals when downloading sound clips from the server 206. The speaker interface element 314, with the speaker, plays all system sounds heard by the user including voice menus and sound clips.

The digital interface element 310 includes a phone interface element 316 and may include a computer interface element 318. The phone interface element 316 is used for phone control and for receiving key codes and caller ID information from the phone. The computer interface element 318 is used for various service functions such as downloading preprogrammed sound clips from the computer to the flash memory.

The functions of the server software, shown in FIG. 4, include servicing a user's requests via a user interface element 402 and transmitting a selected sound clip through the phone line 404 via a music clip transmission element 406.

A user interface element 402 is provided whose functions include decoding DIMF keys pressed by the user and playing the voice menu labels to the user. The voice menu interface may include hierarchical submenus which lead to the downloading of the selected sound clip. Thereafter, control is transferred to the music clip transmission element 406 for downloading sound clips into the phone. The music clip transmission element 406 interfaces directly with the phone accessory unit, independent of the user.

The selected sound clip may be transmitted through the phone line to the accessory unit 204 first through the server hard drive 408, then through the server software 207, next through the voice adapter 210, then through the phone line of the network to the cellular service provider 208, to the cellular phone 202, and through the analogue interface 308 of the accessory unit 204, then through the processor 300 of the accessory unit 204, and finally, through the flash memory element 302 of the accessory unit 204. When the sound clip transmission is completed, the task of the music clip transmission element is completed. Thereafter, the phone line 404 is released and control is transferred to the user interface element 402.

In an autonomous mode, the board 203 may contain a number of pre-loaded sound clips. Initially, the board 203 is in the inactive state. The board 203 and phone 202 interact such that the phone sends to the board codes of all the keys pressed by the user. Upon receiving a particular sequence of codes or when, for instance, a particular key is pressed for a prolonged period of time, the board 203 switches to the active mode. In the active mode the board 203 may interact with the user via a voice menu-driven interface where voice messages, via a speaker, prompt the user to respond by pressing a selection of phone keys indicating the user's responsive selections. The board 203 reacts to the user's selections by analyzing the keys being pressed.

The clips are stored on an internal clip index which can be retrieved from the internal memory and played back according to key commands provided by the user. Examples of voice menu options provided by the device 204 through a speaker upon switching to an active mode include: 1) the user may choose to exit the active mode and enter the passive mode (e.g., by pressing "0"); 2) the user may choose to listen to the current sound clip on the clip index (e.g., by pressing "1"); 3) the user may choose to listen to the next clip on the index (e.g., by pressing "2"); 4) the user may choose to listen to a previous clip on the index (e.g., by pressing "3"); or 5) the user may choose to assign a caller ID number to the current clip on the index (e.g., by pressing "4").

Upon choosing to assign a caller ID phone number to the current clip, the device may switch to a sub mode with a sub-menu having the following options: 1) the user may choose to switch back to the previous menu (e.g., by pressing "0"); 2) if the selected clip was already assigned, the user may choose to get information regarding the caller ID already associated with the clip (e.g., by pressing "1"); or 3) the user may input a new caller ID phone number for the current clip (e.g., by pressing "2" indicating this choice, then dialing in the phone number followed by the "#" sign).

In the passive mode, the device 204 may analyze messages being received from the telephone 202. Upon receiving an incoming call, the device 204 checks the incoming caller's phone number against the list of assigned caller ID sound clips in its memory and plays back the particular sound clip through the built-in speaker if the specified caller's phone number was assigned to this clip. Alternatively, the device 204 may play back a default sound if the particular caller ID was not assigned to any clip.

In order to transfer digitally compressed sound clip data through the analogue channel a special method and algorithm to map digits to sounds is used. This method is implemented not only for a cellular telephone using an analogue cellular network but also for a landline transmission system of a home phone, shown in FIG. 12.

Method for Data Transmission Over an Audio Channel of a Wireless Telephone

Figure 5:
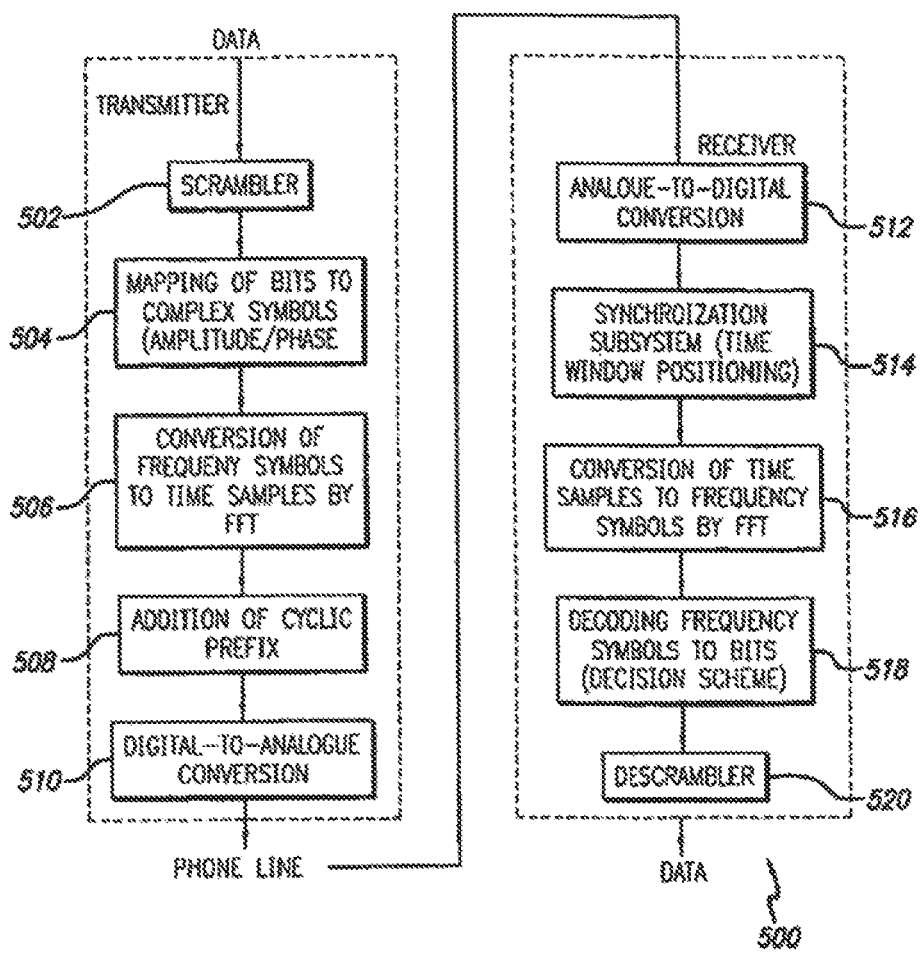
FIG. 5 is a flow chart illustrating a data transmission method.

A data transmission method 500 for transferring data through the phone line and the receiver, based on a voice mode connection (versus data mode) and DIMF signal interpretation is illustrated in FIG. 5. A similar approach can be implemented for a landline telephone that does not have a data transmission mode.

For transmitting data through the phone line, the transmission method 500 comprises the steps of a) data scrambling 502, b) data mapping 504, c) conversion of frequency symbols to time samples 506, d) addition of cyclic prefix 508, and e) digital to analogue conversion 510. The data is then sent through the receiver, following the reverse steps of f) analogue to digital conversion 512, g) symbol synchronization 514, h) conversion of time samples to frequency symbols 516, i) decoding frequency symbols to bits 518, and j) descrambling the data 520.

The transmission method is used to provide enough speed for the data transmission. The transmission method allows simultaneous use of the voice communication and data transmission features (during one connection session) without having to switch the mode of connection. A customer does not need to use a Wireless Internet Service Provider. A user can simply place a regular call to the specific number (e.g., an "800" number) to gain access to the Server. The dual-mode connection allows for voice and "push button" support as well as voice recognition service.

An orthogonal frequency-division multiplex (OFDM) modulation scheme is used for data transmission. The benefits of OFDM include: 1) the modulation can be made robust to Inter-Symbol Interference (IS!) by increasing symbol size; 2) the modulation can be made robust to impulse noise by increasing symbol size; 3) for each individual sub-channel, the channel's response could be considered essentially flat, minimizing the need for channel equalization; and 4) different encoding schemes could be used for different sub-channels, for accommodating frequency-selective channel distortions.

The total bandwidth to be used by the method is determined by the worst case of supported audio channel. A suitable algorithm for compression of the voice channel is the GSM RPE-LTP algorithm which essentially has a built-in downsampling by a factor of 3 in which the allowed bandwidth is limited at 4000/3=1333 Hz. Usually channel response is severely limited at frequencies below about 200 Hz to 250 Hz. No OFDM symbol time-windowing is employed to minimize variations of transmitted signal amplitude envelope.

A compressed voice channel can also introduce significant non-linear distortions. Therefore, it is not feasible to have a large number of sub-channels; otherwise the algorithm would be affected by significant inter-channel interference (ICI) due to loss of orthogonality between sub-channels. About 32 sub-channels appear to provide enough symbol size while maintaining satisfactory low ICI.

Modulation Symbol Structure

Each OFDM symbol consists of a minimum number of samples sufficient to represent all sub-channels. To increase computation efficiency, a Fast Fourier Transform is employed to convert sub-channel symbols from frequency to time area. Therefore, for 32 sub-channels, OFDM symbol size should be at least 64 real samples (at 2666 Hz rate). A circular prefix of 16 samples is used to improve separation between symbols, and minimize ISI (Inter Symbol Interference) and ICI. Therefore, total symbol size is 80 samples at 2666 Hz.

Receiver Synchronization

Circular extension prefix redundancy, present in the signal, is used to facilitate OFDM symbol synchronization in the receiver. A synchronization subsystem effectively computes auto-correlation coefficients of the received sequence (e.g., at 2666 Hz). The output of the correlator goes through a "rectifying" phase-locked loop-like system which outputs synchronization impulses at the proper time instants to sample OFDM symbols correctly.

Synchronization system induced timing jitter leads to rotation of received sub-channel phasors by increments, proportional to the central frequency of a particular sub-channel. This rotation is compensated in the decision scheme.

Data Mapping

The output of a scrambler is mapped onto complex symbols (amplitude/phase) of the OFDM sub-channels. Individual sub-channels use QPSK (Quadrature Phase Shift Keying) modulation.

Data Scrambling

Data scrambling is employed in order to provide statistically random distribution of transmitted symbols to reduce peak-to-average power ratio of OFDM symbols. A self-synchronizing scrambler with generating polynomial of is 1+X1B+X23 is used which, at the transmitter, effectively divides the data sequence by the generating polynomial. The coefficients of the quotients, taken in descending order, form the output data sequence.

Example Using Analogue Cellular Network and Cellular Telephone

The above-described accessory unit 204 is provided in this example in the context of analogue (providing only voice channel) cellular network.

Initially, the device 204 is in an inactive mode. A user dials the server number and, navigating through a system of voice menus supported by the server software, listens to and selects a particular sound clip in the same way as browsing the loaded sound clips in the autonomous mode. Instead of assigning a caller ID, the user may choose to download sound clips.

When a user, navigating through the server voice menus, selects to download the current clip and in the embodiment using an accessory unit activates the accessory unit 204 through the predefined key sequence, the process of transmission of the selected sound clip is initiated. After selecting a "download" option, the user may press a specific key combination on the phone to switch the accessory unit 204 from the inactive to the active mode. The unit 204 then begins to interact with the server 206, using the analogue channel provided by phone and network. The already established phone connection is used to receive information. The device may receive the sound clip selected by the user and download it into internal flash memory.

At the end of a session, the unit 204 forces the telephone 202 to hang up and switches to the autonomous mode which enables the user to assign a new caller ID to the sound clip just received. When a user, navigating through the server voice menus, selects to download a clip and activates the accessory unit 204 through the pre-defined key sequence, the process for transmission of the selected sound clip is initiated.

The selected sound clip is transmitted through the phone line to the accessory unit 204 first through the server hard drive 408, then through the server software 207, next through the voice adapter 210, then through the phone line of the network to the cellular service provider 208, to the cellular phone 202, and through the analogue interface 308 of the accessory unit 204, then through the processor 300 of the accessory unit 204, and finally, through the flash memory element 302 of the accessory unit 204.

Generally, the server software 207 retrieves the selected sound clip from a database 212, converts it to the special sequence of sounds modulates, transfers codes of these sounds to the voice adapter 210 that converts these codes to actual sounds and transfers these sounds to the phone line 214. From the phone line 214, the sounds go to a cellular provider 208 through to a radio channel, and to the cellular phone 202 itself (much like voice sounds are transferred during a normal phone conversation). The sounds then go through the connector and are received in analogue form by the board 203. The sounds are then converted by the device ADC (Analog to Digital Converter) to the digital form and are processed by the DSP (digital signal processor-"demodulated") 300 to the same digital data form initially stored on the database 212 (e.g., in MPEG audio format). In this form, the sound clip data are written into the flash memory 302 of the device 204.

Following a reverse direction, going from the board 203 to the server 206 using the same chain, the device sends to the server either an "acknowledgement" of a successful delivery of the sound clip data or a list of data blocks received with errors so that these blocks can be resent in a second try. In order to transmit digital data through the analogue channel, a similar procedure is used to convert data to sounds and back.

When all the data is transferred without errors, the board 203 signals to the server 206 that the call may be disconnected. Thereafter, the server 206 instructs the voice adapter 210 to hang up, freeing the phone line for another client, and the board 203 switches to the autonomous mode, allowing the user to assign a caller ID to the sound clip most recently downloaded.

Example Using Digital Cellular Network and Cellular Telephone

The above-described accessory unit 204 is used in this example in the context of digital (capable of providing a dedicated data transmission channel) cellular network. Since in this case a digital channel is used for sound clip data transmission, no modulation is required on the mobile phone side. The server, on the other hand, uses a modulation protocol compatible with the protocol supported by the cellular network provider. Usually this can be accomplished by using a standard ITU-T-approved modem, like Y.32 or Y.34.

Initially, the unit 204 is in an inactive mode. A user dials the server number and, navigating through a system of voice menus supported by the server software, listens to and selects a particular sound clip in the same way as browsing the loaded sound clips in the autonomous mode. Instead of assigning a caller ID, the user may choose to download sound clips.

When a user, navigating through the server voice menus, selects to download the current clip and activates the accessory unit 204 through the pre-defined key sequence, the process of transmission of the selected sound clip is initiated. After selecting a "download" option, the user may press a specific key combination on the phone to switch the accessory unit 204 from the inactive to the active mode. The unit 204 then begins to interact with the server 206, using the digital channel provided by the phone and the network. If possible, the already established phone connection is used, or a new connection is established specifically for digital data transmission.

The selected sound clip is transmitted through the phone line to the accessory unit 204 first through the server hard drive 408, then through the server software 207, next through the voice adapter-modem 210, then through the phone line of the network to the cellular service provider 208, to the cellular phone 202, and through the digital interface of the accessory unit 204, then through the processor 300 of the accessory unit 204, and finally, through the flash memory element 302 of the accessory unit 204.

Generally, the server software 207 retrieves the selected sound clip from a database 212, transfers codes of these sounds to the voice adapter-modem that converts these codes to actual sounds, using one of the standard modulation protocols supported by the cellular provider (like ITU-T Y.32 or Y.34) and transfers these sounds to the phone line 214. From the phone line 214, the sounds go to a cellular provider 208, where they are demodulated back into digital sends to the server either an "acknowledgement" of a successful delivery of the sound clip data or a list of data blocks received with errors so that these blocks can be resent in a second try. In order to transmit digital data through the analogue channel, a similar procedure is used to convert data to sounds and back.

When all the data is transferred without errors, the board 203 signals to the server 206 that the call may be disconnected. Thereafter, the server 206 instructs the voice adapter 210 to hang up, freeing the phone line for another client, and the board 203 switches to the autonomous mode, allowing the user to assign a caller ID to the sound clip most recently downloaded.

Example Using Digital Cellular Network and Cellular Telephone

The above-described accessory unit 204 is used in this example in the context of digital (capable of providing a dedicated data transmission channel) cellular network. Since in this case a digital channel is used for sound clip data transmission, no modulation is required on the mobile phone side. The server, on the other hand, uses a modulation protocol compatible with the protocol supported by the cellular network provider. Usually this can be accomplished by using a standard ITU-T-approved modem, like Y.32 or Y.34.

Initially, the unit 204 is in an inactive mode. A user dials the server number and, navigating through a system of voice menus supported by the server software, listens to and selects a particular sound clip in the same way as browsing the loaded sound clips in the autonomous mode. Instead of assigning a caller ID, the user may choose to download sound clips.

When a user, navigating through the server voice menus, selects to download the current clip and activates the accessory unit 204 through the pre-defined key sequence, the process of transmission of the selected sound clip is initiated. After selecting a "download" option, the user may press a specific key combination on the phone to switch the accessory unit 204 from the inactive to the active mode. The unit 204 then begins to interact with the server 206, using the digital channel provided by the phone and the network. If possible, the already established phone connection is used, or a new connection is established specifically for digital data transmission.

The selected sound clip is transmitted through the phone line to the accessory unit 204 first through the server hard drive 408, then through the server software 207, next through the voice adapter-modem 210, then through the phone line of the network to the cellular service provider 208, to the cellular phone 202, and through the digital interface of the accessory unit 204, then through the processor 300 of the accessory unit 204, and finally, through the flash memory element 302 of the accessory unit 204.

Generally, the server software 207 retrieves the selected sound clip from a database 212, transfers codes of these sounds to the voice adapter-modem that converts these codes to actual sounds, using one of the standard modulation protocols supported by the cellular provider (like ITU-T Y.32 or Y.34) and transfers these sounds to the phone line 214. From the phone line 214, the sounds go to a cellular provider 208, where they are demodulated back into digital showing three data blocks 1600, 1602, and 1604 for corresponding data, indicated in the figure as "Data 1" "Data2" and "Data3", with corresponding headers "Hdr1", "Hdr2", and "Hdr3". Positive acknowledgements "Ack1" and Ack2" are sent for packets numbers 1 and 2. Packet number 3 is originally received with an error, indicated by "Nack" and is subsequently re-sent to successfully correct the error, whereby a positive acknowledgement "Ack3" is sent.

Figure 17:
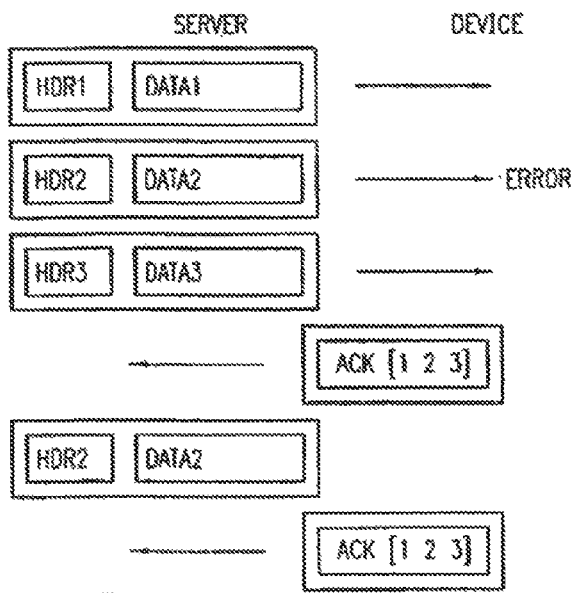
FIG. 17 is a schematic diagram of a protocol for a data transmission method with error correction delivery for a digital cellular telephone, illustrating single acknowledgement for all packets for a half-duplex channel case.

If the phone or network supports only unidirectional data transmission, the other protocol can be utilized to minimize the number of channel direction alterations. In this case, all data blocks for the sound clip are sent at once by the server, without receiving acknowledgements for the individual packets. Then, a single control packet is transferred in the opposite (device to server) direction. This control packet contains a bit mask, with one bit for each data block received. Each bit in the bit mask has a "1" value if the corresponding data block was received without errors, or a "0" value if the corresponding block was affected by errors. The server then re-sends those blocks that were received with errors in the first pass. When all data blocks are transferred, and the acknowledgement mask without errors indication is received by the server, the sound clip is considered to be completely delivered. Example of such interaction is shown in FIG. 17, where the packet number 2 is originally received with an error and is successfully re-sent subsequently to correct the error. Note that only two "ACK" packets were sent during the entire procedure.

Example Using Landline Telephony Network and a Conventional Home Telephone

FIG. 12 illustrates an example of a landline telephony network system 1200 using a voice channel and a conventional home telephone U01, according to a preferred embodiment. (Although this system is described with respect to the accessing and delivery of sound clip files, it is to be understood that the system may be used for the accessing and delivery of entire files).

The system 1200 has two main components: a home telephone accessory unit 1202 and a server 1205. The accessory unit 1202 is an autonomous unit, attached to the phone line 1208 and to the phone (between the line and the phone), and powered from the AC power outlet. A chip performing the same function of the accessory unit may instead be embedded in the phone itself. The purpose of the accessory unit 1202 is to support selection, downloading, and playback of sound clips according to the Caller ID of the calling subscriber. The accessory unit 1202 may include a speaker system and enables the phone to ring sound clips or perform other functions as described for the cellular phone 102.

The server 1205, which is associated with stored clip files 1206, which may be stored on a website or a non web holding unit, is designed to execute requests of the accessory unit 1202 either through user voice commands or commands using the phone keys, and allows for files to be transmitted to the accessory unit 1202 for storage. The system 1200 enables a connection to the server upon a request from the accessory unit 1202, utilizing the phone and PSTN (Public Switched Telephone Network), and an adapter 1204 (voice modem) attached to the server computer. The system 1200 may have a voice menu, which, after connection to the server, allows the user to listen to the server's menu and navigate through the system of voice menus using the phone's DTMF keys. The system may allow the user to select and download clips by allowing the user to listen to the clips presented by the server, select a clip, and issue a download command to the server. The server then sends the selected clip (e.g., in digital compressed form) using the Custom Data Transmission Protocol (CDTP) over the voice channel.

The device 1204 may further interface with a home PC 1214 for downloading sound files to the device. The interface may be a plug in connection or may use a wireless network system.

The accessory unit 1204 may be sold as a unit compatible to most home phones including cordless phones, and may connect directly to the phone jack, with the phone connected to the device. Similar to the cellular phone 102, a home phone may include an embedded chip, instead of the accessory unit 1204, for performing functions similar to those of the accessory unit U04'

The handset of a cordless phone utilizing sound clips according to the present invention may ring simultaneously with the box, wherein the handset may sound a regular phone ring or a sound clip ring, while the box plays a sound clip ring.

The server comprises software shown in FIG. 14, which can run under Windows 98®, Windows-NT OS®, or other suitable system using a voice modem for communications. Additionally, the system may use a single modem or a pool of several modems.

Initially, the accessory unit U02 is in an inactive mode. A user dials the server number and, navigating through a system of voice menus supported by the server software, listens to and selects a particular sound clip in the same way as browsing the loaded sound clips in the autonomous mode. Instead of assigning a caller ID, the user may choose to download sound clips.

When a user, navigating through the server voice menus, selects to download the current clip and activates the accessory unit 1202 through the pre-defined key sequence, the process of transmission of the selected sound clip is initiated. After selecting a "download" option, the user may press a specific key combination on the phone to switch the accessory unit 1202 from the inactive to the active mode. The device 1202 then begins to interact with the server 1205, using the analogue channel provided by the telephone and the network. The already established phone connection is used to receive information.

The selected sound clip is transmitted through the telephone line to the accessory unit 1202 first through server 1205, next through the adapter 1204, then through the telephone line of the PSTN to and through the analogue interface 1305 of the accessory unit (shown in FIG. 13), then through the processor 1301 of the accessory unit 1202, and finally, through the flash memory element 1302 of the accessory unit 1202.

Figure 13:
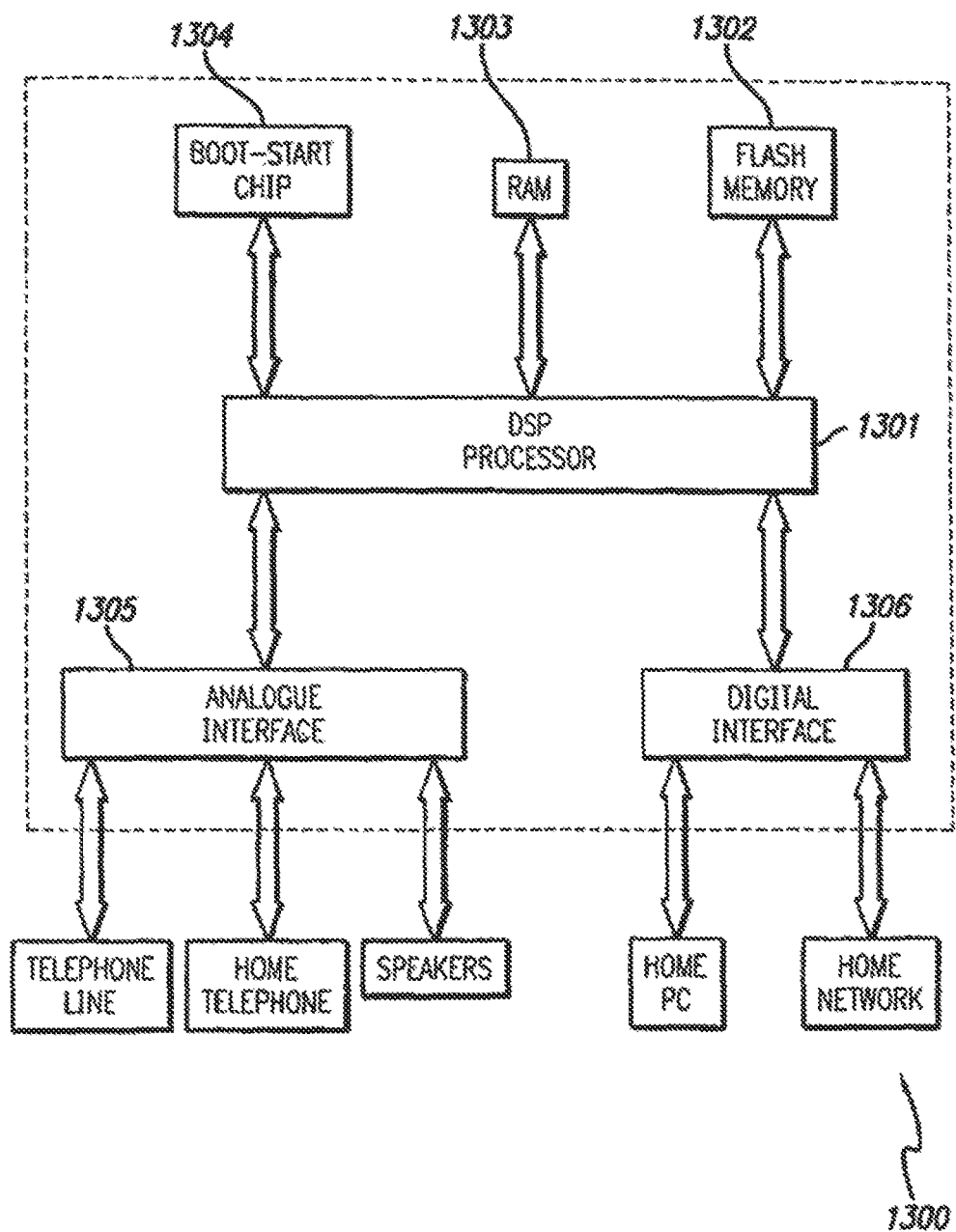
FIG. 13 is a schematic diagram of a board system implemented in an accessory unit of a home telephone utilizing the system of FIG. 12.

A schematic diagram of a board 1300 implemented in the accessory unit 1202 is shown in FIG. 13. The board includes the following main blocks: a processor element 1301 [e.g., a Digital Signal Processor (DSP)], a flash memory element 1302, a Random Access Memory (RAM) element 1303, a bootstrap chip 1304, an analogue interface element 1305, and a digital interface element 1306.

The processor 1301 executes the device firmware, provides control for all other blocks and performs the computational tasks for the board. The tasks performed by the processor 1301 include: control of the board's units, monitoring of keys pressed by the user and processing of key-press events, reception of information from the computer through the computer digital interface, reception of caller ID information from telephony service provider, reception of sound clips through the phone analogue interface, unpacking and then playing back sound clips through a built-in speaker connected to the analogue interface of the accessory unit 1202, support of a voice menu-driven user interface, and performance of other auxiliary functions.

The flash memory element 1302 contains the device firmware, and the sound clips which can be preloaded as well as downloaded from the server. The RAM element 1303 enables the processor to run faster and also holds buffers for unpacked sound fragments and processor service procedures. When the power is turned on, the bootstrap chip 1304 loads the device.

The Analogue Interface element 1305 includes a telephone interface element and a built-in speaker interface element. The telephone interface element is used for input and output of signals when downloading sound clips from the server 1205. The speaker interface element with the speakers, plays all system sounds heard by the user including voice menus and sound clips.

The digital interface element" 1306 may include a computer interface element and other digital interface elements to the home network. The computer interface element may be used for various service functions such as downloading preprogrammed sound clips from the computer to the Flash Memory.

In an autonomous mode, the accessory unit 1202 contains a number of pre-loaded sound clips. Initially, the accessory unit is in the inactive state. The accessory unit 1202 and telephone 1201 interact such that the telephone 1201 sends to the accessory unit 1202 codes of all the keys pressed by the user. Upon receiving a particular sequence of codes or when, for instance, a particular key is pressed for a prolonged period of time, the accessory unit 1202 switches to the active mode. In the active mode, the accessory unit 1202 may interact with the user via a voice menu-driven interface where voice messages, via a speaker, prompt the user to respond by pressing a selection of phone keys indicating the user's responsive selections. The accessory unit 1202 reacts to the user's selections by analyzing the keys being pressed.

In the passive mode, the accessory unit 1202 may analyze messages being received from the telephone 1201. Upon receiving an incoming call, the accessory unit 1202 checks the incoming caller's phone number against the list of assigned caller ID sound clips in its memory and plays back the sound clip through the built-in speakers if the specified caller's phone number was assigned to this clip. Alternatively, the accessory unit 1202 may play back a default sound if the particular Caller ID was not assigned to any clip.

A schematic diagram of the server software is shown in FIG. 14. The server software is used for servicing user requests through user interface element 1401, and transmitting the selected sound clip through the phone line via music clip transmission element 1402. The user interface element 1401 decodes DTMF keys pressed by the user, and plays voice menu labels to the user. The voice menu interface includes hierarchical submenus to lead the user to the downloading of the desired sound clip, where control is transferred to the music clip transmission element 1401.

The music clip transmission element 1401 downloads sound clips to the phone, independent of the user interface element, interfacing directly with the phone accessory unit. The music clip transmission element 1402 initially transmits the selected sound clip to the adapter 1404 for data transmission from the server to the accessory unit. When the sound clip transmission is completed, the task of the music clip transmission element is done, and the telephone line is released and control is transferred to the user interface element 1401

Generally, the server software retrieves the selected sound clip from a server database 1403, which is associated with an audio data optimization and compression element 1405, converts the clip to the special sequence of sounds modulates, and transfers codes of these sounds to the adapter 1404 which converts these codes to actual sounds and transfers these sounds to the phone line 1406. From the phone line 1406, the sounds go through the PSTN and are received in analogue form by the accessory unit 1202. The sounds are then converted by the device ADC (Analog to Digital Converter) to the digital form and are processed by the DSP (digital signal processor) 1301 to the same digital data form initially stored in the server database 1403 (e.g., in MPEG audio format). In this form, the sound clip data are written into the flash memory 1302 of the accessory unit 1202.

Following a reverse direction, going from the accessory unit 1202 to the server 1205 using the same chain, the device sends to the server either an "acknowledgement" of a successful delivery of the sound clip data or a list of data blocks received with errors so that these blocks can be resent in a second try. In order to transmit digital data through the analogue channel, a similar procedure is used to convert data to sounds and back. When all the data is transferred without errors, the accessory unit 1202 signals to the server 1205 that the call may be disconnected. Thereafter, the server 1205 instructs the adapter 1204 to hang up, freeing the phone line for another client, and the accessory unit 1202 switches to the autonomous mode, allowing the user to assign a Caller ID to the sound clip most recently downloaded.

Figure 15:
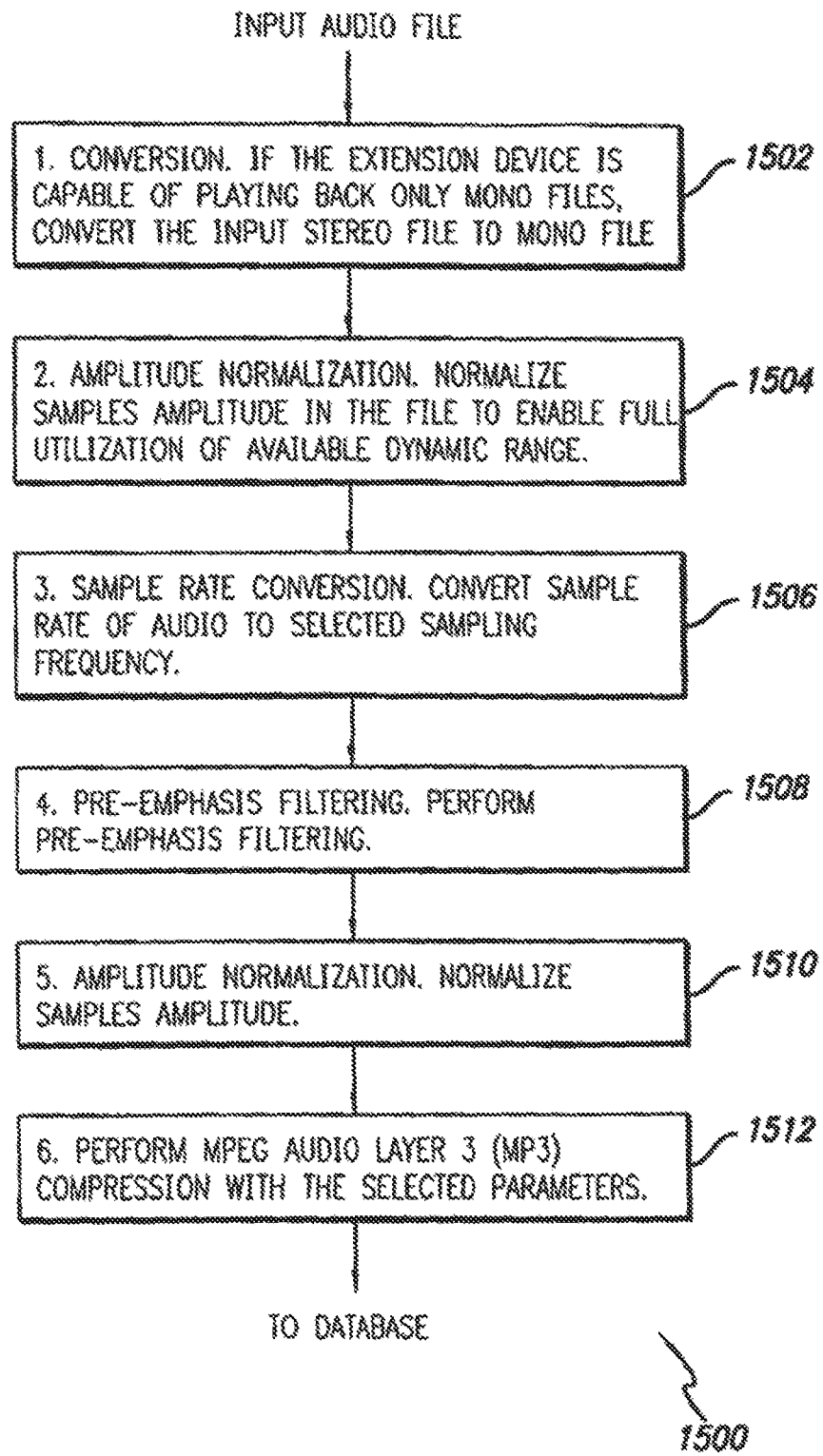
FIG. 15 is a flow chart for an audio data parametric optimization and compression algorithm.
Figure 16:
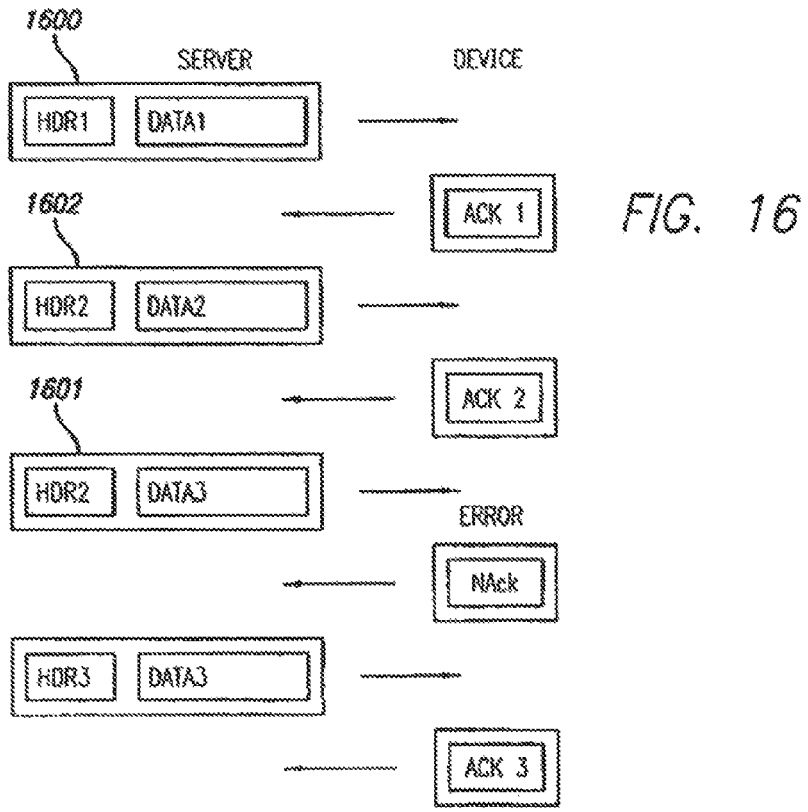
FIG. 16 is a schematic diagram of a protocol for a data transmission method with error correction delivery for a digital cellular telephone, illustrating individual packet acknowledgement for a full-duplex channel case.

The server audio data optimization and compression element 1205, utilizes a music compression algorithm outlined in FIG. 15, which converts common music files into compressed files in order to reduce the audio clip size for minimizing its download time, while maintaining predetermined audio quality. These files are downloaded and stored by the accessory unit 1202.

Preferred Procedure for Audio Data Parametric Optimization and Compression

The method 1500 of compressing the files comprises the steps of a) conversion 1502; b) amplitude normalization 1504; c) sample rate conversion 1506; d) pre-emphasis filtering 1508; e) amplitude normalization 1510;

and t) performance of MPEG audio layer 3 (MP3) compression with the selected parameters 1512. The compressed files are then transferred to the server database.

Step 1502 of conversion to mono only needs to be performed if the input file is in stereo and if the audio output subsystem of the target hardware is only capable of playing back mono audio. At this step all available information is included into the output audio by summing of the left and right channels to form a single mono output.

After conversion, or if the file does not need to be converted to mono. compression begins with the step 1504 of amplitude normalization, wherein sample amplitudes in the file are normalized. This step is required for enabling audio utilization of all available dynamic range and for improving the computational accuracy of subsequent steps. In order to maximize preservation of original audio range, a fixed coefficient for the entire audio file normalization is used. The coefficient is obtained using input file analysis to "stretch" the input audio range over the maximum available range.

Step 1506 converts sample rate of audio files to selected sampling frequency. The original audio clips may have various sampling rates (44100 Hz, 48000 Hz, 22050 Hz, 11025 Hz, etc.). After analysis of available hardware capabilities an optimal sampling frequency, which provides the most adequate audio quality, is selected. Increasing the sampling frequency above the optimal sampling frequency would not significantly increase the perceptual audio quality, due to the limitations of the audio output subsystem of the accessory unit. For example, for the cellular phone system of FIG. 2, after analysis of available hardware capabilities and a series of perceptual tests, the 22050 Hz sampling frequency was selected as providing the most adequate audio quality since the audio output subsystem of the accessory unit has a relatively sharp drop in response for frequencies above 10-12 kHz.

In order to avoid aliasing effects when changing from higher to lower sampling rate, a low-pass pre-filtering with a cutoff slightly lower than the new Nyquist frequency is applied before down sampling. For rates that are not multiples of each other, cascaded sampling rate conversion schemes are constructed to minimize memory consumption and improve performance.

The step 1508 of pre-emphasis filtering, along with the re-sampling of the previous stage, takes into account the specifics of the audio output subsystem of the accessory unit, to achieve improvement of the perceptual audio quality, and to reduce the resulting audio size after compression.

Since the speaker of the audio output subsystem of accessory unit is preferably very small, the resulting sound has very low power in the low frequency range. Therefore, providing output in the low frequency range is likely to be futile, as it would only increase the size of audio file without any perceptual improvements. Additionally, providing output in the low frequency range may create undesirable "overflow" effects for the speaker.

For example, for the cellular phone system of FIG. 2, all frequency content below about 400 Hz is removed from the audio. In order to make the audio more "perceptually rich" in the low-frequency range, frequencies around 600 Hz are increased by about +6 dB. The frequency range from 1200 Hz to 8200 Hz is kept unchanged. Then, starting from about 8200

Hz the signal power is gradually increased, up to +15 dB at the highest frequency (11 kHz). This compensates for the drop in speaker transfer function at high frequencies and improves the listening experience.

A set of subjective audio perceptual tests with various types of audio contents, using the wide spectrum of hardware of the target platform has proved that the above-described pre-emphasis significantly improves the perceptual quality of resulting audio. At the same time, reducing frequency contents in the "non-significant" frequency regions allows reduction of the resulting compressed audio size, since the data bits are not allocated to non-used frequencies.

The described pre-emphasis procedure is implemented by a filtering with a FIR (Finite Impulse Response) filter, according to the formula:

$$y_k = \sum_{i=0}^{N-1} b_i \cdot x_{k-i}$$

where $b_i$ are filter coefficients,
$x_k$ is the k-th output audio sample,
Yk is the k-th output audio sample.

The $b_1$ coefficients are fixed and computed for the particular sampling rate and the desired pre-emphasis response curve. The filter can be designed to have a linear phase response (this is actually guaranteed if the b.sub.1 coefficients are symmetric), which would ensure absence of phase distortions to the audio. Since the delay introduced by the filter is not harmful for off-line processing, the filter size can be made rather large to approximate the desired response curve with a high precision.

After completing the step of pre-emphasis filtering, normalization of the sample amplitude is once again performed. Since the filtering significantly changes the signal, the second amplitude normalization step 1510 is required to convert resulting audio "loudness" to some pre-defined value.

Proceeding to step 1512, the processed audio clip is compressed into an MPEG Layer 3 bit stream. The resulting bit rate (level of compression) can be varied to suit different needs. For instance, it can be made dependent on the source audio clip length, to make the compressed file fit into a pre-defined size. Alternatively, it can be made dependent on the anticipated delivery method (to create, for instance, a "built-in" audio clip of a very good quality, or to make the audio clip of a very small size, for delivery through a slow channel). The compression parameters can also be selected so that the clip delivery time is a constant independent of the actual link transfer rate.

Figure 6:
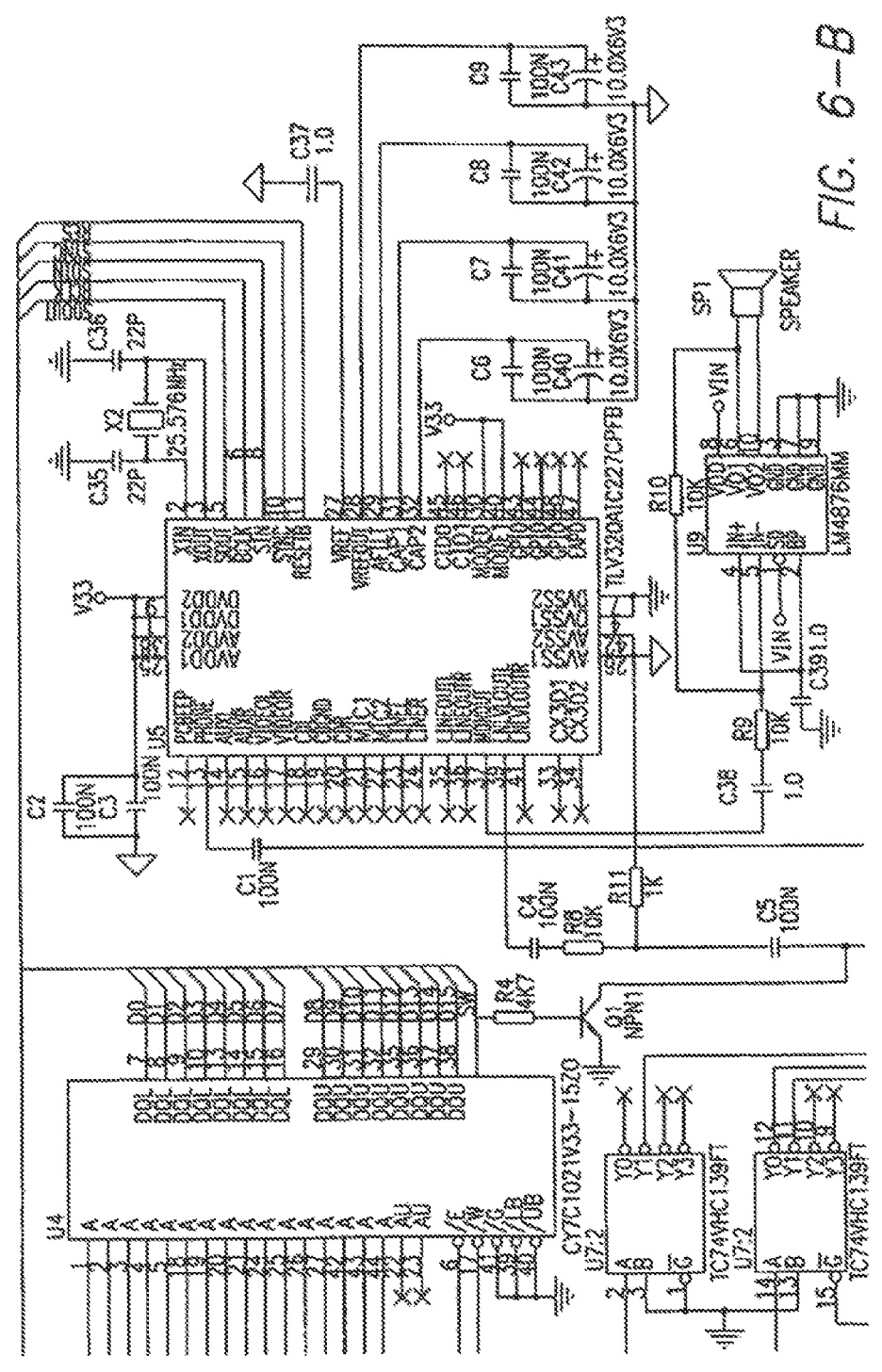
Figure 7:
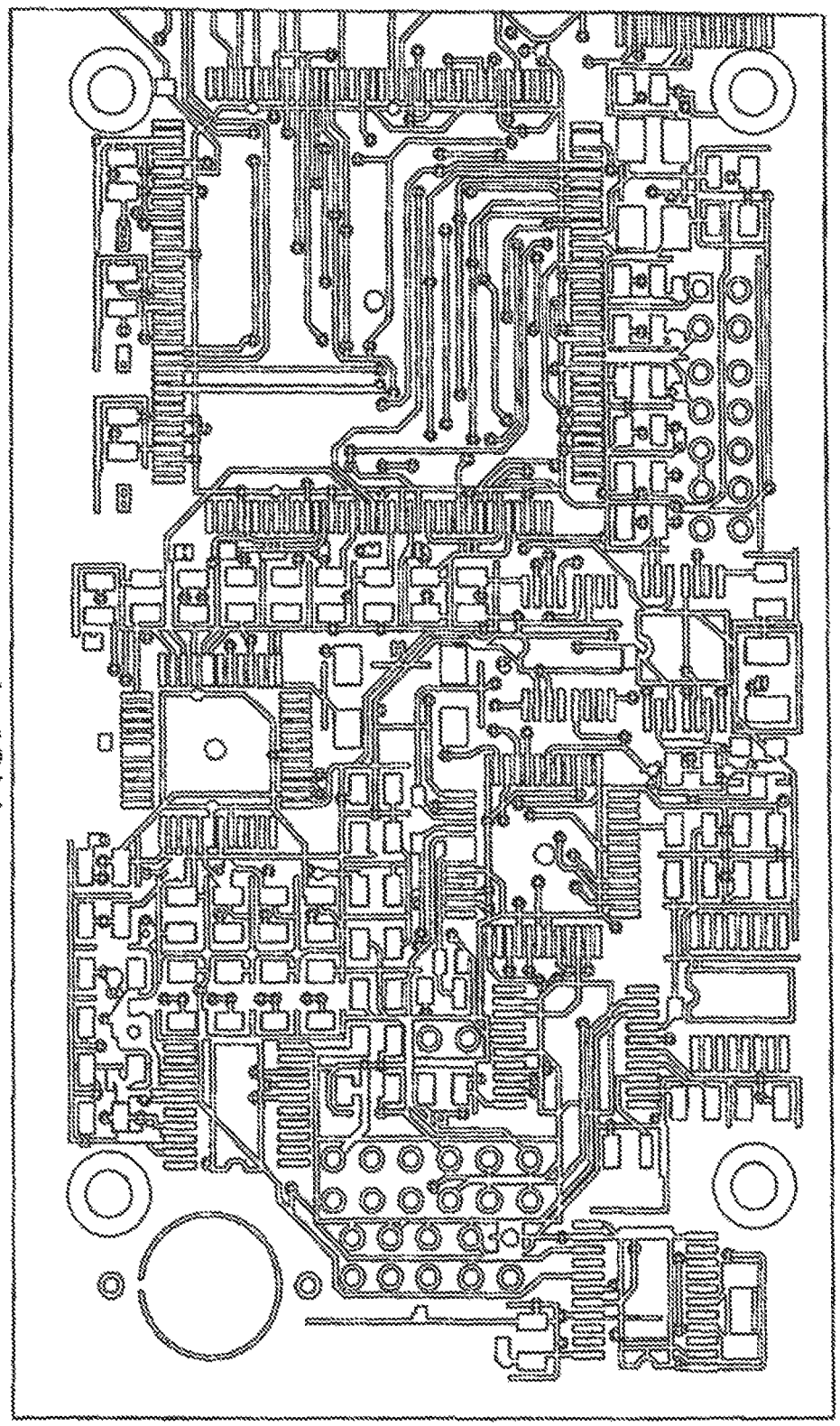
FIG. 7 illustrates an image of a printed circuit board for the accessory unit of FIGS. 6 A-D.

Technical Description of a Preferred Embodiment for a Cellular Phone Accessory Unit Electrical Schematics FIGS. 6A-D illustrate the electrical schematics of a mobile phone accessory unit. (The image of the printed circuit board, as rendered by Computer Aid Design Software is shown in FIG. 7). Initial boot-up of the processor is done from the EEPROM (Electrically Erasable Programmable Read Only Memory) using passive serial SPI (Serial Programming Interface) protocol. Thereafter, the boot loader code, read from the EEPROM, loads the main firmware from the Flash memory. The PIL (Phase Locked Loop) of the processor is programmed for 5× multiplication of clock frequency.

Firmware debugging is carried out through the JTAG (Joint Test Action Group) port using standard TI (Texas Instruments) software. External RAM is mapped both to the program and data space at the same addresses and occupies all lower address space (64 k). Flash memory (Serial Data Flash) is accessed using software emulation of SPI protocol.

Audio code (Coder-decoder) works at approx. 22 kHz sampling rate (both channels). The Mode Control transistor selects the phone interface mode: either RS-232 control mode (closed state) or "hands free" mode (opened state). The phone itself does not support simultaneous usage of these two modes.

Both channels of RS-232 work at 11,5200 baud rate. From the PC side CTS (Clear to Send) and DTR (Data Terminal Ready) signals are supported. From the phone side CTS and RTS (Request to Send) signals are supported, with inverted polarities. Both channels employ hardware flow control.

The analogue signal level at the phone input is about 100 mV RMS (Root Mean Square). The level at the phone output is about 600 mV RMS.

Cellular Phone with Accessory Unit

Figure 8:
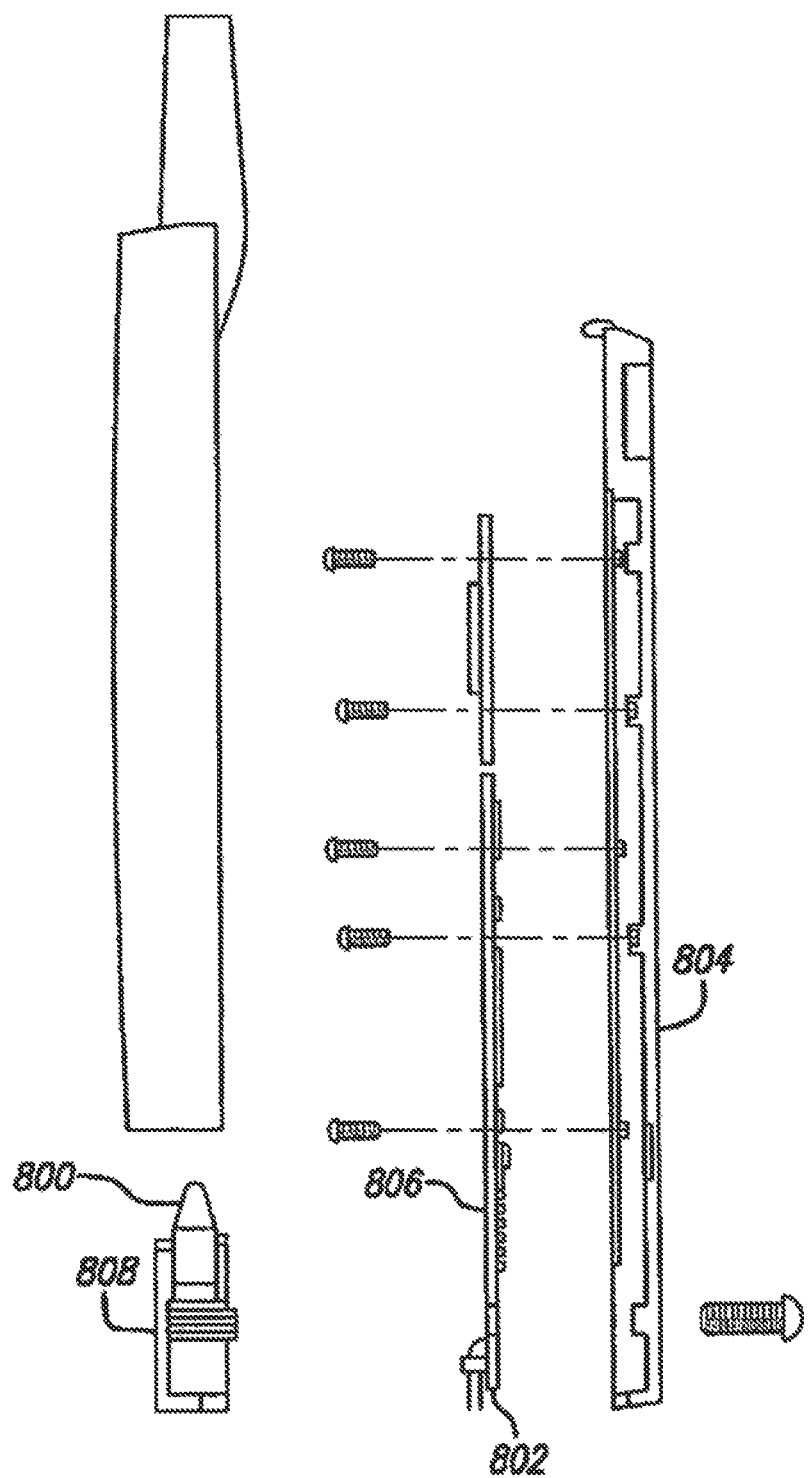
FIG. 8 is an exploded side view illustrating the assembly of a cellular phone accessory unit and cellular phone attachment to the accessory unit.
Figure 9:
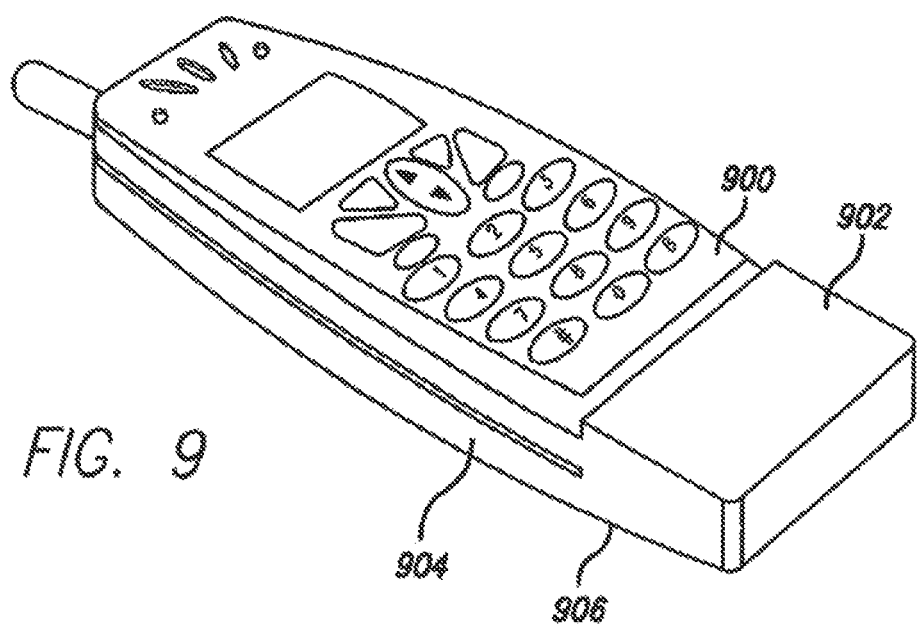
FIG. 9 is a perspective view of the cellular phone accessory unit and cellular phone of FIG. 8, showing the cellular phone attached to the back of the phone connector and mounting of the accessory unit.
Figure 10:
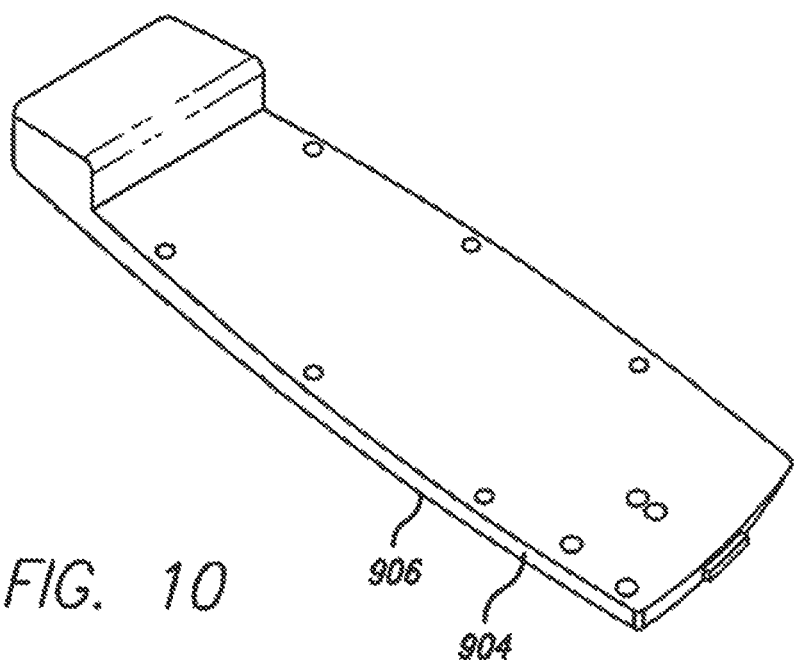
FIG. 10 is a perspective view of the accessory unit of FIG. 9, detached from the telephone.
Figure 11:
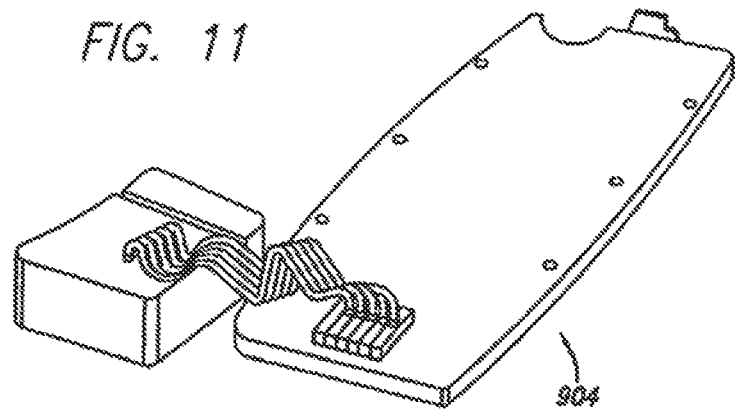
FIG. 11 is a picture of the accessory unit of FIG. 9, disassembled from the mounting.

A cellular phone 900 with an accessory unit 902, according to one embodiment, is shown in FIGS. 8 and 9 using the Ericsson R520 as an example. The accessory unit is housed in thin cover 904 (see FIGS. 10 and 11) providing a mounting body 906 for attaching the phone 900 to the unit, via an interface connector 800. The accessory unit contains the printed circuit board 802 and speaker, preferably along the thin portion of the body.

The accessory unit is attached to the back of the phone using the phone connector 800. A snap mounting which utilizes a dimpled section on the phone case typically intended for a car phone holder may also be used.

The accessory unit includes the selVer software and two voice modems, attached to the selVer. The mounting body contains all necessary electronic components.

The tasks of the electronic components include playing back of a pre-loaded sound clip upon a caller ID notification reception and downloading new clips from the selVer.

The body of the accessory unit preferably comprises a base 804, a thin cover 806, and a molded cover 808. All three body components are preferably made of high-quality aluminum-magnesium-copper alloy (duralumin) and are chemically covered with a protective oxide film using two different dyes (colored and black) for the two copies of the device. A dense rubber casing may also be used. Factors considered in selecting the body material include lightness (so that the accessory unit would not exceed the phone itself in weight), mechanical strength, and the quality of electromagnetic shielding properties for protecting the internal components from the waves radiated by the phone.

According to one embodiment, the accessory unit that embodies the delivery system for a cellular phone attachment is about 1.5".times.1.5".times.0.25" and includes a small high fidelity built-in speaker. The accessory unit may connect into the AC adapter fixture in the bottom of a cellular phone. A dense rubber casing or glove may house the device to protect it. The inside of the rubber glove may have a molded cavity that the device will fit into. The glove may have a circle of small holes which line up with the device's speaker to allow full sound penetration. The device and glove may be sold in different design variations both for marketing purposes and for fitting the different cellular phones on the market.

Additionally, the accessory unit may connect into a cable connector instead of an AC adapter jack so that different jacks can be used. The device may also be modified with four or five variations to fit the various cellular phone software systems, (not AC adapter variations) currently on the market. The device, including a speaker, may also be made with several different adapter applications that would attach to a variety of different phonics.

A snap-on mount for fastening the accessory unit to the phone may be located in the base body. The main purpose of the thin cover is to provide the electromagnetic shielding. The molded cover 808 contains connectors and some other components.

A simple snap mechanism for attaching the accessory unit to the phone, similar to the installation of a cellular phone to a car phone holder, may be provided.

FIG. 20 shows the accessory unit by itself, detached from the phone. The accessory unit can be detached from the phone similar to the detachment of other accessories such as the phone charger (usually by applying a rotating force rather than pulling straight out).

FIG. 21 shows the accessory unit uncovered. It is preferable to leave the body of the accessory unit closed. Preferably, there are no glued, soldered, or other permanent junctions inside, however, the high precision in the manufacture of some components could lead to their degradation after repeated assembly and disassembly.

The accessory-to-phone mounting is preferably designed to withstand repeated attachment and detachment without degradation of the snap-on mounting or connector. Although the phone body is also durable, it is preferable to attach and detach the accessory by shifting the snap-on lock upward manually during the attachment procedure (like to during detachment) to reduce wear of phone body near the latch.

The PCB (printed circuit board), located inside the accessory unit, is a multi-layer board which may have 0.2 mm gaps, two solder mask layers, and a silkscreen layer. The board preferably carries all the components, as illustrated in the schematics, excluding connectors and the speaker. Two outer layers of the board are signal layers; two internal layers are ground and 3.3V power plane. For convenience of the PCB assembly on modem plants, most packages are surface-mounted but not BGA. The board preferably does not contain any components requiring rare or custom-made equipment for their assembly.

The phone connector is preferably selected to maximize the firmness of the attachment, taking into account significant dimensions of the accessory unit. It should be mentioned that the connectors are unique to the type of the phone used (Ericsson R520 and compatible, like R320 and 1'28, in this example).

Factors in selection of the speaker for music playback included sound quality, which is primarily related to the speaker size, compactness, and weight of the speaker, as it is desirable that the speaker not be thicker and heavier than the phone itself. Depending on the available technology, there may be some tradeoff between good speaker quality and having a lightweight speaker. Speakers used in professional radio receivers-scanners may be a reasonable compromise since such speakers provide better than usual sound quality while possessing reasonable dimensions and weight. Other options include either sacrificing weight and dimensions to increase sound quality or using the new so-called "ceramic" speakers that are now appearing on the market. Mention should be made that although using these speakers could provide better quality, special modifications to the device would be required since these speakers could not be directly substituted in place of the standard ones.

It should also be noted that the bandwidth of the acoustic channel of the cellular phone which, in turn, is non-linearly compressed and transmitted over a digital channel of the phone, is much less than the bandwidth of the conventional landline phone and can deliver about 150 bytes per seconds data transfer rate. Conventional landline phone could deliver about 3700 bytes per seconds (V.34). Using better speakers in the phone would entail loading sound fragments of better quality (and, therefore, of bigger size), which would increase the time necessary to download a melody. The problem could be solved by using the GSM digital data channel directly which would provide a rate of about 1000 bytes per second for existing cellular networks and more than 7000 bytes per second for newly deployed systems. Alternative solutions include: having to tolerate an increase in the sound file or sound clip download time, downloading a melody from a local computer (the melody being delivered to the local computer by some alternate means), and redesigning the system to support conventional (landline) phones. In the latter case, due to the significant increase in the device body size, it may make more sense to use a stereo-effect (which is reasonable when the speakers of left and right channels have enough spatial separation).

Server Software Description

The server described herein performs the following functions: 1) startup, detection of the modem, detection of the melodies available; 2) answering incoming calls; and 3) servicing requests of user via D1MF codes.

Upon startup, the application requests the user to select which device to work with. Possible options include local test mode (0), modem on COM1 port (1), and modem on COM2 port (2).

If the local test mode is selected, all sounds will be played back using the sound card of the local computer and the computer keyboard will be used to control the server (via numeric buttons instead of D1MF keyboard). This mode is primarily for system testing purposes.

If one of the modems is selected, all sounds will be played back into the phone line using the selected modem, and the calling party's phone keyboard (D1MF tones) will be used to control the server. This is the normal mode of server operation.

The answering of incoming calls is performed differently in the local and the normal modes. In the local mode, the application waits for the 'R' key to be pressed to simulate remote party RING, while in the normal mode, the application waits for the RING signal from the modem. Then, in either mode, the application initializes the device used (sound card or modem). In the latter case, the modem goes "off-hook" and plays back the greeting message and the main menu (e.g., O-End of the session, I-Current, 3-Next, 4-Load).

Thereafter, the application goes into calling party servicing loop. Exit from the loop is possible upon reception of D1MF code '0' (or its simulation using the keyboard) or after the 30-seconds timeout if no reaction is detected from the remote user. Additionally, if working with the modem, the loop is exited when short beeps ("BUSY") condition is detected on the phone line. In the local mode, the 'X' key also leads to the immediate exit of the application.

The calling party servicing algorithm may work as follows: the software keeps the internal counter or number of the current sound clip. Initially, this number is "0" indicating that the clip is at the top of the list. Upon receiving the "1" command, the software plays back the clip with the current number. Upon receiving the "2" command, the software increases the number and plays back the melody, i.e., plays the next melody. Upon receiving the "3" command, the software decreases the number and plays back the melody, i.e., plays the previous melody. Upon receiving the "4" command, the melody download is simulated. For the obvious reason, this mode is not implemented yet. Upon receiving the "0" command, the application switches the modem "on-hook" releasing the phone line and returns to the incoming call waiting state. Upon encountering any other command, the application plays back a standard error message. At any moment, the server application can be aborted by pressing <Ctrl>C combination on the keyboard.

The server application keeps a log file (e.g., named "ProgramName_N.Log") where N is a port number. Therefore, if two instances of the application are started, one for the modem on COMI and the other for the modem on COM2, two independent log files will be created. The log file contains brief information about user and server actions, times of events, their main features, for example, state of the modem or the sound card. These files are intended to be sent to the software developers in case of problems but can be used for other purposes as well, for example, to estimate the server load.

Due to the fact that the server application always plays a melody with the same quality as one would be able to hear through the conventional phone channel [monophonic, 8 kHz-sampling rate (signal bandwidth up to 3.7 kHz)], the sound quality of the played back clips may be low. This is not related in any way with the quality of sound that would be digitally transferred to the client's phone when the melody is selected since listening to the clips from server through the phone network could not deliver better quality than the phone channel itself. For this reason, sound files compressed in monophonic versus stereo form would be preferred since the rate of delivery would be faster, with no loss in playback quality from the phone. At the same time, when the clips are downloaded into the phone in digital form, significantly better quality could be delivered upon playback due to the perceptual compression; however, this would increase the transfer time.

The server software could also be implemented to track which clips were sent to which user or subscriber. This information could then be tracked and reported to different third parties such as the Copyright Office, or performing or artist's rights organizations or societies.

Devices for Accessing Sound and Image Files

Electronic devices adapted to receive sound and image data, according to the present invention, may be provided with an attachment or built in mechanism for providing consumers with Internet based or Internet free access to a library of downloadable sound and/or image files. Consumers may be allowed to download free clips of a song, musical composition, or other sound recording or movie or other performance onto any of these devices for use as alerts.

After hearing or viewing a clip, the user, preferably by the push of a button, may transact a purchase of the full file associated with the clip, which may be downloaded to the device in its entirety, or delivered to the user's address on an independent medium such as records, cassette tapes, CDs, videotapes, and DVDs. Such practice is intended to encourage the sales of sound and image files by giving the user the opportunity to quickly make an impulse purchase.

A device for downloading and listening to music files, which is similar to a walkman type I-Pod™ device, but uses the same delivery method as described for the cellular phone comprises a speaker and/or an earphone set for listening to music with volume controls (such as Bose or Shure E5 universal earphones), and a server access element (which may be approximately the size of a credit card). Such a device may be used as a hand held portable music player, as well as a car radio or home system, and may include larger speakers for use as an audio system by businesses such as bars, restaurants and clubs.

In addition to features which allow a user to access the server library, the device may include other features common to conventional MP3 players and/or Apple I-Pod™ devices.

The server access element includes controls, which may be buttons, for accessing, browsing, and downloading files from the server to the device. Speed dial technology may be used for accessing the server. For browsing, a multi-task arrows button which allows the user to browse, listen to samples, and highlight specific selections may be provided.

The server access element may include a small LCD monitor (approximately 1"×1.75") for text browsing the server library. A small microphone hole may also be included for allowing the user to browse the library using voice commands. The earphone set or speaker will enable the user listen to downloaded sound files.

Downloaded files may be stored on a device storage list for accessing at all times, or deleted. Thus, the user may access a library containing a large number of sound files, and browse, download, and listen to music, without the Internet or the need to plug into a computer. The consumer may be charged a fee for each download, or may be able to purchase actual items, for delivery to an address indicated by the user, such as records, cassette tapes and CD's through the access element. Free clips which the user can download may induce the consumer into purchasing the entire sound file from where the clip originated.

The device may also include a mechanism for allowing a user to store downloaded files on a medium, such as a card, independent of the device. To this end, the device may provide a slot into which a storage card may be inserted, such that when the device is full, files may be downloaded onto the card for emptying space on the device. A security mechanism may also be included to prevent intellectual property abuse, for example, by preventing users from playing copied files on other devices as described above. Such devices may further include a monitoring feature, which would allow performing rights organizations such as ASCAP and BMI to keep track of music publicly played by business such as bars, restaurants, and clubs for the purpose of paying out royalties.

Figure 18:
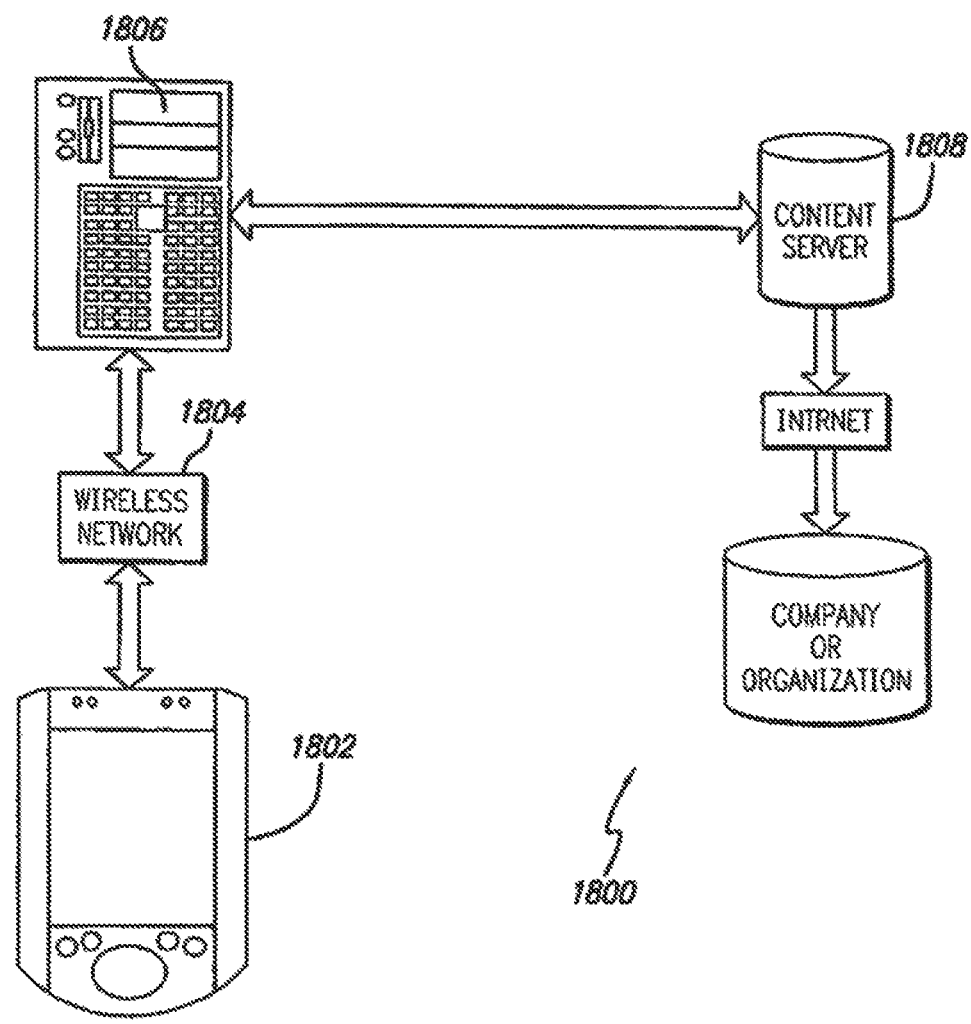
FIG. 18 is a schematic diagram for a media file monitoring system.

A schematic diagram for a media file monitoring system 1800, according to a preferred embodiment, is shown in FIG. 18, for use with an I-Pod™ type listening device 1802, wherein a consumer may purchase copyright registered media files which are downloaded wirelessly to the device 1802. The system 1800 includes an existing wireless network 1804 of 1.5 G or more, a system monitoring server 1806, and a system content server 1808. The monitoring server 1806 monitors and counts every file delivered to the consumer device 1802, for monitoring and counting every file delivered to the device 1802. The server 1806 may track each individually titled file which may include information such as song title and artist name, purchase price, the consumer's name, and other identity information, time of delivery, and any other pertinent information. The server 1806 may also protect encrypted copyrighted files from illegal file copying. The content server 1808 stores copyrighted digital media content licensed from multiple entertainment companies. Thereafter, monitoring information, including statistics may be transmitted (e.g. through the Internet) to a company or organization. The system described may also apply to a viewer device for monitoring image files.

A portable laptop type viewer device, for accessing and viewing image and/or sound files, may comprise a wireless earphone set and/or speaker for listening to programs with volume controls, and a Personal Digital Assistant (PDA) with a monitor which may be approximately the size of a laptop computer. This device allows the user to access a server library containing a large number of movies, TV shows, cartoons, and other files, using either text or voice activation, without the need to plug into a computer or use of the Internet or other computer based wireless telecommunication system.

The files may be categorized and subcategorized by type of file (i.e. movies, TV shows) then by title or name of main actors. TV shows may further be classified by providing a description for each episode, similar to a description provided in a TV Guide™. Other categories and subcategories of classification may be provided to allow the user to identify the exact file he wishes to access.

The device allows the user to browse, download, preview, store and view his selections, (using text, voice, or button commands), wherein a fee may be charged by the provider for any or all of these options. The files may be made available as clips as well as in their entirety. The viewer device may include a folder containing previously downloaded image files that can be accessed at any time and deleted when desired. The library may be organized by categories such as type of show (i.e. movies, TV sitcoms), names of actors, show titles, sitcom description (e.g. as appearing in TV Guide™) etc.

Method of Advertising Using Delivery of Sound Clips

The method of delivering sound and image files, in accordance with the present invention, can further be utilized as an advertising tool. To this end, any of the above-described systems carrying the library of sound and/or image files, which include a website and non-Internet accessible holding unit, may be used to expose the user to sponsored advertising messages. For example, a user calling the holding unit may hear advertising while the system is accessing the library.

Other advertising opportunities may be provided by utilizing a phone or other electronic device using alerts according to the present invention. For example, the phone may ring with advertising gimmicks such as promotional messages. Such advertisement gimmicks may be played as default rings when no clip is selected for the ring. Additionally, a phone may be programmed to play, or transmit advertisements spontaneously. Clips containing advertising messages such as jingles may also be provided. Advertising messages may be tacked onto a user selected clip of a popular song or the like.

Method of Distributing Music and Audiovisual Works to Consumers.

A method of distributing music and audiovisual works to consumers while accounting to copyright owners of the works comprises: (a) Making available on a website various selections of works in various categories for review by identifying information and offering a portion of the work for hearing or listening, each work being coded internally with identification to a copyright owner or its representative; (b) Allowing consumers to select the viewable or listenable portion of the work for data storage online or for downloading to the consumers' electronic devices at home wherein the downloaded file being encrypted to only play on the consumer's electronic devices first receiving the download; (c) Optionally tracking those consumers who received the download of the portion of the work and reporting to the copyright owners or their representatives information concerning the download; (d) Allowing a consumer to return to the website to purchase and download a complete copy of the copyrighted work previously sampled by the consumer; (e) Conducting an online purchasing transaction and charging the consumer for the download; (f) Downloading a complete copy of the copyrighted work to the consumer in an encrypted fashion so as to be playable only in the consumer's electronic device and not exchangeable with third parties; (g) Tracking those consumers who received the download of the copyrighted work and reporting to the copyright owner of their representatives information concerning the download; and (h) Paying the copyright owners or their representatives a portion of the money received from the consumers for their downloading of the copyrighted work.

The delivery system, according to the present invention will also integrate with future wireless technology, such as 3-G systems, as it becomes available, for offering enhanced capabilities for accessing, delivering, and using sound and image files.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

INDUSTRIAL APPLICABILITY

It is an object of the present invention to provide a unique method for using sound and image clips as alert sounds for a variety of electronic devices.

It is a further object of the present invention to provide a method for ringing a cellular telephone using actual sound files including sound clips which may comprise real music with human voice, various instrument sounds and other sound effects.

It is a further object of the present invention to provide a software system which may be integrated into existing cellular telephone hardware for enabling the cellular telephone to access and utilize sound files including clips, without the need for extra hardware.

It is a further object of the present invention to provide an accessory attachment for cellular telephones and for landline telephones which will enable the telephone to access and utilize sound files, including clips.

It is a further object of the present invention to provide a security feature for devices capable of receiving and playing multi-media files for preventing consumer unauthorized dissemination of such files.

It is a further object of the present invention to provide a tracking feature for devices capable of receiving and playing music files for providing performers and writers rights organizations with an accurate method of determining royalty right payments to registered performers and writers.

It is a further object of the present invention to develop a website for browsing and for delivery of sound and image files including clips.

It is a further object of the present invention to provide a method for selling and buying products associated with existing copyrighted music, movies, TV shows, and other recorded performances.

It is a further object of the present invention to provide a delivery method for allowing a user to access, browse and download files that is independent of the Internet, and does not require a plug in or hand wired connection.

These and other objects, advantages, and the industrial utility of the present invention will be apparent from a review of the accompanying specification and drawings.

What is claimed is:

1. A method of wirelessly delivering at least one compressed digital audio and/or visual file to a cell phone over a cellular network, said cell phone, the method comprising:
   providing a website to the cell phone;
   wherein the website is associated with the at least one compressed digital audio and/or visual file, said compressed digital audio and/or visual files are stored on one or more servers;
   wherein the website includes a plurality of visual images associated with at least one compressed digital audio and/or visual file for selection of at least one compressed digital audio and/or visual file;
   providing for the transmission of a representation of at least a portion of the compressed digital audio and/or visual files to the cell phone upon request, said cell phone having a digital signal processor and a receiver for receiving and processing compressed digital audio and/or visual files transmitted using orthogonal frequency-division multiplex (OFDM) modulation;
   receiving a request from the cell phone selecting the at least one compressed digital audio and/or visual file based on the visual image; and
   providing for the streaming transmission of an encrypted copy of at least one compressed digital audio and/or visual file to the cell phone based on the received request using orthogonal frequency-division multiplex (OFDM) modulation over a cellular data connection.

2. The method of claim 1, further comprising storing at least a portion of the at least one compressed digital audio and/or visual file on the cell phone.

3. The method of claim 1, further comprising optimizing the digital audio and/or visual file according to an optimization scheme.

4. A method of wirelessly delivering a compressed digital audio and/or visual file to a cell phone over a cellular network the method comprising:
   storing a library of compressed digital audio and/or visual data files on one or more servers;
   wherein the library includes a visual image associated with the compressed digital audio and/or visual file for selection of the compressed digital audio and/or visual file;
   providing to the cell phone over the cellular network the visual image associated with the compressed digital audio and/or visual file;
   receiving a request from the cell phone selecting at least one of the compressed digital audio and/or visual file from stored on the one or more servers said cell phone having a digital signal processor and a receiver for receiving and processing compressed digital audio and/or visual files transmitted using orthogonal frequency-division multiplex (OFDM) modulation; and
   providing for the transmission of an encrypted copy of the compressed digital audio and/or visual file to the cell phone.

5. The method of claim 4, further comprising storing at least a portion of the compressed digital audio and/or visual file on the cell phone.

6. The method of claim 4, further comprising optimizing the digital audio and/or visual file according to an optimization scheme.

* * * * *

UNITED STATES PATENT AND TRADEMARK OFFICE
CERTIFICATE OF CORRECTION

| | | |
|---|---|---|
| PATENT NO. | : 9,124,717 B2 | Page 1 of 1 |
| APPLICATION NO. | : 14/230733 | |
| DATED | : September 1, 2015 | |
| INVENTOR(S) | : John Mikkelsen et al. | |

It is certified that error appears in the above-identified patent and that said Letters Patent is hereby corrected as shown below:

IN THE CLAIMS

<u>Column 33, line 4</u>
Delete "said cell phone,".

Signed and Sealed this
Fifteenth Day of March, 2016

Michelle K. Lee
*Director of the United States Patent and Trademark Office*